US012749458B2

(12) United States Patent
Yan et al.

(10) Patent No.: US 12,749,458 B2
(45) Date of Patent: Sep. 29, 2026

(54) DISPLAY PANEL HAVING MULTIPLEXING CIRCUITS IN A BEZEL REGION AND DISPLAY APPARATUS

(71) Applicants: Chengdu BOE Optoelectronics Technology Co., Ltd., Chengdu (CN); BOE Technology Group Co., Ltd., Beijing (CN)

(72) Inventors: Zhenglong Yan, Beijing (CN); Yanyang Shang, Beijing (CN); Yipeng Chen, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/994,086

(22) PCT Filed: Apr. 24, 2024

(86) PCT No.: PCT/CN2024/089513
§ 371 (c)(1),
(2) Date: Jan. 14, 2025

(87) PCT Pub. No.: WO2024/244829
PCT Pub. Date: Dec. 5, 2024

(65) Prior Publication Data
US 2026/0018137 A1 Jan. 15, 2026

(30) Foreign Application Priority Data
May 26, 2023 (CN) ........................ 202310612612.5

(51) Int. Cl.
*G09G 3/3275* (2016.01)

(52) U.S. Cl.
CPC ... *G09G 3/3275* (2013.01); *G09G 2300/0426* (2013.01); *G09G 2310/0297* (2013.01); *G09G 2330/021* (2013.01)

(58) Field of Classification Search
CPC ................................................... G09G 3/3275
(Continued)

(56) References Cited

U.S. PATENT DOCUMENTS

2020/0082758 A1* 3/2020 Yi ........................ G09G 3/3275
2022/0068184 A1* 3/2022 Oh ....................... G09G 3/3275
(Continued)

FOREIGN PATENT DOCUMENTS

CN 101022004 A 8/2007
CN 109256081 A 1/2019
(Continued)

OTHER PUBLICATIONS

International Search Report for PCT/CN2024/089513 Mailed Jul. 29, 2024.

*Primary Examiner* — Long D Pham

(57) ABSTRACT

A display panel, comprising: a substrate (10), a plurality of sub-pixels (PX) and a plurality of data lines (DL) located in a display area (AA), and a multiplexing circuit (30) located in a first frame area (B1). The plurality of data lines (DL) are connected to the plurality of sub-pixels (PX). The multiplexing circuit (30) comprises a plurality of multiplexing units (31, 32, 33). At least one multiplexing unit (31, 32, 33) comprises a plurality of multiplexing transistors. The multiplexing transistors of the plurality of multiplexing units (31, 32, 33) are arranged in a plurality of rows and columns, one row of multiplexing transistors comprises a plurality of multiplexing transistors arranged in a first direction (X), and one column of multiplexing transistors comprises a plurality of multiplexing transistors arranged in a second direction
(Continued)

(Y). The first direction (X) intersects with the second direction (Y).

18 Claims, 35 Drawing Sheets

(58) Field of Classification Search
USPC .......................................................... 345/204
See application file for complete search history.

(56) References Cited

U.S. PATENT DOCUMENTS

| | | | |
|---|---|---|---|
| 2022/0343851 | A1 | 10/2022 | Kuang et al. |
| 2022/0351666 | A1* | 11/2022 | Dong ....................... G09G 3/20 |
| 2024/0164159 | A1* | 5/2024 | Ma ....................... H10K 77/111 |
| 2024/0381714 | A1* | 11/2024 | Lu ........................... H01L 22/00 |

FOREIGN PATENT DOCUMENTS

| | | | |
|---|---|---|---|
| CN | 110060621 | A | 7/2019 |
| CN | 112289268 | A | 1/2021 |
| CN | 113785346 | A | 12/2021 |
| CN | 114664897 | A | 6/2022 |
| CN | 115294889 | A | 11/2022 |
| KR | 10-2009-0072877 | A | 7/2009 |
| KR | 10-2022-0096666 | A | 7/2022 |

* cited by examiner

DISPLAY PANEL HAVING MULTIPLEXING CIRCUITS IN A BEZEL REGION AND DISPLAY APPARATUS

CROSS-REFERENCE TO RELATED APPLICATIONS

The present application is a U.S. National Phase Entry of International Application No. PCT/CN2024/089513 having an international filing date of Apr. 24, 2024, which claims priority to Chinese Patent Application No. 202310612612.5, filed to the CNIPA on May 26, 2023, contents of the above-identified applications should be construed as being incorporated into the present application by reference.

TECHNICAL FIELD

The present disclosure relates to, but is not limited to, the field of display technologies, in particular to a display panel and a display apparatus.

BACKGROUND

An Organic light emitting Diode (OLED) is an active light emitting display device and has advantages such as self-luminescence, a wide viewing angle, a high contrast ratio, low power consumption, an extremely high response speed, etc. With continuous development of display technologies, a display apparatus in which an OLED is used as a light emitting device and signal control is performed by a Thin Film Transistor (TFT) has become a mainstream product in the field of display at present.

SUMMARY

The following is a summary of subject matters described herein in detail. This summary is not intended to limit the protection scope of claims.

Embodiments of the present disclosure provide a display panel and a display apparatus.

In one aspect, an embodiment provides a display panel including a base substrate, a plurality of sub-pixels, a plurality of data lines, and a multiplexing circuit. The base substrate includes a display region and a first bezel region located on at least one side of the display region. The plurality of sub-pixels and the plurality of data lines are located in the display region, and the plurality of data lines are connected with the plurality of sub-pixels and configured to provide data signals to the plurality of sub-pixels. The multiplexing circuit is located in the first bezel region and includes a plurality of multiplexing units. At least one multiplexing unit among the plurality of multiplexing units includes a plurality of multiplexing transistors. At least one multiplexing unit is electrically connected with a multiplexing data line, a plurality of multiplexing control lines, and a plurality of data lines, and is configured to provide a data signal transmitted by the multiplexing data line to the plurality of data lines under control of the plurality of multiplexing control lines. Multiplexing transistors of the plurality of multiplexing units are arranged in a plurality of rows and columns. A row of multiplexing transistors includes a plurality of multiplexing transistors arranged along a first direction, and a column of multiplexing transistors includes a plurality of multiplexing transistors arranged along a second direction. Among them, the first direction intersects with the second direction.

In some exemplary implementation modes, a column of multiplexing transistors includes a plurality of multiplexing transistors connected with a same multiplexing control line.

In some exemplary implementation modes, a column of multiplexing transistors includes a plurality of multiplexing transistors connected with a same multiplexing data line.

In some exemplary implementation modes, multiplexing transistors of the plurality of multiplexing units are arranged in three rows.

In some exemplary implementation modes, the at least one multiplexing unit includes two multiplexing transistors, the two multiplexing transistors are electrically connected with different multiplexing control lines and electrically connected with a same multiplexing data line; the two multiplexing transistors of the at least one multiplexing unit are arranged in a same row.

In some exemplary implementation modes, the plurality of multiplexing units include at least: a plurality of first multiplexing units, a plurality of second multiplexing units, and a plurality of third multiplexing units; multiplexing transistors of the plurality of first multiplexing units are arranged in a first row, multiplexing transistors of the plurality of second multiplexing units are arranged in a second row, and multiplexing transistors of the plurality of third multiplexing units are arranged in a third row. Among a first multiplexing unit, a second multiplexing unit, and a third multiplexing unit, multiplexing transistors electrically connected with a same multiplexing control line are arranged in a same column.

In some exemplary implementation modes, the plurality of sub-pixels include a first sub-pixel that emits light of a first color, a second sub-pixel that emits light of a second color, and a third sub-pixel that emits light of a third color. The first multiplexing unit is configured to provide a data signal to a plurality of first sub-pixels, the second multiplexing unit is configured to provide a data signal to a plurality of second sub-pixels, and the third multiplexing unit is configured to provide a data signal to a plurality of third sub-pixels.

In some exemplary implementation modes, the at least one multiplexing unit includes three multiplexing transistors, the three multiplexing transistors are electrically connected with different multiplexing control lines and electrically connected with a same multiplexing data line; the three multiplexing transistors of the at least one multiplexing unit are arranged in a same column.

In some exemplary implementation modes, the plurality of sub-pixels include a first sub-pixel that emits light of a first color, a second sub-pixel that emits light of a second color, and a third sub-pixel that emits light of a third color. The three multiplexing transistors of the at least one multiplexing unit are configured to provide data signals to the first sub-pixel, the second sub-pixel, and the third sub-pixel, respectively.

In some exemplary implementation modes, three multiplexing transistors of the at least one multiplexing unit are a seventh multiplexing transistor, an eighth multiplexing transistor, and a ninth multiplexing transistor. The seventh multiplexing transistor, the eighth multiplexing transistor, and the ninth multiplexing transistor located in the same column are disposed and staggered in the second direction.

In some exemplary implementation modes, a plurality of seventh multiplexing transistors are arranged in a first row, a plurality of eighth multiplexing transistors are arranged in a second row, and a plurality of ninth multiplexing transistors are arranged in a third row, and the first row, the second row, and the third row are sequentially disposed along a direction away from the display region.

In some exemplary implementation modes, multiplexing transistors of the plurality of multiplexing units are arranged in two rows.

In some exemplary implementation modes, the at least one multiplexing unit includes two multiplexing transistors, the two multiplexing transistors are electrically connected with a first multiplexing control line and a second multiplexing control line, respectively, and are electrically connected with a same multiplexing data line; the two multiplexing transistors of the at least one multiplexing unit are arranged in different rows and different columns.

In some exemplary implementation modes, multiplexing transistors located in an i-th column are all electrically connected with the first multiplexing control line, multiplexing transistors located in an (i+1)-th column are electrically connected with different multiplexing control lines, and multiplexing transistors located in an (i+2)-th column are all electrically connected with the second multiplexing control line, wherein i is an integer greater than 0.

In some exemplary implementation modes, the plurality of multiplexing units include at least a plurality of first multiplexing units, a plurality of second multiplexing units, and a plurality of third multiplexing units. The plurality of sub-pixels include a first sub-pixel that emits light of a first color, a second sub-pixel that emits light of a second color, and a third sub-pixel that emits light of a third color. The first multiplexing unit is configured to provide a data signal to a plurality of first sub-pixels, the second multiplexing unit is configured to provide a data signal to a plurality of second sub-pixels, and the third multiplexing unit is configured to provide a data signal to a plurality of third sub-pixels. Two multiplexing transistors of the first multiplexing unit are respectively located in an i-th column and an (i+1)-th column; two multiplexing transistors of the second multiplexing unit are respectively located in the i-th column and an (i+2)-th column; two multiplexing transistors of the third multiplexing unit are located in the (i+1)-th column and the (i+2)-th column, respectively.

In some exemplary implementation modes, the first bezel region includes at least: a first fanout region and a bending region disposed sequentially along a direction away from the display region; the multiplexing circuit is located in the first fanout region; the first fanout region includes a plurality of data leading-out lines and a plurality of multiplexing data lines; the bending region at least includes: a plurality of data bending connection lines. The multiplexing circuit is electrically connected with a plurality of data lines of the display region through the plurality of data leading-out lines, and is electrically connected with the plurality of multiplexing data lines, and the plurality of multiplexing data lines are electrically connected with the plurality of data bending connection lines.

In some exemplary implementation modes, the first bezel region includes at least a base substrate, and a semiconductor layer, a first conductive layer, a second conductive layer, and a third conductive layer disposed on the base substrate. The plurality of multiplexing data lines are alternately arranged on the first conductive layer and the second conductive layer. The plurality of data leading-out lines are alternately arranged on the first conductive layer and the second conductive layer.

In some exemplary implementation modes, the first bezel region further includes: a fourth conductive layer located on a side of the third conductive layer away from the base substrate; the plurality of data bending connection lines are located in the fourth conductive layer.

In another aspect, an embodiment provides a display apparatus, including the aforementioned display panel.

In another aspect, an embodiment provides a display panel including a base substrate, a plurality of sub-pixels, a plurality of data lines, and a multiplexing circuit. The base substrate includes a display region and a first bezel region located on at least one side of the display region. The plurality of sub-pixels and the plurality of data lines are located in the display region, and the plurality of data lines are connected with the plurality of sub-pixels and configured to provide data signals to the plurality of sub-pixels. The multiplexing circuit is located in the first bezel region and includes a plurality of multiplexing units. At least one multiplexing unit among the plurality of multiplexing units includes a plurality of multiplexing transistors. At least one multiplexing unit is electrically connected with one multiplexing data line, a multiplexing control lines, and a plurality of data lines, and is configured to provide a data signal transmitted by the multiplexing data line to the plurality of data lines under control of the a multiplexing control lines, wherein a is an integer greater than 1 and less than or equal to 3. A plurality of multiplexing transistors of the at least one multiplexing unit are located in a same row, or in a same column, or in different rows. Among them, a row of multiplexing transistors includes a plurality of multiplexing transistors arranged along a first direction, and a column of multiplexing transistors includes a plurality of multiplexing transistors arranged along a second direction, and the first direction intersects with the second direction.

In some exemplary implementation modes, a column of multiplexing transistors includes: a plurality of multiplexing transistors connected with a same multiplexing control line; or, a plurality of multiplexing transistors connected with a same multiplexing data line.

Other aspects of the present disclosure may be comprehended after drawings and detailed description are read and understood.

BRIEF DESCRIPTION OF DRAWINGS

Accompanying drawings are used for providing further understanding of technical solutions of the present disclosure, constitute a portion of the specification, and are used for explaining the technical solutions of the present disclosure together with the embodiments of the present disclosure, but do not constitute limitations on the technical solutions of the present disclosure. Shapes and sizes of one or more components in the drawings do not reflect actual scales, but are only intended to schematically describe contents of the present disclosure.

DETAILED DESCRIPTION

Figure 1:
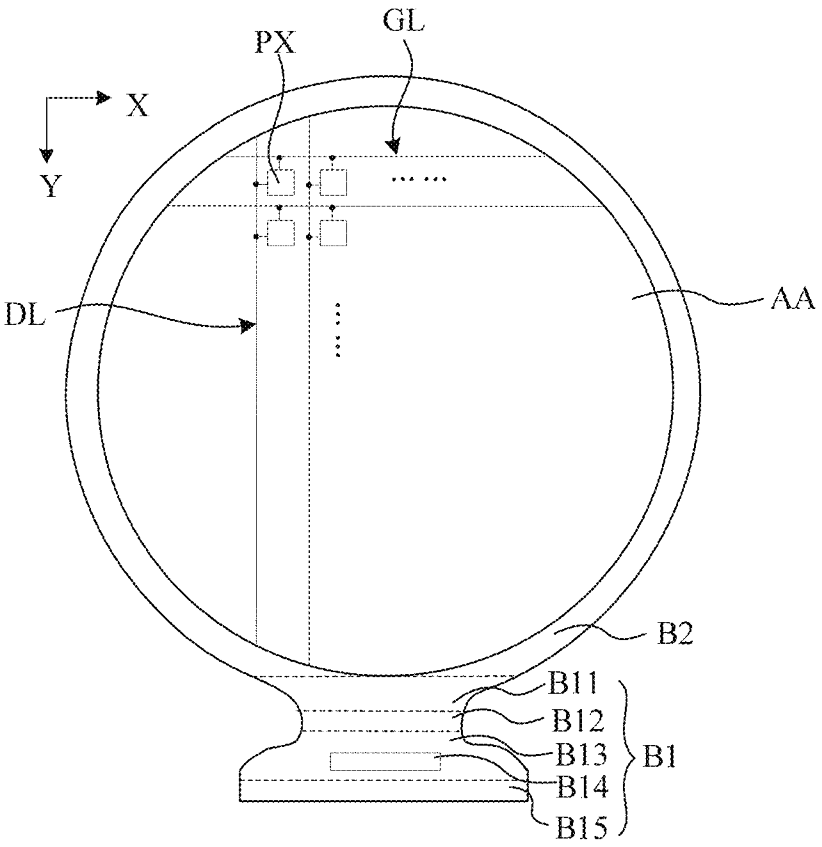
FIG. 1 is a schematic diagram of a display panel according to at least one embodiment of the present disclosure.

The embodiments of the present disclosure will be described below with reference to the drawings in detail. Implementation modes may be implemented in multiple different forms. Those of ordinary skills in the art will readily understand a fact that modes and contents may be transformed into a variety of forms without departing from the purpose and scope of the present disclosure. Therefore, the present disclosure should not be explained as being limited to the contents recorded in the following implementation modes only. The embodiments and features in the embodiments of the present disclosure may be randomly combined with each other if there is no conflict.

In the drawings, a size of one or more constituent elements, a thickness of a layer, or a region is sometimes exaggerated for clarity. Therefore, one mode of the present disclosure is not necessarily limited to the size, and a shape and a size of one or more components in the drawings do not reflect an actual scale. In addition, the accompanying drawings schematically illustrate ideal examples, and one mode of the present disclosure is not limited to shapes, numerical values, or the like shown in the drawings.

Ordinal numerals "first", "second", "third", etc., in the specification are set not to form limits in numbers but only to avoid confusion between constituent elements. In the present disclosure, "plurality" represents two or more than two.

In the specification, for convenience, expressions "central", "above", "below", "front", "back", "vertical", "horizontal", "top", "bottom", "inside", "outside", etc., for indicating directional or positional relationships are used to illustrate positional relationships between the constituent elements with reference to the accompanying drawings, not to indicate or imply that involved apparatuses or elements are required to have specific orientations or are structured and operated in the specific orientations but only to easily describe the specification and simplify the description, and thus should not be understood as limitations on the present disclosure. The positional relationships between the constituent elements may be changed as appropriate based on a direction according to which each constituent element is described. Therefore, appropriate replacements based on situations are allowed, which is not limited to the expressions in the specification.

In the specification, unless otherwise explicitly specified and defined, terms "mounting", "coupling", and "connection" should be understood in a broad sense. For example, it may be a fixed connection, a detachable connection, or an integral connection; it may be a mechanical connection or a connection; it may be a direct connection, an indirect connection through a middleware, or internal communication inside two elements. Those of ordinary skills in the art may understand meanings of the aforementioned terms in the present disclosure according to situations.

In the specification, a transistor refers to an element that at least includes three terminals, i.e., a gate electrode, a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. In the specification, the channel region refers to a region through which a current mainly flows.

In the specification, a first electrode may be a drain electrode, and a second electrode may be a source electrode. Or, the first electrode may be a source electrode, and the second electrode may be a drain electrode. In a case that transistors with opposite polarities are used, or in a case that a direction of a current changes during operation of a circuit, or the like, functions of the "source electrode" and the "drain electrode" are sometimes interchangeable. Therefore, the "source electrode" and the "drain electrode" are interchangeable in the specification.

In the specification, a "connection" includes a case where constituent elements are connected together through an element with a certain electrical action. The "element with a certain electrical action" is not particularly limited as long as electrical signals between the connected constituent elements may be transmitted. Examples of the "element with a certain electrical action" not only include an electrode and a wiring, but also include a switching element such as a transistor, a resistor, an inductor, a capacitor, another element with various functions, etc.

In the specification, "parallel" refers to a state in which an angle formed by two straight lines is above −10° and below 10°, and thus may include a state in which the angle is above −5° and below 5°. In addition, "perpendicular" refers to a state in which an angle formed by two straight lines is above 80° and below 100°, and thus may include a state in which the angle is above 85° and below 95°.

In the present disclosure, "about" and "substantially" refer to that a boundary is not defined strictly and a case within a range of process and measurement errors is allowed.

In the present specification, "A extends along a B direction" means that A may include a main portion and a secondary portion connected with the main portion, the main portion is a line, a line segment, or a strip-shaped body, the main portion extends along the B direction, and a length of the main portion extending along the B direction is greater than a length of the secondary portion extending along another direction. "A extends along a B direction" mentioned in the present specification always means "a main portion of A extends along a B direction".

"A and B are of a same layer structure" mentioned in the present specification means that A and B are formed simultaneously through a same patterning process. A "same layer" does not always mean that thicknesses of layers or heights of layers are the same in a section diagram. "An orthographic projection of A contains an orthographic projection of B" means that the orthographic projection of B falls within a range of the orthographic projection of A, or the orthographic projection of A covers the orthographic projection of B.

With development of display technologies, increasing a screen-to-body ratio and reducing a bezel size is an important direction of improvement. In a current display panel, a multiplexing circuit (MUX) is usually disposed to reduce a quantity of data lines, thereby reducing space required for a data leading-out line in a bezel region to reduce a bezel size. Usually, for the multiplexing circuit, a 1:6 design may be adopted (that is, a single multiplexing unit provides data signals to multiple data lines under control of six multiplexing control lines), and bezel space of the display panel (such as a display panel of a wearable product) is limited, and a layout form of the multiplexing circuit is relatively fixed. However, for a display product that requires a relatively high refresh rate, a conventional multiplexing circuit with a 1:6 design will affect a display effect of a display product that requires a high refresh rate.

The embodiments provide a display panel and a display apparatus, a multiplexing circuit satisfying a high refresh rate requirement of a display product may be arranged in a display panel with limited bezel space, thereby achieving a layout design of the multiplexing circuit suitable for the high refresh rate requirement.

An embodiment provides a display panel including a base substrate, a plurality of sub-pixels, a plurality of data lines, and a multiplexing circuit. The base substrate includes a display region and a first bezel region located on at least one side of the display region. The plurality of sub-pixels and the plurality of data lines are located in the display region, and the plurality of data lines are connected with the plurality of sub-pixels and configured to provide data signals to the plurality of sub-pixels. The multiplexing circuit is located in the first bezel region and includes a plurality of multiplexing units. At least one multiplexing unit among the plurality of multiplexing units includes a plurality of multiplexing transistors. At least one multiplexing unit is electrically connected with a multiplexing data line, a plurality of multiplexing control lines, and a plurality of data lines, and is configured to provide a data signal transmitted by the multiplexing data line to the plurality of data lines under control of the plurality of multiplexing control lines. Multiplexing transistors of the plurality of multiplexing units are arranged in a plurality of rows and columns. A row of multiplexing transistors includes a plurality of multiplexing transistors arranged in a first direction, and a column of multiplexing transistors includes a plurality of multiplexing transistors arranged in a second direction. Among them, the first direction intersects with the second direction. For example, the first direction may be perpendicular to the second direction.

In the display panel provided by the embodiment, by arranging the multiplexing transistors of the multiplexing circuit in an array, the multiplexing circuit suitable for a high refresh rate requirement may be arranged in a bezel region with limited space.

In some exemplary implementation modes, a column of multiplexing transistors may include a plurality of multiplexing transistors connected with a same multiplexing control line. In this example, by arranging a plurality of multiplexing transistors connected with the same multiplexing control line in a column, it is advantageous to reduce occupied space of the multiplexing circuit in the first direction.

In some exemplary implementation modes, a column of multiplexing transistors may include a plurality of multiplexing transistors connected with a same multiplexing data line. In this example, by arranging a plurality of multiplexing transistors connected with the same multiplexing data line in a column, it is advantageous to reduce occupied space of the multiplexing circuit in the first direction. For example, at least one multiplexing unit may include three multiplexing transistors electrically connected with different multiplexing control lines and electrically connected with a same multiplexing data line; the three multiplexing transistors of the at least one multiplexing unit may be arranged in a same column.

In some exemplary implementation modes, multiplexing transistors of a multiplexing circuit may be arranged in three rows. The embodiment is not limited thereto. In other examples, multiplexing transistors of the multiplexing circuit may be arranged in two or more rows, such as six rows.

In some exemplary implementation modes, at least one multiplexing unit includes two multiplexing transistors electrically connected with different multiplexing control lines and electrically connected with a same multiplexing data line. The two multiplexing transistors of the multiplexing unit may be arranged in a same row. In some examples, the plurality of multiplexing units may include at least a plurality of first multiplexing units, a plurality of second multiplexing units, and a plurality of third multiplexing units. Multiplexing transistors of the plurality of first multiplexing units may be arranged in a first row, multiplexing transistors of the plurality of second multiplexing units may be arranged in a second row, and multiplexing transistors of the plurality of third multiplexing units may be arranged in a third row. Multiplexing transistors electrically connected with a same multiplexing control line in a first multiplexing unit, a second multiplexing unit, and a third multiplexing unit may be arranged in a same column. For example, gates of a plurality of multiplexing transistors in a column of multiplexing transistors may be of an interconnected integral structure. An arrangement mode of this example is advantageous in reducing occupied space of the multiplexing circuit in the first direction.

In some exemplary implementation modes, the plurality of sub-pixels may include a first sub-pixel that emits light of a first color, a second sub-pixel that emits light of a second color, and a third sub-pixel that emits light of a third color. The first multiplexing unit may be configured to provide data signals to a plurality of first sub-pixels, the second multiplexing unit may be configured to provide data signals to a plurality of second sub-pixels, and the third multiplexing unit may be configured to provide data signals to a plurality of third sub-pixels. For the multiplexing circuit of this example, a 1:2 design may be adopted to provide data signals to the plurality of sub-pixels, wherein a single multiplexing unit may provide data signals to adjacent sub-pixels of a same color, which may not only reduce load of the data signals, but also facilitate achievement of a high refresh rate requirement.

Solutions of the embodiment will be described below through a plurality of examples.

FIG. 1 is a schematic diagram of a display panel according to at least one embodiment of the present disclosure. In some examples, as shown in FIG. 1, the display panel may include a display region AA, a first bezel region B1 located on a side of the display region AA, and a second bezel region B2 located on a remaining side of the display region AA. The first bezel region B1 may be communicated with the second bezel region B2. For example, the first bezel region B1 may be a lower bezel of the display panel, and the second bezel region B2 may include remaining bezel regions of the display panel other than the lower bezel.

In some examples, as shown in FIG. 1, the display region AA may be a planar region including a plurality of sub-pixels PX forming a pixel array, the plurality of sub-pixels PX may be configured to display a dynamic picture or a static image. The display region AA may be referred to as an active region (Active Area). In some examples, the display region AA may be in a shape of a circle or an oval. However, the embodiment is not limited thereto. For example, the display region may be in another shape such as a shape of a rectangle. In some examples, the display panel may be a flexible panel, and accordingly the display panel may be deformable, for example, may be crimped, bent, folded, or curled.

In some examples, as shown in FIG. 1, the display region AA may include a display structure layer disposed on a base substrate, or may include a display structure layer and a touch structure layer disposed sequentially on the base substrate. For example, in the display panel, a touch structure may be integrated to form a structure of Touch on Thin film Encapsulation (Touch on TFE for short). The structure of Touch on TFE mainly includes a Flexible Multi-Layer On Cell (FMLOC) structure and a Flexible Single-Layer On Cell (FSLOC) structure. The FMLOC structure is based on a working principle of mutual capacitance detection. Generally, a drive (Tx) electrode and a sensing (Rx) electrode are formed by using two layers of metal, and a drive chip (Integrated Circuit (IC)) achieves a touch action by detecting mutual capacitance between the drive electrode and the sensing electrode. The FSLOC structure is based on a working principle of self-capacitance (or voltage) detection. Generally, a touch electrode is formed by using a single layer of metal, and an integrated circuit achieves a touch action by detecting a self-capacitance (or voltage) of the touch electrode.

In some examples, the display structure layer may include a plurality of sub-pixels PX, a plurality of gate lines GL, and a plurality of data lines DL. The plurality of gate lines GL may extend in a first direction X, and the plurality of data lines DL may extend in a second direction Y. Orthographic projections of the multiple gate lines GL and the multiple data lines DL on the base substrate may intersect to form multiple sub-pixel regions. One sub-pixel PX may be disposed within one sub-pixel region. The plurality of data lines DL may be electrically connected with the plurality of sub-pixels PX and the plurality of data lines DL may be configured to provide data signals to the plurality of sub-pixels PX. The plurality of gate lines GL may be electrically connected with the plurality of sub-pixels PX and the plurality of gate lines GL may be configured to provide gate drive signals to the plurality of sub-pixels PX. For example, the gate drive signals may include a scan signal, or may include a scan signal and a light emitting control signal, or may include a scan signal, a reset control signal, and a light emitting control signal.

In some examples, as shown in FIG. 1, the first direction X may be an extension direction (e.g., a row direction) of the gate lines GL in the display region AA, and the second direction Y may be an extension direction (e.g., a column direction) of the data lines DL in the display region AA. The first direction X and the second direction Y may intersect with each other, for example, they may be perpendicular to each other.

Figure 2:
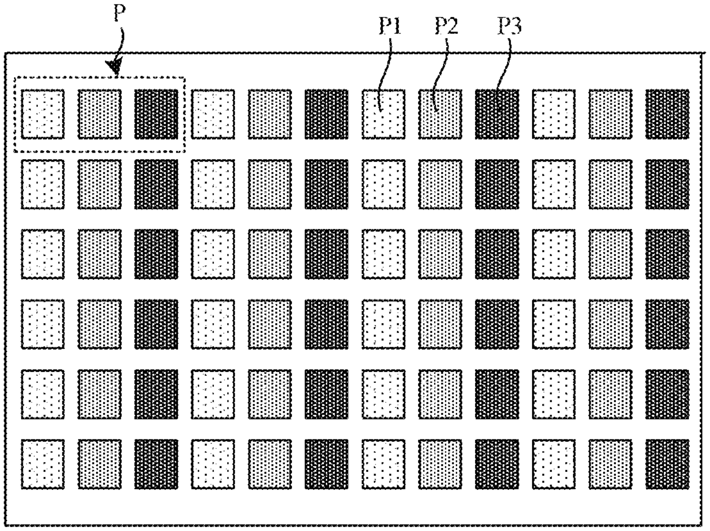
FIG. 2 is a schematic diagram of a plane structure of a display panel according to at least one embodiment of the present disclosure.

FIG. 2 is a schematic diagram of a plane structure of a display panel according to at least one embodiment of the present disclosure. In some examples, as shown in FIG. 2, one pixel unit P of a display region AA may include three sub-pixels, and the three sub-pixels may be a first sub-pixel P1 that emits light of a first color (e.g., red light), a second sub-pixel P2 that emits light of a second color (e.g., green light), and a third sub-pixel P3 that emits light of a third color (e.g., blue light). However, the embodiment is not limited thereto. In some examples, one pixel unit may include four sub-pixels, which may be a sub-pixel emitting red light, a sub-pixel emitting green light, a sub-pixel emitting blue light, and a sub-pixel emitting white light, respectively. For another example, one pixel unit may include four sub-pixels, which may include one sub-pixel emitting red light, one sub-pixel emitting blue light, and two sub-pixels emitting green light.

In some examples, a shape of a sub-pixel may be a rectangle, a rhombus, a pentagon, or a hexagon. When one pixel unit includes three sub-pixels, the three sub-pixels may be arranged side by side horizontally, side by side vertically, or arranged in a manner of a Chinese character "id". When one pixel unit includes four sub-pixels, the four sub-pixels may be arranged side by side horizontally, side by side vertically, or in a manner to form a square. However, the embodiment is not limited thereto.

In some examples, one sub-pixel may include a pixel circuit and a light emitting element electrically connected with the pixel circuit. The pixel circuit may include multiple transistors and at least one capacitor. For example, the pixel circuit may have a 3T1C, 4T1C, 5T1C, 5T2C, 6T1C, 7T1C, or 8T1C structure. Among them, in the above circuit structures, T refers to a thin film transistor, C refers to a capacitor, a number before T represents a quantity of thin film transistors in the circuit, and a number before C represents a quantity of capacitors in the circuit. In some examples, multiple transistors in the pixel circuit may be P-type transistors or may be N-type transistors. Use of a same type of transistors in the pixel circuit may simplify a process flow, reduce process difficulties of the display panel, and improve a yield of products. In some other examples, the multiple transistors in the pixel circuit may include a P-type transistor and an N-type transistor.

In some examples, low temperature poly silicon thin film transistors, or oxide thin film transistors, or both a low temperature poly silicon thin film transistor and an oxide thin film transistor may be adopted for the plurality of transistors in the pixel circuit. Low Temperature Poly Silicon (LTPS) is adopted for an active layer of a low temperature poly silicon thin film transistor and an oxide semiconductor (Oxide) is adopted for an active layer of an oxide thin film transistor. The low temperature poly silicon thin film transistor has advantages such as a high migration rate and fast charging, and the oxide thin film transistor has advantages such as a low leakage current. The low temperature poly silicon thin film transistor and the oxide thin film transistor are integrated on one display panel, that is, an LTPS+Oxide (LTPO for short) display panel, so that advantages of both the low temperature poly silicon thin film transistor and the oxide thin film transistor may be utilized, low-frequency drive may be achieved, power consumption may be reduced, and display quality may be improved.

In some examples, the light emitting element may be any one of a Light Emitting Diode (LED), an Organic Light Emitting Diode (OLED), a Quantum dot Light Emitting Diode (QLED), a micro LED (including: mini-LED or micro-LED), and the like. For example, the light emitting element may be an OLED, and the light emitting element may emit red light, green light, blue light, or white light, or the like under drive of a pixel circuit corresponding to the light emitting element. A color of light emitted by the light emitting element may be determined as needed. In some examples, the light emitting element may include an anode, a cathode, and an organic emitting layer located between the anode and the cathode. The anode of the light emitting element may be electrically connected with a corresponding pixel circuit. However, the embodiment is not limited thereto.

Figure 3:
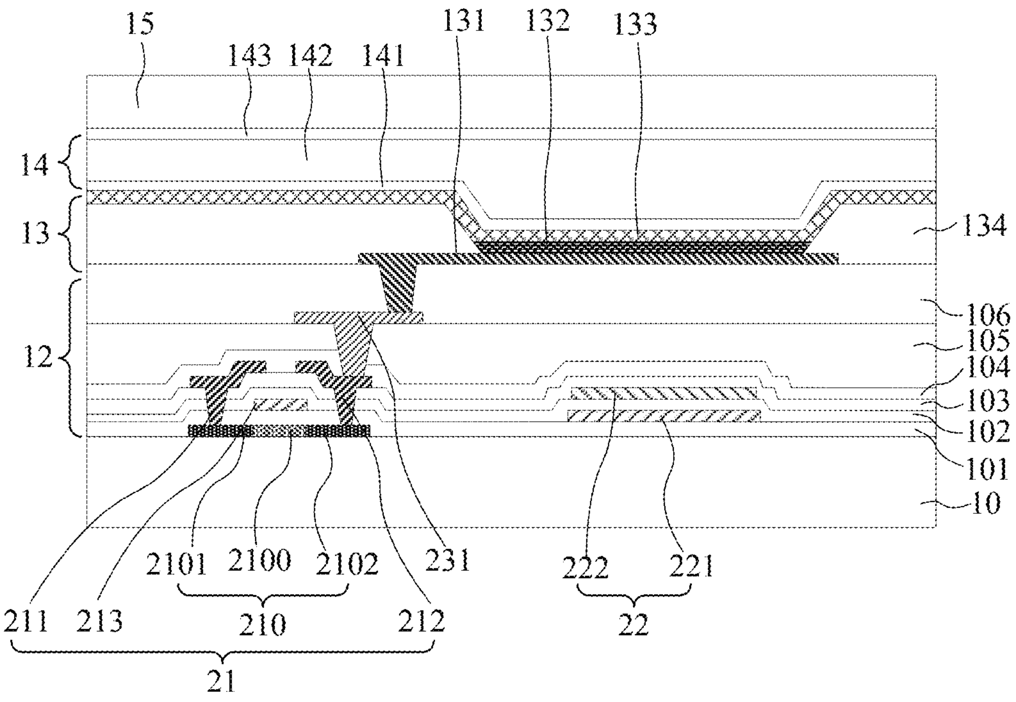
FIG. 3 is a schematic partial cross-sectional view of a display region of a display panel according to at least one embodiment of the present disclosure.

FIG. 3 is a schematic partial cross-sectional view of a display region of a display panel according to at least one embodiment of the present disclosure. FIG. 3 is illustrated by taking a structure of one sub-pixel of the display region as an example. In this example, description is given by taking a case that a plurality of transistors in a pixel circuit are of a same type as an example. For example, low temperature poly silicon thin film transistors or oxide thin film transistors may be adopted for all multiple transistors in a pixel circuit.

In some examples, as shown in FIG. 3, in a direction perpendicular to the display panel, the display region of the display panel may include a base substrate 10, and a circuit structure layer 12, a light emitting structure layer 13, an encapsulation structure layer 14, and a touch structure layer 15 that are sequentially disposed on the base substrate 10. Among them, the display structure layer may include at least the circuit structure layer 12 and the light emitting structure layer 13. The circuit structure layer 12 may include at least pixel circuits of a plurality of sub-pixels, and a pixel circuit of each sub-pixel may include a plurality of transistors and at least one capacitor. The light emitting structure layer 13 may include at least light emitting elements of a plurality of sub-pixels.

In some examples, FIG. 3 is illustrated by taking a thin film transistor 21 and a capacitor 22 included in each sub-pixel as an example. In some examples, the circuit structure layer 12 of the display region may include a semiconductor layer, a first conductive layer, a second conductive layer, a third conductive layer, and a fourth conductive layer disposed on the base substrate 10. A first insulation layer 101 may be disposed between the semiconductor layer and the first conductive layer, a second insulation layer 102 may be disposed between the first conductive layer and the second conductive layer, a third insulation layer 103 may be disposed between the second conductive layer and the third conductive layer, a fourth insulation layer 104 and a fifth insulation layer 105 may be disposed between the third conductive layer and the fourth conductive layer, and a sixth insulation layer 106 may be disposed on a side of the fourth conductive layer away from the base substrate 10. Among them, the first insulation layer 101, the second insulation layer 102, the third insulation layer 103, and the fourth insulation layer 104 may be inorganic insulation layers, and the fifth insulation layer 105 and the sixth insulation layer 106 may be organic insulation layers. However, the embodiment is not limited thereto. In some other examples, a side of the semiconductor layer close to the base substrate may also be provided with a buffer layer, which may prevent harmful substances in the base substrate from intruding into interior of the display panel, and may also increase adhesion of a film layer in the display panel on the base substrate. In some other examples, the fourth insulation layer may be omitted between the third conductive layer and the fourth conductive layer and only the fifth insulation layer is disposed, or, the fifth insulation layer may be omitted between the third conductive layer and the fourth conductive layer and only the fourth insulation layer is disposed.

In some examples, as shown in FIG. 3, the semiconductor layer of the display region may include at least an active layer 210 of the thin film transistor 21. The active layer 210 of the thin film transistor 21 may include a first region 2101, a second region 2102, and a channel region 2100 located between the first region 2101 and the second region 2102. The first conductive layer may include at least a gate 213 of the thin film transistor 21 and a first electrode plate 221 of the capacitor 22. An orthographic projection of the gate 213 of the thin film transistor 21 on the base substrate 10 may cover an orthographic projection of the channel region 2100 of the active layer 210 on the base substrate 10. The second conductive layer may at least include a second electrode plate 222 of the capacitor 22. Orthographic projections of the second electrode plate 222 and the first electrode plate 221 of the capacitor 22 on the base substrate 10 may be at least partially overlapped, for example, the two may coincide. The third conductive layer may include at least a source electrode 211 and a drain electrode 212 of the thin film transistor 21. The third insulation layer 103 may be provided with a plurality of vias (for example, including a first pixel via and a second pixel via) in the display region, and the third insulation layer 103, the second insulation layer 102, and the first insulation layer 101 within the first pixel via may be removed to expose at least a part of a surface of the first region 2101 of the active layer 210; the third insulation layer 103, the second insulation layer 102, and the first insulation layer 101 within the second pixel via may be removed to expose at least a part of a surface of the second region 2102 of the active layer 210. The source electrode 211 of the thin film transistor 21 may be electrically connected with the first region 2101 of the active layer 210 through the first pixel via, and the drain electrode 212 may be electrically connected with the second region 2102 of the active layer 210 through the second pixel via. The fourth conductive layer may include at least an anode connection electrode 231. The anode connection electrode 231 may be electrically connected with the drain electrode 212 of the thin film transistor 21 through a third pixel via opened in the sixth insulation layer 106. In some examples, a gate line of the display region may be located, for example, in a first conductive layer, and a data line and a high-potential power supply line of the display region may be located, for example, in a third conductive layer or a fourth conductive layer.

In some examples, as shown in FIG. 3, the light emitting structure layer 13 may include a pixel definition layer 134 and a plurality of light emitting elements. For example, each light emitting element may include a first electrode 131, an organic emitting layer 132, and a second electrode 133 which are stacked. The first electrode 131 of the light emitting element may be an anode, and the first electrode 131 may be disposed on the sixth insulation layer 106 and electrically connected with the anode connection electrode 231 through the third pixel via opened in the sixth insulation layer 106. The pixel definition layer 134 is disposed on the first electrode 131 and a second planarization layer 106, and the pixel definition layer 134 may be provided with a plurality of pixel openings, one pixel opening may expose at least portion of a surface of a corresponding first electrode 131. At least portion of the organic emitting layer 132 may be disposed within one pixel opening and connected with a corresponding first electrode 131. The second electrode 133 may be disposed on the organic emitting layer 132 and be connected with the organic emitting layer 132. The organic emitting layer 132 may emit light of a corresponding color under drive of the first electrode 131 and the second electrode 133.

In some examples, the organic emitting layer 132 of the light emitting element may include an Emitting Layer (EML), and include one or more film layers of following: a Hole Injection Layer (HIL), a Hole Transport Layer (HTL), a Hole Block Layer (HBL), an Electron Block Layer (EBL), an Electron Injection Layer (EIL), and an Electron Transport Layer (ETL). Under drive of voltages of the first electrode 131 and the second electrode 133, light may be emitted according to a required gray scale, in virtue of light emitting characteristics of an organic material.

In some examples, emitting layers of light emitting elements emitting light of different colors may be different. For example, a red light emitting element includes a red emitting layer, a green light emitting element includes a green emitting layer, and a blue light emitting element includes a blue emitting layer. In order to reduce a process difficulty and improve a yield, a common layer may be adopted for a hole injection layer and a hole transport layer located on one side of an emitting layer, and a common layer may be adopted for an electron injection layer and an electron transport layer located on the other side of the emitting layer. In some examples, any one or more layers of the hole injection layer, the hole transport layer, the electron injection layer, and the electron transport layer may be made through one process (one evaporation process or one inkjet printing process), and isolation may be achieved by means of a formed film layer surface segment difference or by means of a surface treatment. For example, any one or more of hole injection layers, hole transport layers, electron injection layers, and electron transport layers corresponding to adjacent sub-pixels may be isolated. In some examples, the organic emitting layer may be prepared and formed through evaporation using a Fine Metal Mask (FMM) or an open mask, or prepared and formed using an inkjet process.

In some examples, as shown in FIG. 3, the encapsulation structure layer 14 may include a first encapsulation layer 141, a second encapsulation layer 142, and a third encapsulation layer 143 which are stacked. Among them, the first encapsulation layer 141 and the third encapsulation layer 143 may be made of an inorganic material, the second encapsulation layer 142 may be made of an organic material, and the second encapsulation layer 142 may be disposed between the first encapsulation layer 141 and the third encapsulation layer 143 to ensure that external water vapor cannot enter the light emitting element. However, the embodiment is not limited thereto. For example, for the encapsulation structure layer, a five-layer stacked structure of inorganic/organic/inorganic/organic/inorganic may be adopted.

In some examples, the touch structure layer 15 may include a plurality of touch units. At least one touch unit may include at least one touch electrode. An orthographic projection of the at least one touch electrode on the base substrate may include orthographic projections of a plurality of sub-pixels on the base substrate. When the touch unit includes a plurality of touch electrodes, the plurality of touch electrodes may be disposed at intervals, and adjacent touch electrodes may be connected with each other through a connection portion. A touch electrode and the connection portion may be of a same layer structure. In some examples, the touch electrode may be in a shape of a rhombus, such as a regular rhombus, a horizontally long rhombus, or a longitudinally long rhombus. However, the embodiment is not limited thereto. In some examples, the touch electrode may be in any one or more shapes of a triangle, a square, a trapezoid, a parallelogram, a pentagon, a hexagon, and another polygon.

In some examples, as shown in FIG. 1, the first bezel region B1 may include a first fanout region B11, a bending region B12, a second fanout region B13, a first signal access region B14, and a second signal access region B15 disposed sequentially along a direction away from the display region AA. The first fanout region B11 may be communicated with the second bezel region B2 and be located on a side of the display region AA. For example, the first fanout region B11 may be provided with at least a first bezel power supply line, a second bezel power supply line, a plurality of display leading-out lines, and a plurality of touch leading-out lines. The first bezel power supply line may be configured to connect a first power supply line (e.g., a high-potential power supply line) of the display region AA. The second bezel power supply line may be configured to connect a second power supply line (e.g., a low-potential power supply line) within the second bezel region B2. The plurality of display leading-out lines may include a plurality of data leading-out lines and a plurality of drive leading-out lines. The plurality of data leading-out lines may be electrically connected with a plurality of data lines of the display region AA, for example, they may be electrically connected in a one-to-one correspondence. The plurality of drive leading-out lines may extend to the second bezel region B2 and be electrically connected with a gate drive circuit within the second bezel region B2, and may be configured to provide a control signal to the gate drive circuit, and for example, the control signal may include a start signal, a clock signal, or the like. The plurality of touch leading-out lines may extend from the second bezel region B2 to the first fanout region B11, and may be located on a side of the plurality of display leading-out lines away from the base substrate.

In some examples, as shown in FIG. 1, the bending region B12 may communicate with the first fanout region B11 and the second fanout region B13, and be located on a side of the first fanout region B11 away from the display region AA. The bending region B12 may be configured to enable the second fanout region B13, the first signal access region B14, and the second signal access region B15 to be bent to a back of the display region AA. The bending region B12 may be provided with a plurality of bending connection lines, and includes, for example, a plurality of data bending connection lines, a plurality of touch bending connection lines, and the like. For example, a plurality of bending connection lines within the bending region B12 may be disposed in a same layer, for example, located in the fourth conductive layer or the third conductive layer.

In some examples, as shown in FIG. 1, the second fanout region B13 may be located on a side of the bending region B12 away from the display region AA. The second fanout region B13 may be provided with, for example, a plurality of test circuits.

In some examples, as shown in FIG. 1, the first signal access region B14 may be located on a side of the second fanout region B13 away from the display region AA. The first signal access region B14 may also be referred to as a drive chip disposing region. The first signal access region B14 may be provided with a plurality of first contact pads (Bumps), and the plurality of first contact pads may be configured to be bonded and connected with at least one drive chip (Integrated Circuit (IC)). The drive chip may be configured to generate a drive signal for driving a sub-pixel, and may include, for example, a data signal.

In some examples, as shown in FIG. 1, the second signal access region B15 may be located on a side of the first signal access region B14 away from the display region AA. The second signal access region B15 may also be referred to as a circuit bonding region. The second signal access region B15 may be provided with a plurality of second contact pads. The plurality of second contact pads may be configured to be bonded and connected with at least one circuit board (e.g., Flexible Printed Circuit (FPC)). For example, an externally connected circuit board may be configured to generate a touch signal provided to a touch structure and to receive a touch sensing signal.

In some examples, the first fanout region B11 may also be provided with a multiplexing circuit. For example, the multiplexing circuit may be adjacent to the bending region B12. The multiplexing circuit may be electrically connected with the plurality of data lines of the display region AA through the plurality of data leading-out lines, and may be configured to transmit data signals to the plurality of data lines. The multiplexing circuit may also be electrically connected with a plurality of multiplexing data lines so as to be configured to receive a data signal transmitted by a drive chip disposed in the first signal access region B14. The plurality of multiplexing data lines may be electrically connected with the plurality of data bending connection lines of the bending region, the second fanout region may be also provided with a plurality of multiplexing data leading-out lines, and the plurality of multiplexing data leading-out lines are electrically connected with a plurality of data bending connection lines. The plurality of multiplexing data leading-out lines may be electrically connected with a plurality of first contact pads for transmitting data signals within the first signal access region B14. In some examples, the data signal provided by the drive chip may be sequentially transmitted to a data line of the display region through a multiplexing data leading-out line, a data bending connection line, a multiplexing data line, the multiplexing circuit, and a data leading-out line. The multiplexing circuit may provide data signals transmitted by M multiplexing data lines to N data lines, wherein M and N are both integers, and M is less than N. By disposing the multiplexing circuit, data signal transmission lines may be reduced, it is beneficial to reduce a size of a bezel, and a case that data signal lines of the drive chip are less may be supported, so that the drive chip may support supplying data signals to all data lines of the display region.

Figure 4:
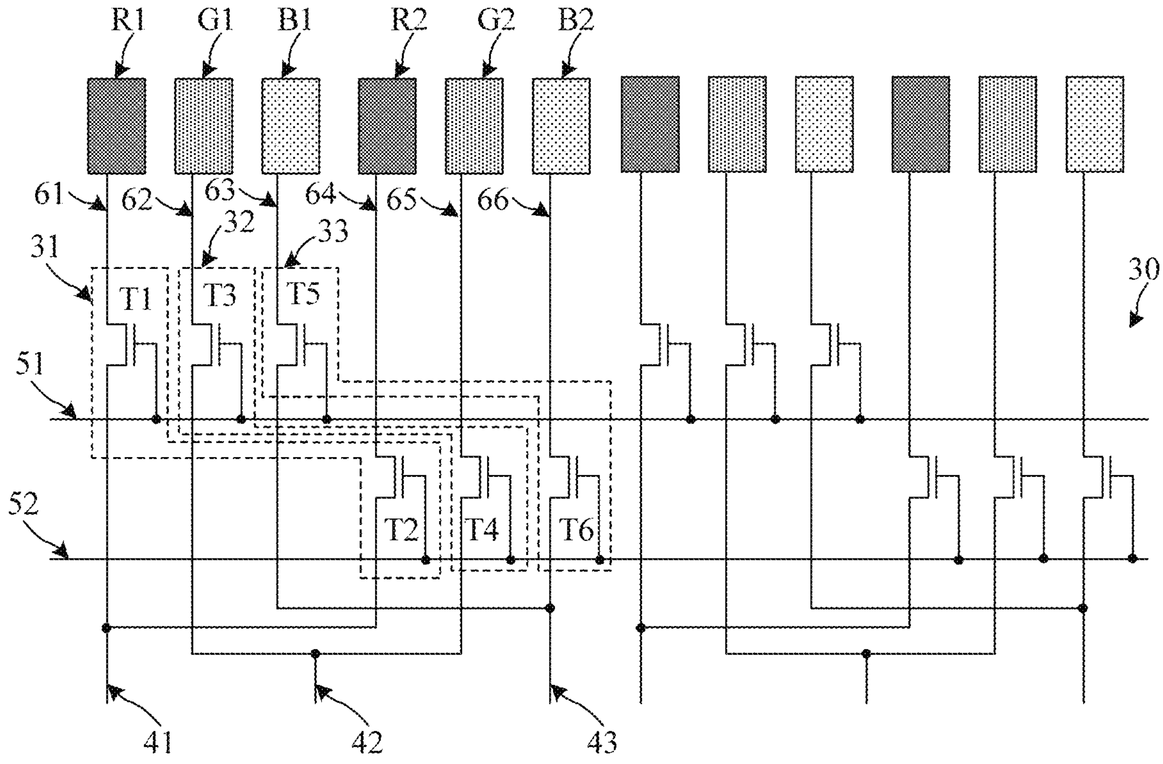
FIG. 4 is an equivalent circuit diagram of a multiplexing circuit according to at least one embodiment of the present disclosure.

FIG. 4 is an equivalent circuit diagram of a multiplexing circuit according to at least one embodiment of the present disclosure. In some examples, as shown in FIG. 4, a multiplexing circuit 30 may include a plurality of multiplexing units. One multiplexing unit may be configured to supply a data signal provided by one multiplexing data line to a plurality of data lines (e.g., two data lines).

In some examples, as shown in FIG. 4, one multiplexing unit may be electrically connected with two multiplexing control lines (e.g., including a first multiplexing control line 51 and a second multiplexing control line 52), one multiplexing data line, and a plurality of data lines (e.g., two data lines). Each multiplexing unit may include two multiplexing transistors. Two data lines connected by one multiplexing unit may be electrically connected with sub-pixels emitting light of a same color. A connection mode of the multiplexing unit of the example may effectively reduce a load of a data signal.

FIG. 4 is illustrated by taking six multiplexing units of the multiplexing circuit 30 as an example. Among them, three multiplexing units may be a group. A connection mode of each group of multiplexing units is similar, and following description is made by taking a group of multiplexing units as an example. In some examples, as shown in FIG. 4, a group of multiplexing units may include a first multiplexing unit 31, a second multiplexing unit 32, and a third multiplexing unit 33.

In some examples, as shown in FIG. 4, the first multiplexing unit 31 may include a first multiplexing transistor T1 and a second multiplexing transistor T2. A gate of the first multiplexing transistor T1 is electrically connected with a first multiplexing control line 51, a first electrode of the first multiplexing transistor T1 is electrically connected with the first multiplexing data line 41, and a second electrode of the first multiplexing transistor T1 is electrically connected with a first data line 61. The first data line 61 may be electrically connected with a column of first sub-pixels R1. A gate of the second multiplexing transistor T2 is electrically connected with a second multiplexing control line 52, a first electrode of the second multiplexing transistor T2 is electrically connected with the first multiplexing data line 41, and a second electrode of the second multiplexing transistor T2 is electrically connected with a fourth data line 64. The fourth data line 64 may be electrically connected with a column of first sub-pixels R2. One column of first sub-pixels R1 and one column of first sub-pixels R2 may emit light of a same color, for example, both emit red light.

In some examples, as shown in FIG. 4, the second multiplexing unit 32 may include a third multiplexing transistor T3 and a fourth multiplexing transistor T4. A gate of the third multiplexing transistor T3 is electrically connected with a first multiplexing control line 51, a first electrode of the third multiplexing transistor T3 is electrically connected with the second multiplexing data line 42, and a second electrode of the third multiplexing transistor T3 is electrically connected with a second data line 62. The second data line 62 may be electrically connected with a column of second sub-pixels G1. A gate of the fourth multiplexing transistor T4 is electrically connected with a second multiplexing control line 52, a first electrode of the fourth multiplexing transistor T4 is electrically connected with the second multiplexing data line 42, and a second electrode of the fourth multiplexing transistor T4 is electrically connected with a fifth data line 65. The fifth data line 65 may be electrically connected with a column of second sub-pixels G2. One column of second sub-pixels G1 and one column of second sub-pixels G2 may emit light of a same color, for example, both emit green light.

In some examples, as shown in FIG. 4, the third multiplexing unit 33 may include a fifth multiplexing transistor T5 and a sixth multiplexing transistor T6. A gate of the fifth multiplexing transistor T5 is electrically connected with a first multiplexing control line 51, a first electrode of the fifth multiplexing transistor T5 is electrically connected with the third multiplexing data line 43, and a second electrode of the fifth multiplexing transistor T5 is electrically connected with a third data line 63. The third data line 63 may be electrically connected with a column of third sub-pixels B1. A gate of the sixth multiplexing transistor T6 is electrically connected with a second multiplexing control line 52, a first electrode of the sixth multiplexing transistor T6 is electrically connected with the third multiplexing data line 43, and a second electrode of the sixth multiplexing transistor T6 is electrically connected with a sixth data line 66. The sixth data line 66 may be electrically connected with a column of third sub-pixels B2. One column of third sub-pixels B1 and one column of third sub-pixels B2 may emit light of a same color, for example, both emit blue light.

In some examples, a column of first sub-pixels R1, a column of second sub-pixels G1, a column of third sub-pixels B1, a column of first sub-pixels R2, a column of second sub-pixels G2, and a column of third sub-pixels B2 may be sequentially arranged along the first direction.

In this example, data signals received by adjacent monochromatic sub-pixels are controlled by a same multiplexing unit, which may effectively reduce a load of a data signal, and may enable a data voltage difference corresponding to sub-pixels of a same color in a same row to be smaller, so as to reduce power consumption. Moreover, a 1:2 design (that is, a design in which one multiplexing data line provides data signals to two data lines) is adopted for the multiplexing circuit, which may not only effectively reduce loads of data signals, but also help to achieve a requirement of a high refresh rate.

Figure 5:
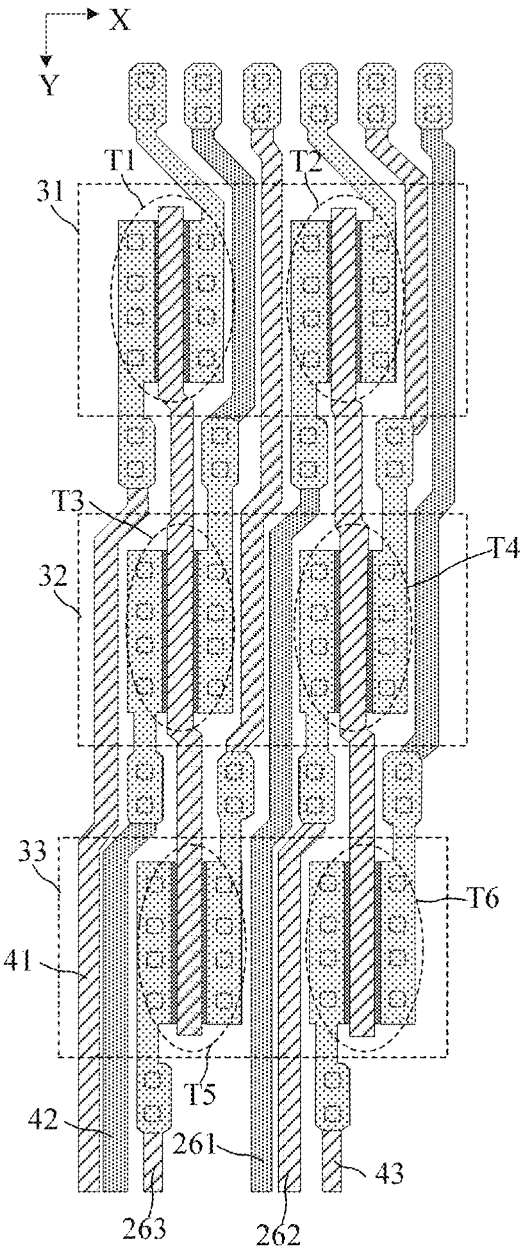
FIG. 5 is a partial plan view of a multiplexing circuit according to at least one embodiment of the present disclosure.

FIG. 5 is a partial plan view of a multiplexing circuit according to at least one embodiment of the present disclosure. FIG. 5 is illustrated by taking a local planar structure of a group of multiplexing units as an example. In this example, a first connection end of a trace is a connection end close to the display region, and a second connection end is a connection end far from the display region.

In some examples, as shown in FIG. 5, the first multiplexing unit 31 (including the first multiplexing transistor T1 and the second multiplexing transistor T2), the second multiplexing unit 32 (including the third multiplexing transistor T3 and the fourth multiplexing transistor T4), and the third multiplexing unit 33 (including the fifth multiplexing transistor T5 and the sixth multiplexing transistor T6) may be sequentially arranged along the second direction Y. For example, the third multiplexing unit 33 may be located on a side of the second multiplexing unit 32 away from the display region, and the second multiplexing unit 32 may be located on a side of the first multiplexing unit 31 away from the display region. An arrangement mode of the multiplexing circuits of the example may save installation space along the first direction X.

In some examples, as shown in FIG. 5, a plurality of multiplexing units include a plurality of multiplexing transistors, and the plurality of multiplexing transistors may be arranged in an array along a first direction X and a second direction Y. For example, the plurality of multiplexing transistors may be arranged in three rows. A row of multiplexing transistors may include a plurality of multiplexing transistors sequentially arranged along the first direction X, and a column of multiplexing transistors may include a plurality of multiplexing transistors sequentially arranged along the second direction Y. The first multiplexing transistor T1 and the second multiplexing transistor T2 of the first multiplexing unit 31 may be arranged sequentially along the first direction X. The first multiplexing transistor T1 and the second multiplexing transistor T2 may be alternately arranged in one row along the first direction X. The third multiplexing transistor T3 and the fourth multiplexing transistor T4 of the second multiplexing unit 32 may be arranged sequentially along the first direction X. The third multiplexing transistor T3 and the fourth multiplexing transistor T4 may be alternately arranged in one row along the first direction X. The fifth multiplexing transistor T5 and the sixth multiplexing transistor T6 of the third multiplexing unit 33 may be arranged sequentially along the first direction X. The fifth multiplexing transistor T5 and the sixth multiplexing transistor T6 may be alternately arranged in one row along the first direction X. In the example, a plurality of first multiplexing units 31 may be arranged in one row, a plurality of second multiplexing units 32 may be arranged in one row, and a plurality of third multiplexing units 33 may be arranged in one row. One first multiplexing unit 31, one second multiplexing unit 32, and one third multiplexing unit 33 may be arranged in one column.

In some examples, as shown in FIG. 5, the first multiplexing transistor T1 of the first multiplexing unit 31, the third multiplexing transistor T3 of the second multiplexing unit 32, and the fifth multiplexing transistor T5 of the third multiplexing unit 33 may be arranged in one column along the second direction Y, and the second multiplexing transistor T2 of the first multiplexing unit 31, the fourth multiplexing transistor T4 of the second multiplexing unit 32, and the sixth multiplexing transistor T6 of the third multiplexing unit 33 may be arranged in one column along the second direction Y.

In some examples, as shown in FIG. 5, in a direction perpendicular to the display panel, the first bezel region may include at least a base substrate, and a semiconductor layer, a first conductive layer, a second conductive layer, and a third conductive layer disposed on the base substrate. Among them, a first insulation layer may be disposed between the semiconductor layer and the first conductive layer. A second insulation layer may be disposed between the first conductive layer and the second conductive layer. A third insulation layer may be disposed between the second conductive layer and the third conductive layer.

Figure 6:
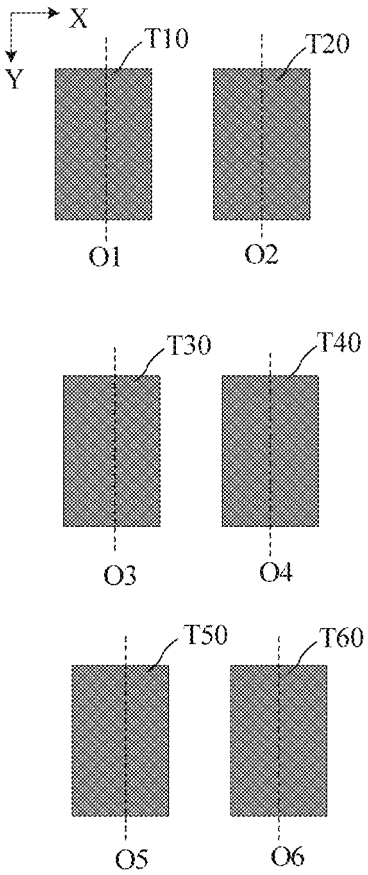
FIG. 6 is a schematic diagram of a display panel after a semiconductor layer is formed in FIG. 5.

FIG. 6 is a schematic diagram of a display panel after a semiconductor layer is formed in FIG. 5. In some examples, as shown in FIGS. 5 and 6A, the semiconductor layer of the first bezel region may include at least active layers of multiple multiplexing transistors of multiple multiplexing units of a multiplexing circuit, for example, include an active layer T10 of the first multiplexing transistor T1 and an active layer T20 of the second multiplexing transistor T2 of the first multiplexing unit 31, an active layer T30 of the third multiplexing transistor T3 and an active layer T40 of the fourth multiplexing transistor T4 of the second multiplexing unit 32, an active layer T50 of the fifth multiplexing transistor T5 and an active layer T60 of the sixth multiplexing transistor T6 of the third multiplexing unit 33.

In some examples, as shown in FIG. 6, shapes and sizes of orthographic projections of the active layer T10 of the first multiplexing transistor and the active layer T20 of the second multiplexing transistor of the first multiplexing unit, the active layer T30 of the third multiplexing transistor and the active layer T40 of the fourth multiplexing transistor of the second multiplexing unit, the active layer T50 of the fifth multiplexing transistor and the active layer T60 of the sixth multiplexing transistor of the third multiplexing unit on the base substrate may be substantially the same, for example, the orthographic projections may be substantially rectangular in shape with a same size. However, the embodiment is not limited thereto.

In some examples, as shown in FIG. 6, the active layer T10 of the first multiplexing transistor and the active layer T20 of the second multiplexing transistor may be arranged in alignment along the first direction X, the active layer T30 of the third multiplexing transistor and the active layer T40 of the fourth multiplexing transistor may be arranged in alignment along the first direction X, and the active layer T50 of the fifth multiplexing transistor and the active layer T60 of the sixth multiplexing transistor may be arranged in alignment along the first direction X.

In some examples, as shown in FIG. 6, the active layer T10 of the first multiplexing transistor, the active layer T30 of the third multiplexing transistor, and the active layer T50 of the fifth multiplexing transistor may be sequentially arranged along the second direction Y. The active layer T10 of the first multiplexing transistor has a first centerline O1, the active layer T30 of the third multiplexing transistor has a third centerline O3, and the active layer T50 of the fifth multiplexing transistor has a fifth centerline O5. The first centerline O1, the third centerline O3, and the fifth centerline O5 may all be parallel to the second direction Y. The third centerline O3 of the active layer T30 of the third multiplexing transistor may be located on a side of the first centerline O1 of the active layer T10 of the first multiplexing transistor in the first direction X, and the fifth centerline O5 of the active layer T50 of the fifth multiplexing transistor may be located on a side of the third centerline O3 of the active layer T30 of the third multiplexing transistor in the first direction X. In the first direction X, a distance between the third centerline O3 and the first centerline O1 may be substantially the same as a distance between the third centerline O3 and the fifth centerline O5. However, the embodiment is not limited thereto. For example, in the first direction X, the distance between the third centerline O3 and the first centerline O1 may be smaller or larger than the distance between the third centerline O3 and the fifth centerline O5.

In some examples, as shown in FIG. 6, the active layer T20 of the second multiplexing transistor, the active layer T40 of the fourth multiplexing transistor, and the active layer T60 of the sixth multiplexing transistor may be sequentially arranged along the second direction Y. The active layer T20 of the second multiplexing transistor may have a second centerline O2, the active layer T40 of the fourth multiplexing transistor may have a fourth centerline O4, and the active layer T60 of the sixth multiplexing transistor may have a sixth centerline O6. The second centerline O2, the fourth centerline O4, and the sixth centerline O6 may all be parallel to the second direction Y. The fourth centerline O4 may be located on a side of the second centerline O2 in the first direction X, and the sixth centerline O6 may be located on a side of the fourth centerline O4 in the first direction X. In the first direction X, a distance between the fourth centerline O4 and the second centerline O2 may be substantially the same as a distance between the fourth centerline O4 and the sixth centerline O6. The distance between the fourth centerline O4 and the second centerline O2 may be substantially the same as the distance between the third centerline O3 and the first centerline O1. However, the embodiment is not limited thereto.

In some examples, as shown in FIG. 6, in the first direction X, a distance between the fifth centerline O5 and the sixth centerline O6 may be smaller than a distance between the third centerline O3 and the fourth centerline O4, and the distance between the third centerline O3 and the fourth centerline O4 may be smaller than a distance between the first centerline O1 and the second centerline O2. However, the embodiment is not limited thereto. For example, a distance between two adjacent centerlines along the first direction X may be substantially the same.

In some examples, an active layer of each transistor may include: a first region, a second region, and a channel region located between the first region and the second region. An orthographic projection of the channel region of the active layer of the multiplexing transistor on the base substrate may be covered by an orthographic projection of a corresponding gate on the base substrate.

Figure 7A:
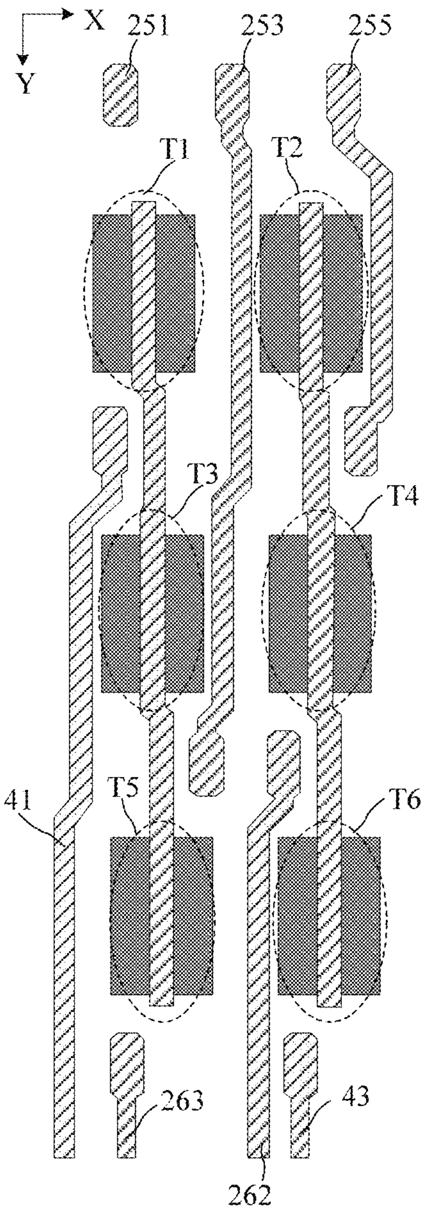
FIG. 7A is a schematic diagram of the display panel after a first conductive layer is formed in FIG. 5.
Figure 7B:
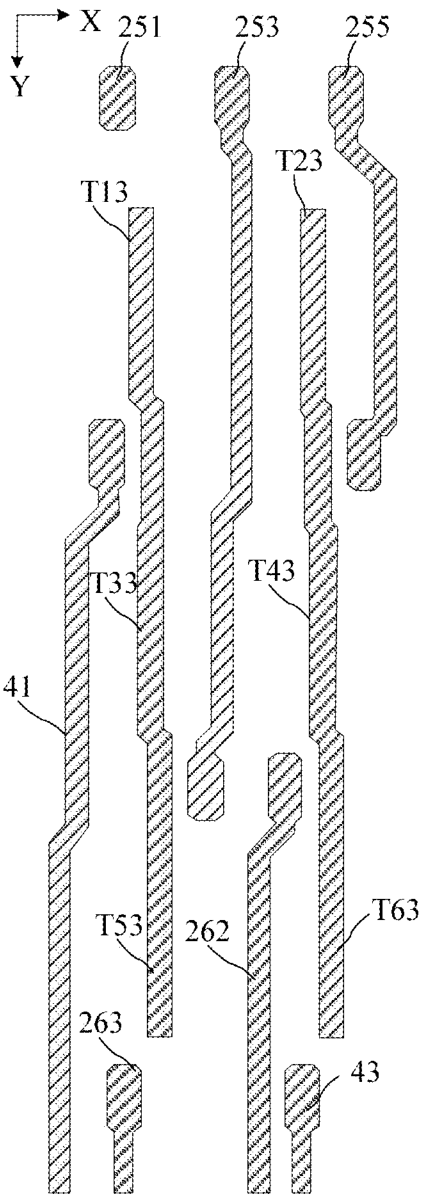
FIG. 7B is a schematic plan view of the first conductive layer in FIG. 7A.

FIG. 7A is a schematic diagram of the display panel after a first conductive layer is formed in FIG. 5. FIG. 7B is a schematic plan view of the first conductive layer in FIG. 7A. In some examples, as shown in FIGS. 7A and 7B, the first conductive layer of the first bezel region may include at least: gates of a plurality of multiplexing transistors (including, for example, a gate T13 of the first multiplexing transistor T1, a gate T23 of the second multiplexing transistor T2, a gate T33 of the third multiplexing transistor T3, a gate T43 of the fourth multiplexing transistor T4, a gate T53 of the fifth multiplexing transistor T5, and a gate T63 of the sixth multiplexing transistor T6) of a plurality of multiplexing units of the multiplexing circuit, a plurality of data leading-out lines (including, for example, a first data leading-out line 251, a third data leading-out line 253, and a fifth data leading-out line 255), a first multiplexing data line 41, a third multiplexing data line 43, a second multiplexing connection line 262, and a third multiplexing connection line 263.

In some examples, as shown in FIGS. 7A and 7B, the gate T13 of the first multiplexing transistor T1, the gate T33 of the third multiplexing transistor T3, and the gate T53 of the fifth multiplexing transistor T5 may all have substantially a strip-shaped structure extending along the second direction Y. The gate T13 of the first multiplexing transistor T1, the gate T33 of the third multiplexing transistor T3, and the gate T53 of the fifth multiplexing transistor T5 may be of an interconnected integral structure. The gate T23 of the second multiplexing transistor T2, the gate T43 of the fourth multiplexing transistor T4, and the gate T63 of the sixth multiplexing transistor T6 may each have a substantially strip-shaped structure extending along the second direction Y. The gate T23 of the second multiplexing transistor T2, the gate T43 of the fourth multiplexing transistor T4, and the gate T63 of the sixth multiplexing transistor T6 may be of an interconnected integral structure.

In some examples, the plurality of data leading-out lines may extend to one side of the display region so as to extend to be electrically connected with a plurality of data lines of the display region. As shown in FIG. 7B, the first data leading-out line 251, the third data leading-out line 253, and the fifth data leading-out line 255 may be arranged along the first direction X.

In some examples, as shown in FIGS. 7A and 7B, the first data leading-out line 251 may be located on a side of the active layer T10 of the first multiplexing transistor T1 away from the active layer T30 of the third multiplexing transistor T3 in the second direction Y. The third data leading-out line 253 may be at least located between the active layer T10 of the first multiplexing transistor T1 and the active layer T20 of the second multiplexing transistor T2 and between the active layer T30 of the third multiplexing transistor T3 and the active layer T40 of the fourth multiplexing transistor T4. One connection end of the third data leading-out line 253 may extend to be between the active layer T30 of the third multiplexing transistor T3 and the active layer T50 of the fifth multiplexing transistor T5, and may be close to the integral structure of the gate T33 of the third multiplexing transistor T3 and the gate T53 of the fifth multiplexing transistor T5. The fifth data leading-out line 255 may be located on a side of the active layer T20 of the second multiplexing transistor T2 away from the third data leading-out line 253. One connection end of the fifth data leading-out line 255 may be located between the active layer T20 of the second multiplexing transistor T2 and the active layer T40 of the fourth multiplexing transistor T4, and may be close to the integral structure of the gate T23 of the second multiplexing transistor T2 and the gate T43 of the fourth multiplexing transistor T4.

In some examples, as shown in FIGS. 7A and 7B, the first multiplexing data line 41 may substantially have a polyline shape extending along the second direction Y. The first multiplexing data line 41 may be located on a side of the active layer T30 of the third multiplexing transistor T3 and the active layer T50 of the fifth multiplexing transistor T5 away from the third data leading-out line 253. A first connection end of the first multiplexing data line 41 may be located between the active layer T10 of the first multiplexing transistor T1 and the active layer T30 of the third multiplexing transistor T3, and may be close to the integral structure of the gate T13 of the first multiplexing transistor T1 and the gate T33 of the third multiplexing transistor T3.

In some examples, the third multiplexing data line 43 may extend substantially along the second direction Y, and a first connection end of the third multiplexing data line 43 may be located on one side of the active layer T60 of the sixth multiplexing transistor T6 in the second direction Y.

In some examples, the third multiplexing connection line 263 may extend substantially along the second direction Y. A first connection end of the third multiplexing connection line 263 may be located on a side of the active layer T50 of the fifth multiplexing transistor T5 in the second direction Y.

In some examples, the second multiplexing connection line 262 may extend substantially along the second direction Y. The second multiplexing connection line 262 may be located between the active layer T50 of the fifth multiplexing transistor T5 and the active layer T60 of the sixth multiplexing transistor T6. A first connection end of the second multiplexing connection line 262 may be located between the active layer T40 of the fourth multiplexing transistor T4 and the active layer T60 of the sixth multiplexing transistor T6, and may be close to the integral structure of the gate T43 of the fourth multiplexing transistor T4 and the gate T63 of the sixth multiplexing transistor T6. The second multiplexing connection line 262 and the third multiplexing data line 43 may be adjacent to each other.

Figure 8A:
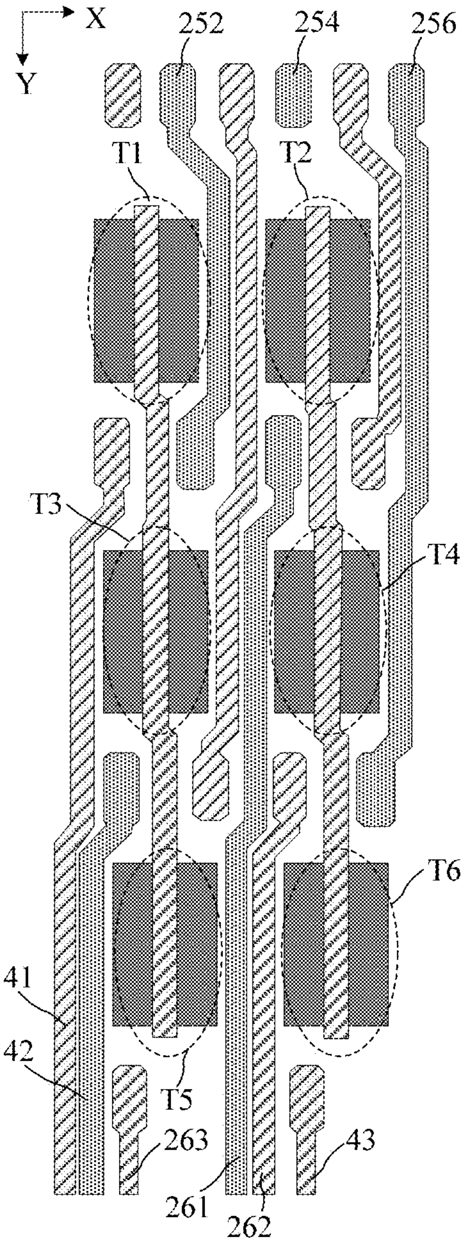
FIG. 8A is a schematic diagram of the display panel after a second conductive layer is formed in FIG. 5.
Figure 8B:
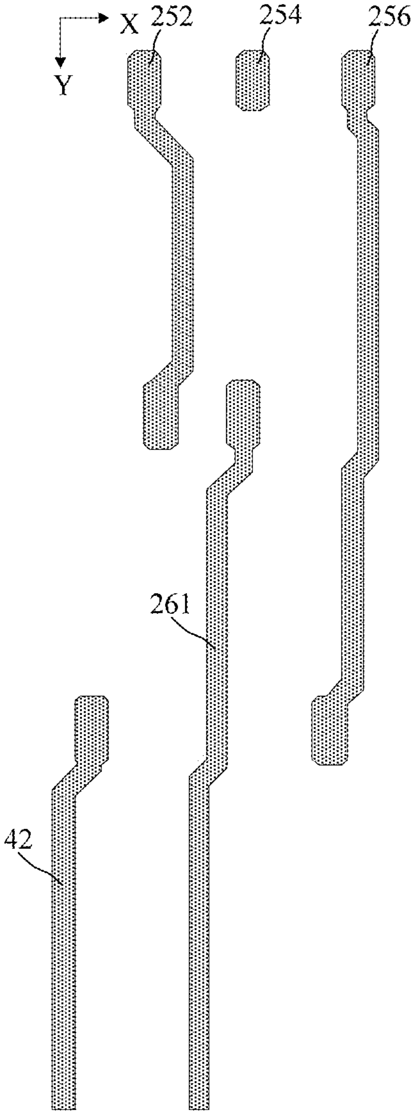
FIG. 8B is a schematic plan view of the second conductive layer in FIG. 8A.

FIG. 8A is a schematic diagram of the display panel after a second conductive layer is formed in FIG. 5. FIG. 8B is a schematic plan view of the second conductive layer in FIG. 8A. In some examples, as shown in FIGS. 8A and 8B, the second conductive layer of the first bezel region may include at least a plurality of data leading-out lines (including, for example, a second data leading-out line 252, a fourth data leading-out line 254, and a sixth data leading-out line 256), a second multiplexing data line 42, and a first multiplexing connection line 261.

In some examples, the first data leading-out line 251, the second data leading-out line 252, the third data leading-out line 253, the fourth data leading-out line 254, the fifth data leading-out line 255, and the sixth data leading-out line 256 may be sequentially arranged along the first direction X. Orthographic projections of the first data leading-out line 251, the second data leading-out line 252, the third data leading-out line 253, the fourth data leading-out line 254, the fifth data leading-out line 255, and the sixth data leading-out line 256 on the base substrate may not be overlapped. In this example, a plurality of data leading-out lines may be alternately arranged in the first conductive layer and the second conductive layer, and a pitch between adjacent data leading-out lines may be reduced, thereby reducing space occupied by a trace, which is beneficial to narrowing a bezel.

In some examples, the second data leading-out line 252 may be generally in a shape of a polyline extending along the second direction Y. The second data leading-out line 252 may be at least located between the active layer T10 of the first multiplexing transistor T1 and the active layer T20 of the second multiplexing transistor T2, and one connection end of the second data leading-out line 252 may be located between the active layer T10 of the first multiplexing transistor T1 and the active layer T30 of the third multiplexing transistor T3, and may be close to the integral structure of the gate T13 of the first multiplexing transistor T1 and the gate T33 of the third multiplexing transistor T3. The fourth data leading-out line 254 may be located on a side of the active layer T20 of the second multiplexing transistor T2 in an opposite direction of the second direction Y. The sixth data leading-out line 256 may be substantially in a shape of a polyline extending in the second direction Y. The sixth data leading-out line 256 may be at least located on a side of the fifth data leading-out line 255 away from the active layer T20 of the second transistor T2 and located on a side of the active layer T40 of the fourth multiplexing transistor T4 along the first direction X. One connection end of the sixth data leading-out line 256 may be located between the active layer T40 of the fourth multiplexing transistor T4 and the active layer T60 of the sixth multiplexing transistor T6, and close to the integral structure of the gate T43 of the fourth multiplexing transistor T4 and the gate T63 of the sixth multiplexing transistor T6.

In some examples, the second multiplexing data line 42 may be substantially in a shape of a polyline extending along the second direction Y. The second multiplexing data line 42 may be located on a side of the first multiplexing data line 41 close to the active layer T50 of the fifth multiplexing transistor T5, and the second multiplexing data line 42 may be located between the first multiplexing data line 41 and the third multiplexing connection line 263. A first connection end of the second multiplexing data line 42 may be located between the active layer T30 of the third multiplexing transistor T3 and the active layer T50 of the fifth multiplexing transistor T5, and close to the integral structure of the gate T33 of the third multiplexing transistor T3 and the gate T53 of the fifth multiplexing transistor T5.

In some examples, the first multiplexing connection line 261 may be substantially in a shape of a polyline extending along the second direction Y. The first multiplexing connection line 262 may be at least located between the active layer T50 of the fifth multiplexing transistor T5 and the active layer T60 of the sixth multiplexing transistor T6 and between the active layer T30 of the third multiplexing transistor T3 and the active layer T40 of the fourth multiplexing transistor T4. The first multiplexing connection line 261 may be located on a side of the third data leading-out line 253 close to the active layer T40 of the fourth multiplexing transistor T4, and on a side of the second multiplexing connection line 262 close to the active layer T50 of the fifth multiplexing transistor T5. A first connection end of the first multiplexing connection line 261 may be located between the active layer T20 of the second multiplexing transistor T2 and the active layer T40 of the fourth multiplexing transistor T4, and close to the integral structure of the gate T23 of the second multiplexing transistor T2 and the gate T43 of the fourth multiplexing transistor T4.

In some examples, the first multiplexing data line 41 may be connected with the first multiplexing connection line 261 and transmit a first data signal; the second multiplexing data line 42 may be connected with the second multiplexing connection line 262 and transmit a second data signal; the third multiplexing data line 43 may be connected with the third multiplexing connection line 263 and transmit a third data signal. The first multiplexing data line 41 and the first multiplexing connection line 261 have substantially a same trace extension direction, and are located in different film layers, so that space occupied by traces may be saved. The second multiplexing data line 42 and the second multiplexing connection line 262 have substantially a same trace extension direction and are located in different film layers, which is beneficial to saving occupied space.

Figure 9:
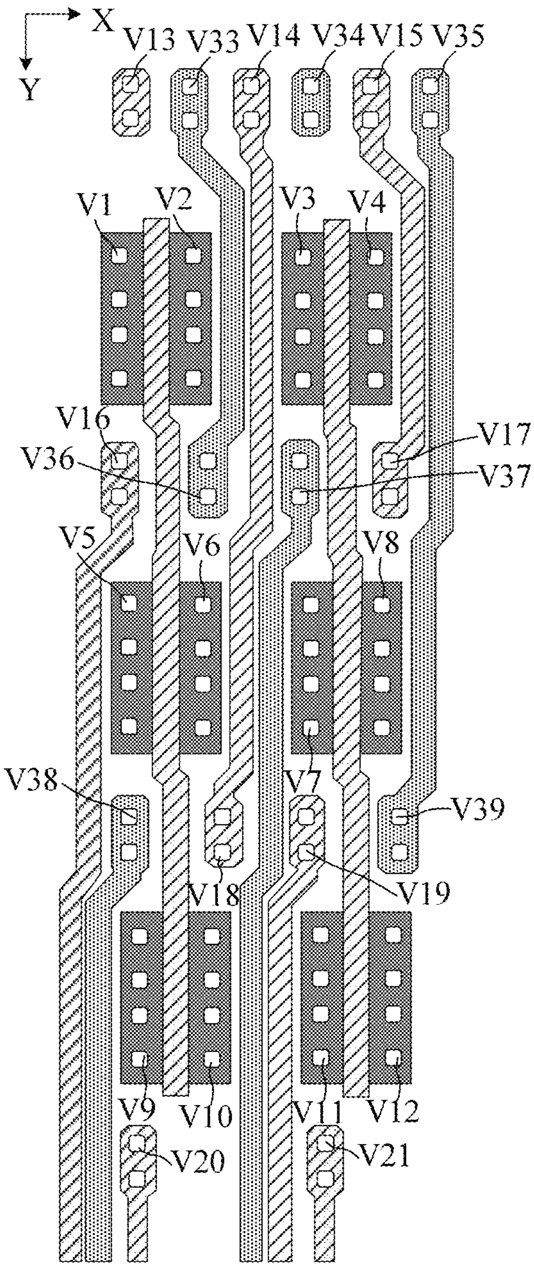
FIG. 9 is a schematic diagram of the display panel after a third insulation layer is formed in FIG. 5.

FIG. 9 is a schematic diagram of the display panel after a third insulation layer is formed in FIG. 5. In some examples, as shown in FIG. 9, the third insulation layer of the first bezel region may be provided with a plurality of vias, and may include, for example, a first via V1 to a twelfth via V12, a thirteenth via V13 to a twenty-first via V21, and a thirty-third via V33 to a thirty-ninth via V39. In some examples, the third insulation layer, the second insulation layer, and the first insulation layer within the first via V1 to the twelfth via V12 may be removed, to expose a part of a surface of the semiconductor layer. The third insulation layer and the second insulation layer within the thirteenth via V13 to the twenty-first via V21 may be removed to expose a part of a surface of the first conductive layer. The third insulation layer within the thirty-third via V33 to the thirty-ninth via V39 may be removed, exposing a part of a surface of the second conductive layer.

Figure 10:
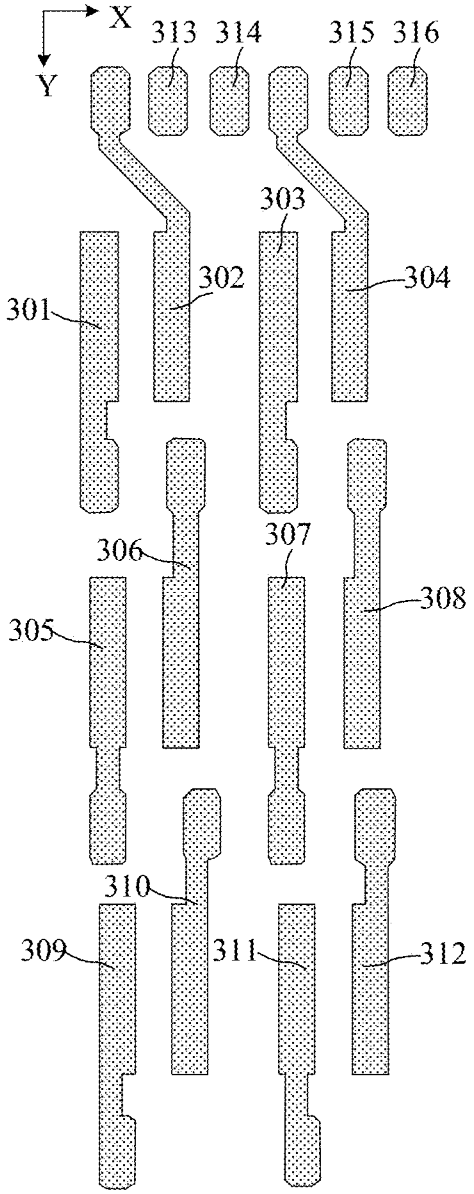
FIG. 10 is a schematic plan view of the third conductive layer in FIG. 5.

FIG. 10 is a schematic plan view of the third conductive layer in FIG. 5. In some examples, as shown in FIGS. 5 and 10, the third conductive layer of the first bezel region may include at least a plurality of connection electrodes (e.g., including a first connection electrode 301 to a sixteenth connection electrode 316).

In some examples, the first connection electrode 301 may substantially have a strip-shaped structure extending along the second direction Y. The first connection electrode 301 may be electrically connected with a first region of the active layer T10 of the first multiplexing transistor T1 through a plurality of (for example, four) first vias V1 arranged in a vertical direction, and may also be electrically connected with the first multiplexing data line 41 through two sixteenth vias V16 arranged in the vertical direction. Being arranged in the vertical direction in the example refers to being arranged along the second direction, and being arranged in a transverse direction refers to being arranged along the first direction.

In some examples, the second connection electrode 302 may be substantially in a shape of a polyline extending along the second direction Y. The second connection electrode 302 may be connected with a second region of the active layer T10 of the first multiplexing transistor T1 through a plurality of (for example, four) second vias V2 arranged in the vertical direction, and may also be electrically connected with the first data leading-out line 251 through two thirteenth vias V13 arranged in the vertical direction.

In some examples, the third connection electrode 303 may have substantially a strip-shaped structure extending along the second direction Y. The third connection electrode 303 may be electrically connected with a first region of the active layer T20 of the second multiplexing transistor T2 through a plurality of (for example, four) third vias V3 arranged in the vertical direction, and may also be electrically connected with the first multiplexing connection line 261 through two thirty-seventh vias V37 arranged in the vertical direction. The first multiplexing connection line 261 may be electrically connected with the first multiplexing data line 41.

In some examples, the fourth connection electrode 304 may be substantially in a shape of a polyline extending along the second direction Y. The fourth connection electrode 304 may be electrically connected with a second region of the active layer T20 of the second multiplexing transistor T2 through a plurality of (for example, four) fourth vias V4 arranged in the vertical direction, and may also be electrically connected with the fourth data leading-out line 254 through two thirty-fourth vias V34 arranged in the vertical direction.

In some examples, the fifth connection electrode 305 may have substantially a strip-shaped structure extending along the second direction Y. The fifth connection electrode 305 may be electrically connected with a first region of the active layer T30 of the third multiplexing transistor T3 through a plurality (for example, four) of fifth vias V5 arranged in the vertical direction, and may also be electrically connected with the second multiplexing data line 42 through two thirty-eighth vias V38 arranged in the vertical direction.

In some examples, the sixth connection electrode 306 may have substantially a strip-shaped structure extending along the second direction Y. The sixth connection electrode 306 may be electrically connected with a second region of the active layer T30 of the third multiplexing transistor T3 through a plurality of (for example, four) sixth vias V6 arranged in the vertical direction, and may also be electrically connected with the second data leading-out line 252 through two thirty-sixth vias V36 arranged in the vertical direction.

In some examples, the seventh connection electrode 307 may have substantially a strip-shaped structure extending along the second direction Y. The seventh connection electrode 307 may be electrically connected with a first region of the active layer T40 of the fourth multiplexing transistor T4 through a plurality of (for example, four) seventh vias V7 arranged in the vertical direction, and may also be electrically connected with the second multiplexing connection line 262 through two nineteenth vias V19 arranged in the vertical direction. The second multiplexing connection line 262 may be electrically connected with the second multiplexing data line 42.

In some examples, the eighth connection electrode 308 may have substantially a strip-shaped structure extending along the second direction Y. The eighth connection electrode 308 may be electrically connected with a second region of the active layer T40 of the fourth multiplexing transistor T4 through a plurality (for example, four) eighth vias V8 arranged in the vertical direction, and may also be electrically connected with the fifth data leading-out line 255 through two seventeenth vias V17 arranged in the vertical direction.

In some examples, the ninth connection electrode 309 may have substantially a strip-shaped structure extending along the second direction Y. The ninth connection electrode 309 may be electrically connected with a first region of the active layer T50 of the fifth multiplexing transistor T5 through a plurality of (for example, four) ninth vias V9 arranged in the vertical direction, and may also be electrically connected with the third multiplexing connection line 263 through two twentieth vias V20 arranged in the vertical direction. The third multiplexing connection line 263 may be electrically connected with the third multiplexing data line 43.

In some examples, the tenth connection electrode 310 may have substantially a strip-shaped structure extending along the second direction Y. The tenth connection electrode 310 may be electrically connected with a second region of the active layer T50 of the fifth multiplexing transistor T5 through a plurality of (for example, four) tenth vias V10 arranged in the vertical direction, and may also be electrically connected with the third data leading-out line 253 through two eighteenth vias V18 arranged in the vertical direction.

In some examples, the eleventh connection electrode 311 may substantially have a strip-shaped structure extending along the second direction Y. The eleventh connection electrode 311 may be electrically connected with a first region of the active layer T60 of the sixth multiplexing transistor T6 through a plurality (for example, four) eleventh vias V11 arranged in the vertical direction, and may also be electrically connected with the third multiplexing data line 43 through two twenty-first vias V21 arranged in the vertical direction.

In some examples, the twelfth connection electrode 312 may have substantially a strip-shaped structure extending along the second direction Y. The twelfth connection electrode 312 may be electrically connected with a second region of the active layer T60 of the sixth multiplexing transistor T6 through a plurality of (for example, four) twelfth vias V12 arranged in the vertical direction, and may also be electrically connected with the sixth data leading-out line 256 through two thirty-ninth vias V39 arranged in the vertical direction.

In some examples, the thirteenth connection electrode 313 may be substantially in a shape of a rectangle. The thirteenth connection electrode 313 may be electrically connected with the second data leading-out line 252 through two thirty-third vias V33 arranged in the vertical direction. The fourteenth connection electrode 314 may be substantially in a shape of a rectangle. The fourteenth connection electrode 314 may be electrically connected with the third data leading-out line 253 through two fourteenth vias V14 arranged in the vertical direction. The fifteenth connection electrode 315 may substantially in a shape of a rectangle. The fifteenth connection electrode 315 may be electrically connected with the fifth data leading-out line 255 through two fifteenth vias V15 arranged in the vertical direction. The sixteenth connection electrode 316 may be substantially in a shape of a rectangle. The sixteenth connection electrode 316 may be electrically connected with the sixth data leading-out line 256 through two thirty-fifth vias V35 arranged in the vertical direction.

In some examples, the first data leading-out line 251 is electrically connected with the multiplexing circuit through the second connection electrode 302, and the fourth data leading-out line 254 is electrically connected with the multiplexing circuit through the fourth connection electrode 304. By disposing that the thirteenth connection electrode 313 is electrically connected with the second data leading-out line 252, the fourteenth connection electrode 314 is electrically connected with the third data leading-out line 253, the fifteenth connection electrode 315 is electrically connected with the fifth data leading-out line 255, and the sixteenth connection electrode 316 is electrically connected with the sixth data leading-out line 256, uniformity of a film layer pattern of the third conductive layer may be ensued and uniformity of vias of the third insulation layer may be ensured, thereby being beneficial to resistance uniformity of a plurality of data lead-out lines and ensuring uniformity of signal transmission.

Figure 11:
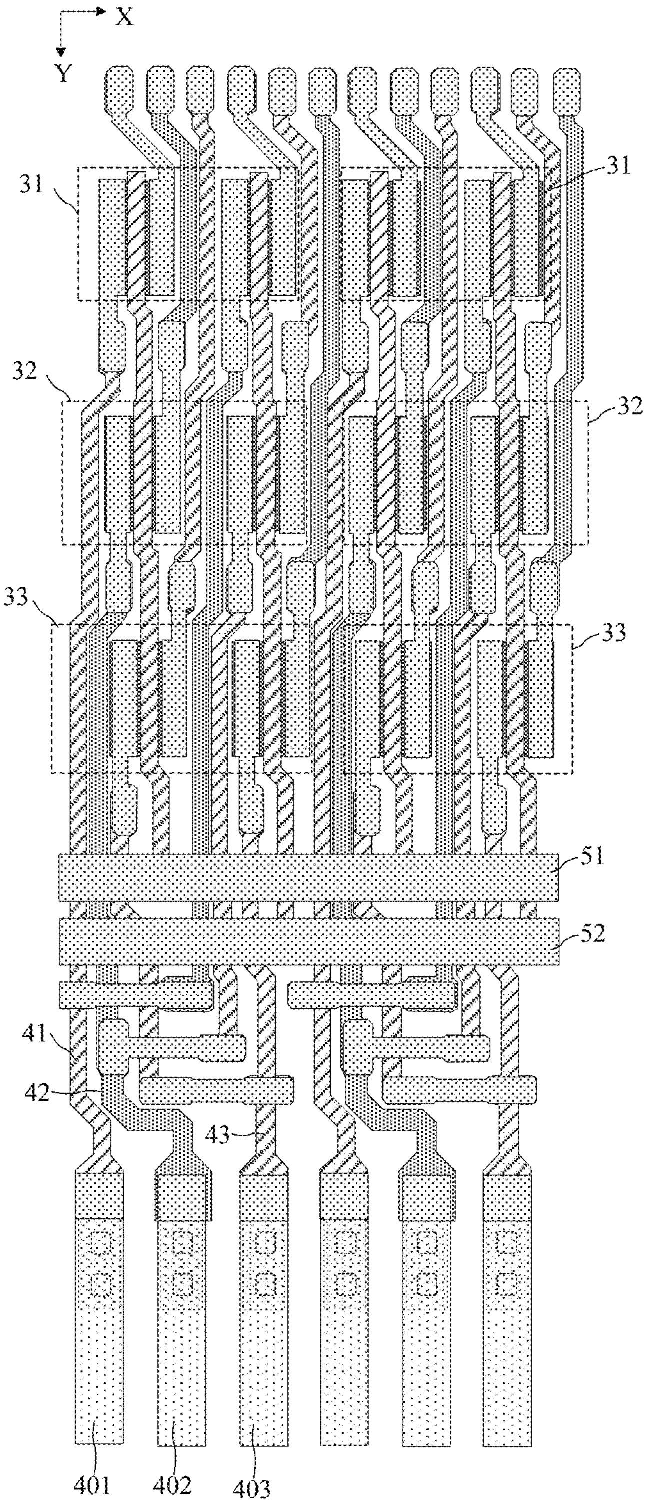
FIG. 11 is a partial plan view of a multiplexing circuit according to at least one embodiment of the present disclosure.

FIG. 11 is a partial plan view of a multiplexing circuit according to at least one embodiment of the present disclosure. FIG. 11 schematically illustrates a planar structure of two groups of multiplexing units and a connection mode with a data bending connection line of the bending region. Hereinafter, with reference to FIGS. 5 to 10, description will be made by taking a structure of a group of multiplexing units and a data bending connection line in FIG. 11 as an example.

In some examples, as shown in FIG. 11, a plurality of first multiplexing units 31 may be arranged in one row along the first direction X, a plurality of second multiplexing units 32 may be arranged in one row along the first direction X, and a plurality of third multiplexing units 33 may be arranged in one row along the first direction X. A column of multiplexing units may include a first multiplexing unit 31, a second multiplexing unit 32, and a third multiplexing unit 33 arranged along the second direction Y.

In some examples, as shown in FIG. 11, in a direction perpendicular to the display panel, the first bezel region may include at least a base substrate, and a semiconductor layer, a first conductive layer, a second conductive layer, a third conductive layer, and a fourth conductive layer disposed on the base substrate. A fourth insulation layer and a fifth insulation layer may be disposed between the third conductive layer and the fourth conductive layer.

Figure 12:
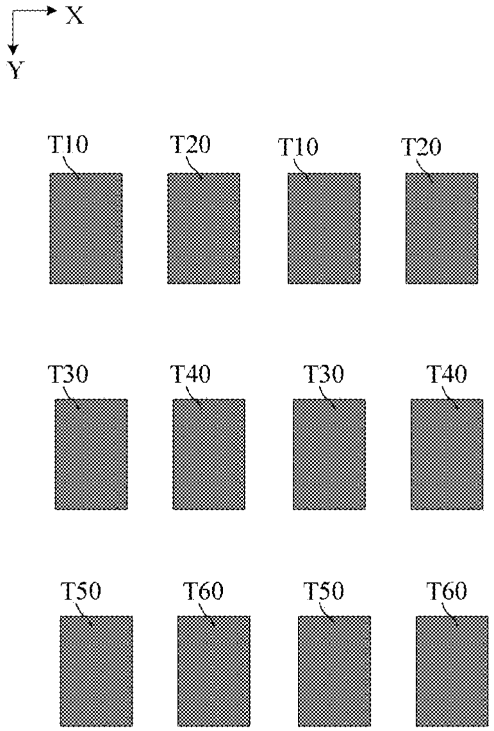
FIG. 12 is a schematic diagram of a display panel after a semiconductor layer is formed in FIG. 11.

FIG. 12 is a schematic diagram of a display panel after a semiconductor layer is formed in FIG. 11. In some examples, as shown in FIGS. 11 and 12, the active layer T10 of the first multiplexing transistor T1 and the active layer T20 of the second multiplexing transistor T2 of the first multiplexing unit 31 may be arranged in one row at intervals along the first direction X. The active layer T30 of the third multiplexing transistor T3 and the active layer T40 of the fourth multiplexing transistor T4 of the second multiplexing unit 32 may be arranged in one row at intervals along the first direction X. The active layer T50 of the fifth multiplexing transistor T5 and the active layer T60 of the sixth multiplexing transistor T6 of the third multiplexing unit 33 may be arranged in one row at intervals along the first direction X.

Figure 13:
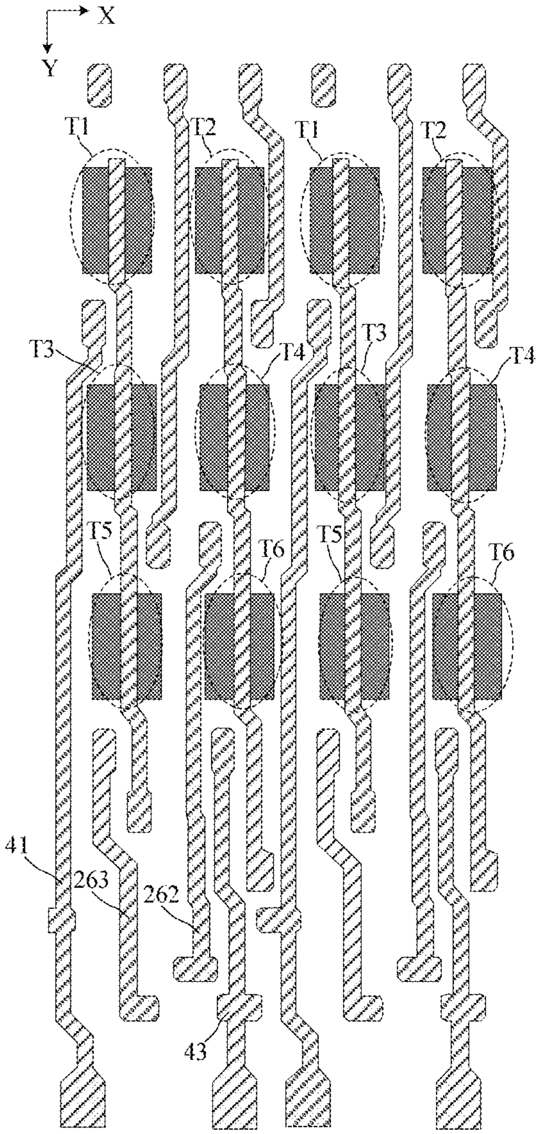
FIG. 13 is a schematic diagram of the display panel after a first conductive layer is formed in FIG. 11.

FIG. 13 is a schematic diagram of the display panel after a first conductive layer is formed in FIG. 11. In some examples, as shown in FIG. 13, a second connection end of the first multiplexing data line 41 and a second connection end of the third multiplexing data line 43 may be aligned in the first direction X. A second connection end of the third multiplexing connection line 263 may be located on a side of the second connection end of the third multiplexing data line 43 in an opposite direction of the second direction Y. A second connection end of the second multiplexing connection line 262 may be located on a side of the third multiplexing connection line 263 in the opposite direction of the second direction Y.

Figure 14:
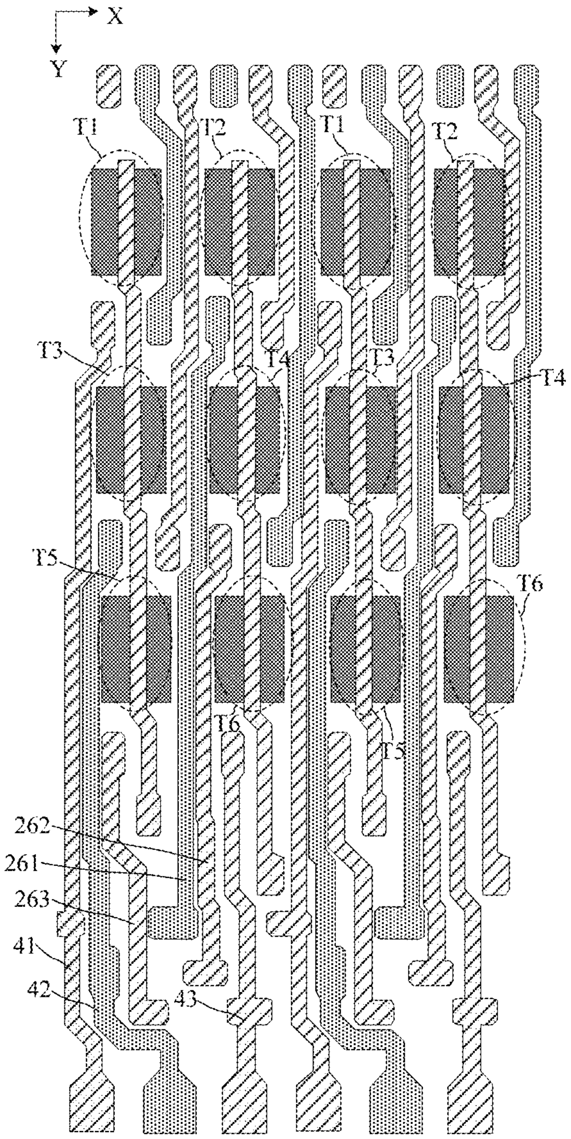
FIG. 14 is a schematic diagram of the display panel after a second conductive layer is formed in FIG. 11.

FIG. 14 is a schematic diagram of the display panel after a second conductive layer is formed in FIG. 11. In some examples, as shown in FIG. 14, a second connection end of the second multiplexing data line 42 and a second connection end of the first multiplexing data line 41 may be aligned in the first direction X. The second connection end of the second multiplexing data line 42 may be located between the second connection end of the first multiplexing data line 41 and the second connection end of the third multiplexing data line 43 in the first direction X. A second connection end of the first multiplexing connection line 261 may be located on a side of the second connection end of the second multiplexing connection line 262 in the opposite direction of the second direction Y.

Figure 15:
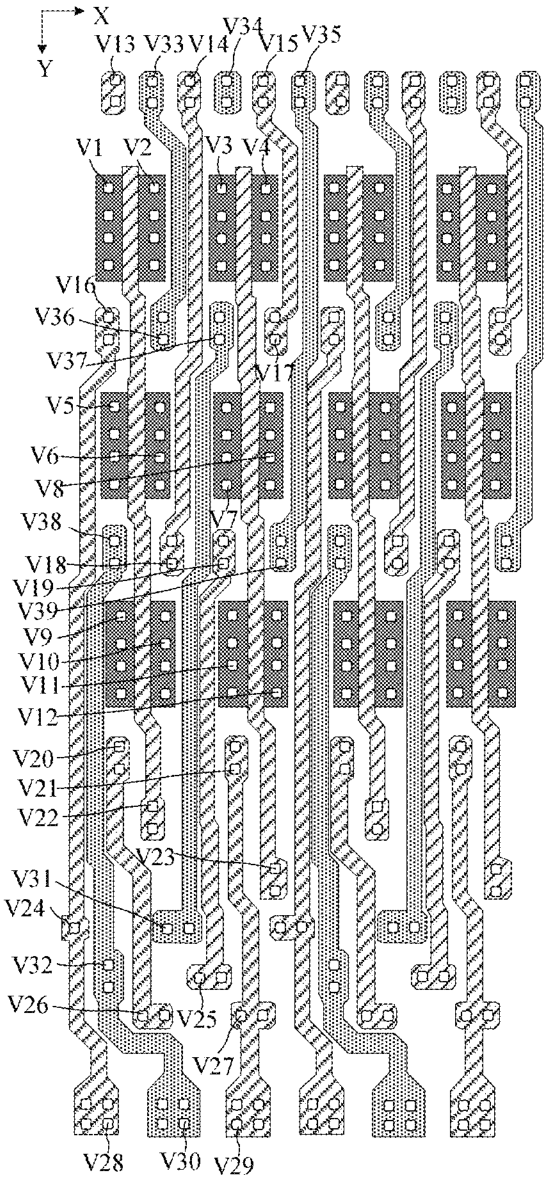
FIG. 15 is a schematic diagram of the display panel after a third insulation layer is formed in FIG. 11.

FIG. 15 is a schematic diagram of the display panel after a third insulation layer is formed in FIG. 11. In some examples, as shown in FIG. 15, the third insulation layer of the first bezel region may include, for example, a first via V1 to a twelfth via V12, a thirteenth via V13 to a twenty-ninth via V29, and a thirtieth via V30 to a thirty-ninth via V39.

In some examples, the third insulation layer, the second insulation layer, and the first insulation layer within the first via V1 to the twelfth via V12 may be removed, exposing a portion of a surface of the semiconductor layer. The third insulation layer and the second insulation layer within the thirteenth via V13 to the twenty-ninth via V29 may be removed to expose a portion of a surface of the first conductive layer. The third insulation layer within the thirtieth via V30 to the thirty-ninth via V39 may be removed, exposing a portion of a surface of the second conductive layer.

Figure 16A:
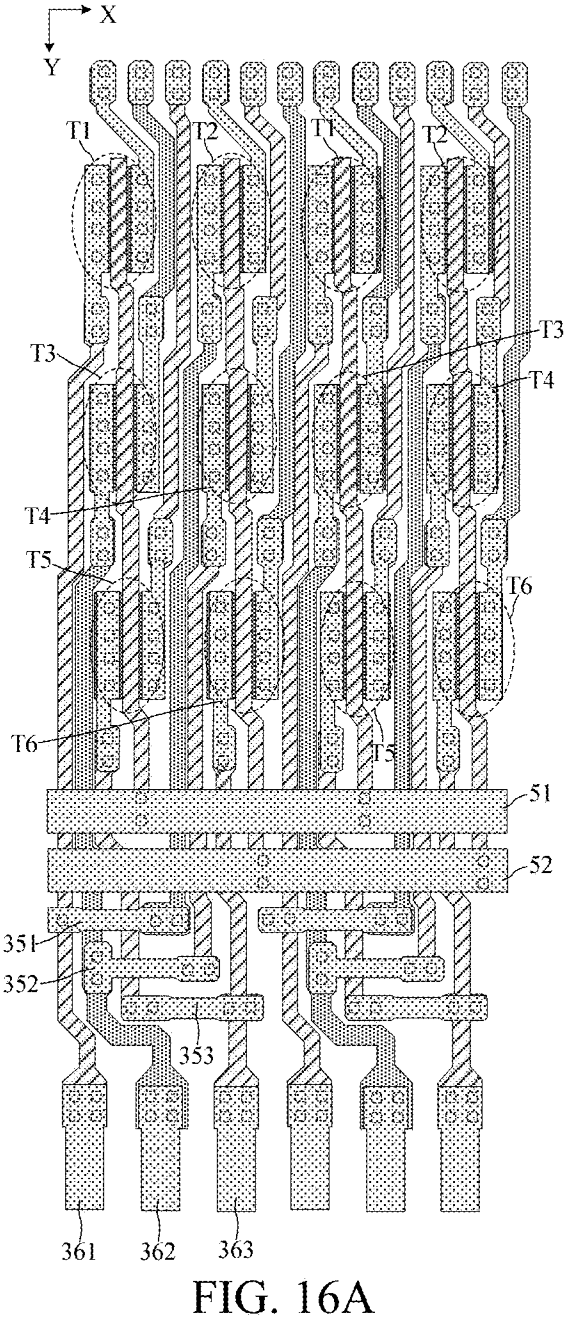
FIG. 16A is a schematic diagram of the display panel after a third conductive layer is formed in FIG. 11.
Figure 16B:
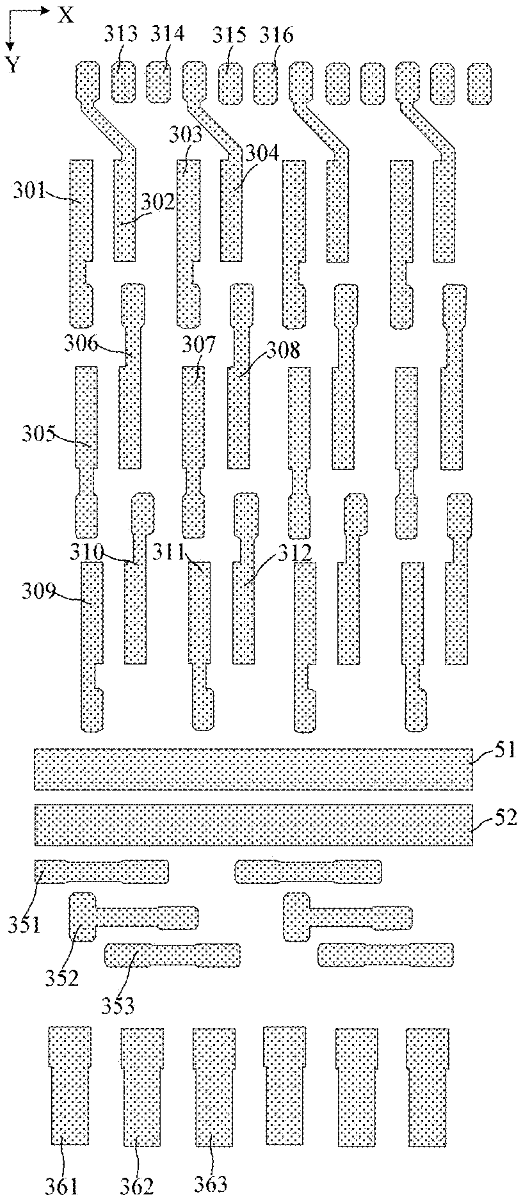
FIG. 16B is a schematic plan view of the third conductive layer in FIG. 16A.

FIG. 16A is a schematic diagram of the display panel after a third conductive layer is formed in FIG. 11. FIG. 16B is a schematic plan view of the third conductive layer in FIG. 16A. In some examples, as shown in FIGS. 16A and 16B, the third conductive layer of the first bezel region may include at least: a plurality of connection electrodes (including, for example, a first connection electrode 301 to a sixteenth connection electrode 316), a first multiplexing control line 51, a second multiplexing control line 52, a plurality of patch lines (such as a first patch line 361, a second patch line 362, and a third patch line 363), and a plurality of multiplexing connection electrodes (including, for example, a first multiplexing connection electrode 351, a second multiplexing connection electrode 352, and a third multiplexing connection electrode 353).

In some examples, the first multiplexing control line 51 and the second multiplexing control line 52 may be at least in a shape of a straight line extending along the first direction X. The second multiplexing control line 52 may be located on a side of the first multiplexing control line 51 in the second direction Y. The first multiplexing control line 51 may be located on a same side of the ninth connection electrode 309, the tenth connection electrode 310, the eleventh connection electrode 311, and the twelfth connection electrode 312 in the second direction Y.

In some examples, the first multiplexing connection electrode 351, the second multiplexing connection electrode 352, and the third multiplexing connection electrode 353 may be located on one side of the second multiplexing control line 52 in the second direction Y. The first multiplexing connection electrode 351, the second multiplexing connection electrode 352, and the third multiplexing connection electrode 353 may have substantially a strip-shaped structure extending along the first direction X. The second multiplexing connection electrode 352 may be located on a side of the first multiplexing connection electrode 351 in the second direction Y, and the third multiplexing connection electrode 353 may be located on a side of the second multiplexing connection electrode 352 in the second direction Y.

In some examples, the first patch line 361, the second patch line 362, and the third patch line 363 may have a strip-shaped structure extending along the second direction Y. The first patch line 361, the second patch line 362, and the third patch line 363 may be sequentially arranged along the first direction X. The first patch line 361, the second patch line 362, and the third patch line 363 may be located on a side of the third multiplexing connection electrode 353 in the second direction Y.

In some examples, the first multiplexing control line 51 may be electrically connected with an integral structure of the gate T53 of the fifth multiplexing transistor, the gate T33 of the third multiplexing transistor, and the gate T13 of the first multiplexing transistor through two twenty-second vias V22 arranged in the vertical direction. The second multiplexing control line 52 may be electrically connected with an integral structure of the gate T63 of the sixth multiplexing transistor, the gate T43 of the fourth multiplexing transistor, and the gate T23 of the second multiplexing transistor through two twenty-third vias V23 arranged in the vertical direction.

In some examples, the first multiplexing connection electrode 351 may be electrically connected with the first multiplexing data line 41 through the twenty-fourth via V24, and may also be electrically connected with the first multiplexing connection line 261 through two thirty-first vias V31 arranged in the transverse direction. The second multiplexing connection electrode 352 may be electrically connected with the second multiplexing data line 42 through two thirty-second vias V32 arranged in the vertical direction, and may also be electrically connected with the second multiplexing connection line 262 through two twenty-fifth vias V25 arranged in the transverse direction. The third multiplexing connection electrode 353 may be electrically connected with the third multiplexing connection line 263 through two twenty-sixth vias V26 arranged in the transverse direction, and may also be electrically connected with the third multiplexing data line 43 through two twenty-seventh vias V27 arranged in the transverse direction.

In some examples, the first patch line 361 may be electrically connected with the first multiplexing data line 41 through a plurality of twenty-eighth vias V28 arranged in an array. The second patch line 362 may be electrically connected with the second multiplexing data line 42 through a plurality of thirtieth vias V30 arranged in an array. The third patch line 363 may be electrically connected with the third multiplexing data line 43 through a plurality of twenty-ninth vias V29 arranged in an array.

Figure 17:
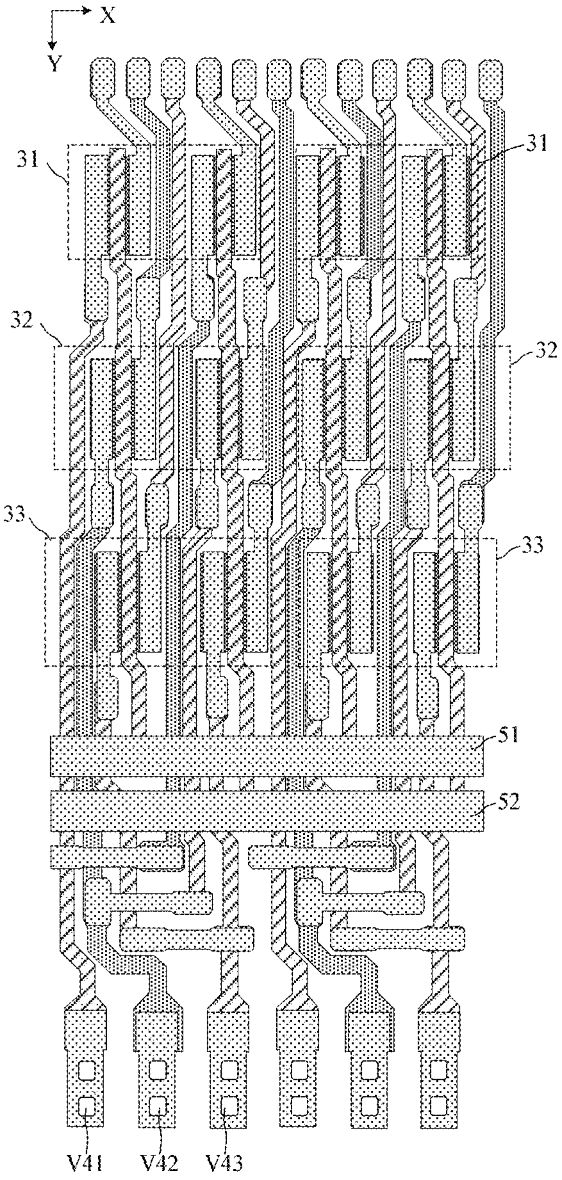
FIG. 17 is a schematic diagram of the display panel after a fifth insulation layer is formed in FIG. 11.

FIG. 17 is a schematic diagram of the display panel after a fifth insulation layer is formed in FIG. 11. In some examples, as shown in FIG. 17, the fourth insulation layer and the fifth insulation layer of the first bezel region may be provided with a plurality of vias, which may include, for example, a forty-first via V41 to a forty-third via V43. The fifth insulation layer and the fourth insulation layer within the forty-first via V41 to the forty-third via V43 may be removed, exposing a portion of a surface of the third conductive layer.

In some examples, as shown in FIG. 11, the fourth conductive layer of the first bezel region may include at least a plurality of data bending connection lines (e.g., including a first data bending connection line 401, a second data bending connection line 402, and a third data bending connection line 403). The plurality of data bending connection lines may extend along the second direction Y and be sequentially arranged along the first direction X. The first data bending connection line 401 may be electrically connected with the first patch line 361 through two forty-first vias V41 arranged in the vertical direction, the second data bending connection line 402 may be electrically connected with the second patch line 362 through two forty-second vias V42 arranged in the vertical direction, and the third data bending connection line 403 may be electrically connected with the third patch line 363 through two forty-third vias V43 arranged in the vertical direction.

Exemplary description will be made below for a structure and a preparation process of the display panel according to the example. A "patterning process" mentioned in the present disclosure includes photoresist coating, mask exposure, development, etching, photoresist stripping, and the like for a metal material, an inorganic material, or a transparent conductive material, and includes organic material coating, mask exposure, development, and the like for an organic material. Deposition may be any one or more of sputtering, evaporation, and chemical vapor deposition, coating may be any one or more of spray coating, spin coating, and inkjet printing, and etching may be any one or more of dry etching and wet etching, the present disclosure is not limited thereto. A "thin film" refers to a layer of thin film made of a material on a base substrate using deposition, coating, or other processes. If the "thin film" does not need to be processed through a patterning process in an entire manufacturing process, the "thin film" may also be called a "layer". If the "thin film" needs to be processed through the patterning process in the entire manufacturing process, the "thin film" is called a "thin film" before the patterning process is performed and is called a "layer" after the patterning process is performed. At least one "pattern" is contained in the "layer" which has been processed through the patterning process.

"A and B are disposed in a same layer" or "A and B are of a same layer structure" mentioned in the present disclosure refers to that A and B are simultaneously formed through a same patterning process. "A and B are of a structure of different layers" means that A and B are respectively formed through two patterning processes. A "thickness" of a film layer is a dimension of the film layer in a direction perpendicular to the display panel. In an exemplary embodiment of the present disclosure, "an orthographic projection of B being within a range of an orthographic projection of A" or "an orthographic projection of A containing an orthographic projection of B" means that a boundary of the orthographic projection of B falls within a range of a boundary of the orthographic projection of A, or the boundary of the orthographic projection of A is overlapped with the boundary of the orthographic projection of B.

In some examples, a preparation process of the display panel may include following operations.

(1) A base substrate is provided. In some examples, the base substrate may be a rigid base substrate or a flexible base substrate. For example, the rigid base substrate may be made of, but is not limited to, one or more of glass and quartz. The flexible base substrate may be made of, but is not limited to, one or more of polyethylene terephthalate, ethylene terephthalate, polyether ether ketone, polystyrene, polycarbonate, polyarylate, polyarylester, polyimide, polyvinyl chloride, polyethylene, and textile fiber. In some examples, the flexible base substrate may include a first flexible material layer, a first inorganic material layer, a second flexible material layer, and a second inorganic material layer which are stacked. The first flexible material layer and the second flexible material layer may be made of a material such as Polyimide (PI), Polyethylene Terephthalate (PET), or a polymer soft film on which a surface treatment is performed, and the first inorganic material layer and the second inorganic material layer may be made of a material such as Silicon Nitride ($SiN_x$, $x>0$) or Silicon Oxide ($SiO_y$, $y>0$), etc., which are used to improve resistance to water and oxygen of the base substrate.

(2) A semiconductor layer is formed. In some examples, a semiconductor thin film is deposited on the base substrate, and the semiconductor thin film is patterned through a patterning process to form a semiconductor layer disposed on the base substrate. In some examples, as shown in FIGS. 3, 6, and 12, the semiconductor layer may include an active layer of a thin film transistor of a pixel circuit located in a display region, and an active layer of a multiplexing transistor of a multiplexing circuit located in a first bezel region.

(3) A first conductive layer is formed. In some examples, a first insulation thin film and a first conductive thin film are sequentially deposited on the base substrate on which the aforementioned pattern is formed, and the first conductive thin film is patterned through a patterning process to form a first insulation layer disposed on the semiconductor layer and a first conductive layer disposed on the first insulation layer, as shown in FIGS. 3, 7A, 7B, and 13. In some examples, the first conductive layer may also be referred to as a first gate metal layer. The first insulation layer may also be referred to as a first gate insulation layer.

(4) A second conductive layer is formed. In some examples, a second insulation thin film and a second conductive thin film are sequentially deposited on the base on which the aforementioned patterns are formed, and the second conductive thin film is patterned through a patterning process to form a second insulation layer and a second conductive layer disposed on the second insulation layer, as shown in FIGS. 3, 8A, 8B, and 14. In some examples, the second conductive layer may also be referred to as a second gate metal layer and the second insulation layer may also be referred to as a second gate insulation layer.

(5) A third insulation layer is formed. In some examples, a third insulation thin film is deposited on the base substrate on which the aforementioned patterns are formed, and the third insulation thin film is patterned through a patterning process to form a third insulation layer, as shown in FIGS. 3, 9, and 15. In some examples, the third insulation layer may be provided with a plurality of vias. The third insulation layer may also be referred to as an interlayer dielectric layer.

(6) A third conductive layer is formed. In some examples, a third conductive thin film is deposited on the base substrate on which the aforementioned patterns are formed, and the third conductive thin film is patterned through a patterning process to form a third conductive layer, as shown in FIG. 3, FIG. 10, FIG. 16A, and FIG. 16B. In some examples, the third conductive layer may also be referred to as a first source-drain metal layer.

(7) A fourth insulation layer and a fifth insulation layer are formed. In some examples, on the base substrate on which the aforementioned patterns are formed, a fourth insulation thin film is deposited, then a fifth insulation thin film is coated, and the fifth insulation thin film and the fourth insulation thin film are sequentially patterned using a patterning process to form a fourth insulation layer and a fifth insulation layer, as shown in FIGS. 3 and 17. In some examples, the fourth insulation layer may also be referred to as a passivation layer and the fifth insulation layer may also be referred to as a first planarization layer.

(8) A fourth conductive layer is formed. A fourth conductive thin film is deposited on the base substrate on which the aforementioned patterns are formed, and the fourth conductive thin film is patterned through a patterning process to form a fourth conductive layer disposed on the fifth insulation layer, as shown in FIGS. 3 and 11. In some examples, the fourth conductive layer may also be referred to as a second source-drain metal layer.

Subsequently, a sixth insulation layer may be formed on a side of the fourth conductive layer away from the base substrate. So far, preparation of a circuit structure layer of this example has been completed on the base substrate. In some examples, after the circuit structure layer of the display region is prepared, a light emitting structure layer, an encapsulation structure layer, and a touch structure layer may be prepared sequentially on the circuit structure layer, and will not be repeated here.

In some examples, the first conductive layer, the second conductive layer, the third conductive layer, and the fourth conductive layer may be made of a metal material, such as any one or more of Argentum (Ag), Copper (Cu), Aluminum (Al), and Molybdenum (Mo), or an alloy material of the aforementioned metals, such as an Aluminum Neodymium alloy (AlNd) or a Molybdenum Niobium alloy (MoNb), and may be of a single-layer structure or a multi-layer composite structure, such as Mo/Cu/Mo and Ti/Al/Ti. For example, the first conductive layer and the second conductive layer may be made of a single-layer molybdenum metal, and the third conductive layer and the fourth conductive layer may be made of a three-layer stacked structure of Ti/Al/Ti. A resistivity of traces of the third conductive layer and the fourth conductive layer may be less than a resistivity of traces of the first conductive layer and the second conductive layer.

For example, the first insulation layer 101, the second insulation layer 102, the third insulation layer 103, and the fourth insulation layer 104 may be made of any one or more of Silicon Oxide (SiOx, x>0), Silicon Nitride (SiNy, y>0), and Silicon Oxynitride (SiON), and may be a single layer, a multi-layer, or a composite layer. The fifth insulation layer 105 and the sixth insulation layer may be made of an organic material, such as polyimide, acrylic, or polyethylene terephthalate. The semiconductor layer may be made of a material, such as an amorphous Indium Gallium Zinc Oxide material (a-IGZO), Zinc Oxynitride (ZnON), Indium Zinc Tin Oxide (IZTO), amorphous Silicon (a-Si), polycrystalline Silicon (p-Si), hexthiophene, or polythiophene, that is, the present disclosure is applicable to a transistor manufactured based on an oxide technology, a silicon technology, or an organic matter technology.

The structure and the preparation process of the display panel of the embodiment are merely illustrative. In some examples, a corresponding structure may be changed and a patterning process may be added or reduced according to actual needs. For example, in the display panel, the second source-drain metal layer may be omitted to be disposed, an anode of a light emitting element may be directly electrically connected with a drain of a thin film transistor, and a data bending connection line may be located in the third conductive layer and electrically connected with a multiplexing data line located in the first conductive layer or the second conductive layer.

The preparation process of the example may be achieved using an existing mature preparation device, and may be compatible well with an existing preparation process, simple in process implementation, easy to implement, high in a production efficiency, low in a production cost, and high in a yield.

Multiplexing transistors of the multiplexing circuit of the example may be arranged in three rows, which is beneficial to compress space of the multiplexing circuit along the first direction, and combined with the 1:2 design of the multiplexing circuit, and a high refresh rate requirement of the display panel may be met.

Figure 18:
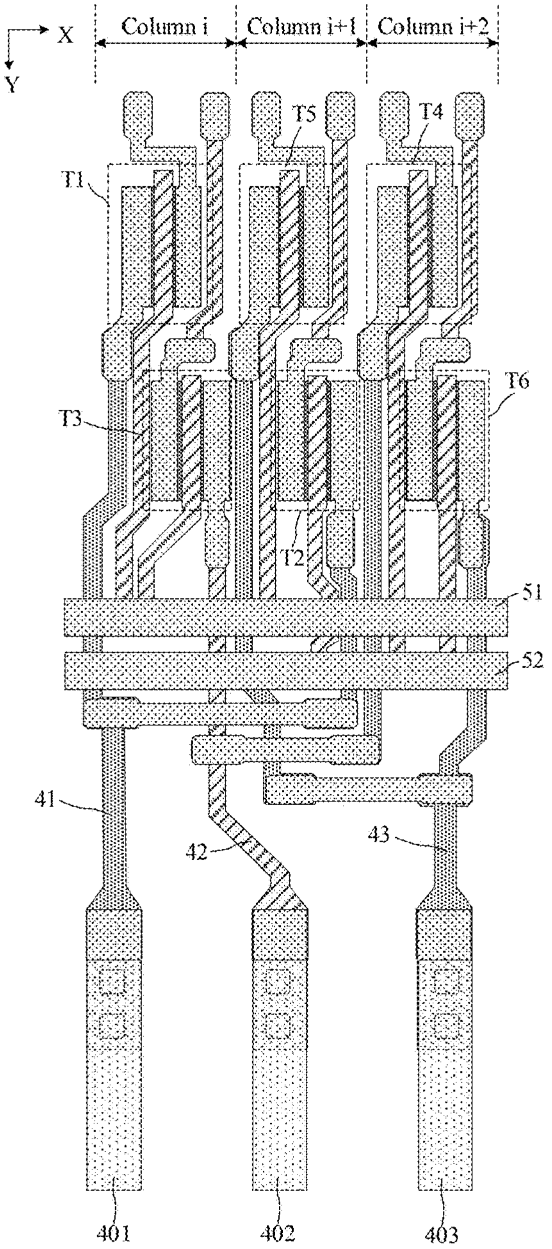
FIG. 18 is another partial plan view of a multiplexing circuit according to at least one embodiment of the present disclosure.

FIG. 18 is another partial plan view of a multiplexing circuit according to at least one embodiment of the present disclosure. FIG. 18 is illustrated by taking a local planar structure of a group of multiplexing units as an example.

In some examples, as shown in FIG. 18, two multiplexing transistors of each multiplexing unit in a group of multiplexing units may be arranged in different rows and different columns. For example, multiplexing transistors located in an i-th column (including the first multiplexing transistor T1 of the first multiplexing unit and the third multiplexing transistor T3 of the second multiplexing unit) are both electrically connected with the first multiplexing control line, multiplexing transistors located in an (i+1)-th column (including the fifth multiplexing transistor T5 of the third multiplexing unit and the second multiplexing transistor T2 of the first multiplexing unit) are electrically connected with different multiplexing control lines, multiplexing transistors located in an (i+2)-th column (including the fourth multiplexing transistor T4 of the second multiplexing unit and the sixth multiplexing transistor T6 of the third multiplexing unit) are all electrically connected with the second multiplexing control line, wherein i is an integer greater than 0.

In some examples, as shown in FIG. 18, six multiplexing transistors of a group of multiplexing units may be arrayed in two rows and three columns along the first direction X and the second direction Y. Multiplexing transistors of a first row may include: a first multiplexing transistor T1 of a first multiplexing unit, a fifth multiplexing transistor T5 of a third multiplexing unit, and a fourth multiplexing transistor T4 of a second multiplexing unit; the first multiplexing transistor T1 of the first multiplexing unit, the fifth multiplexing transistor T5 of the third multiplexing unit, and the fourth multiplexing transistor T4 of the second multiplexing unit may be arranged sequentially along the first direction X. Multiplexing transistors of a second row may include a third multiplexing transistor T3 of the second multiplexing unit, a second multiplexing transistor T2 of the first multiplexing unit, and a sixth multiplexing transistor T6 of the third multiplexing unit. The third multiplexing transistor T3 of the second multiplexing unit, the second multiplexing transistor T2 of the first multiplexing unit, and the sixth multiplexing transistor T6 of the third multiplexing unit may be arranged sequentially along the first direction X. The multiplexing transistors of the second row may be located on a side of the multiplexing transistors of the first row in the second direction Y. An arrangement mode of multiplexing circuits of the example may save installation space along the second direction Y. For example, the arrangement mode of the multiplexing circuits of the example may be suitable for a display panel having a relatively narrow lower bezel but a relatively wide transverse region.

In some examples, as shown in FIG. 18, multiplexing transistors of an i-th column may include: a first multiplexing transistor T1 and a third multiplexing transistor T3; multiplexing transistors of an (i+1)-th column may include: a fifth multiplexing transistor T5 and a second multiplexing transistor T2; multiplexing transistors of an (i+2)-th column may include a fourth multiplexing transistor T4 and a sixth multiplexing transistor T6. The multiplexing transistors of the i-th column, the multiplexing transistors of the (i+1)-th column, and the multiplexing transistors of the (i+2)-th column may be sequentially arranged along the first direction X.

Figure 19:
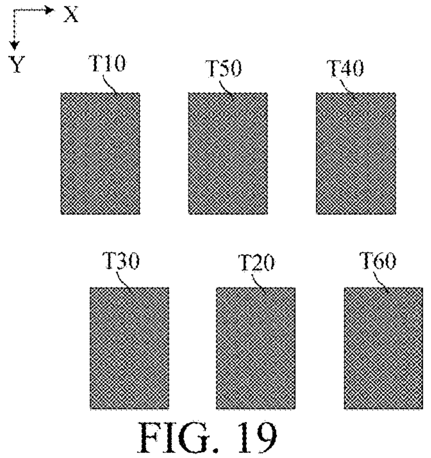
FIG. 19 is a schematic diagram of a display panel after a semiconductor layer is formed in FIG. 18.

FIG. 19 is a schematic diagram of a display panel after a semiconductor layer is formed in FIG. 18. In some examples, as shown in FIGS. 18 and 19, the semiconductor layer of the first bezel region may include at least active layers of multiple multiplexing transistors of multiple multiplexing units of a multiplexing circuit, for example, include the active layer T10 of the first multiplexing transistor T1 and the active layer T20 of the second multiplexing transistor T2 of the first multiplexing unit, the active layer T30 of the third multiplexing transistor T3 and the active layer T40 of the fourth multiplexing transistor T4 of the second multiplexing unit, the active layer T50 of the fifth multiplexing transistor T5 and the active layer T60 of the sixth multiplexing transistor T6 of the third multiplexing unit.

In some examples, as shown in FIG. 19, shapes and sizes of orthographic projections of the active layer T10 of the first multiplexing transistor and the active layer T20 of the second multiplexing transistor of the first multiplexing unit, the active layer T30 of the third multiplexing transistor and the active layer T40 of the fourth multiplexing transistor of the second multiplexing unit, the active layer T50 of the fifth multiplexing transistor and the active layer T60 of the sixth multiplexing transistor of the third multiplexing unit on the base substrate may be substantially the same, for example, the orthographic projections may be substantially rectangular in shape with a same size.

In some examples, as shown in FIG. 19, the active layer T10 of the first multiplexing transistor, the active layer T50 of the fifth multiplexing transistor, and the active layer T40 of the fourth multiplexing transistor may be arranged in alignment along the first direction X. The active layer T30 of the third multiplexing transistor, the active layer T20 of the second multiplexing transistor, and the active layer T60 of the sixth multiplexing transistor may be arranged in alignment along the first direction X.

The active layer T10 of the first multiplexing transistor and the active layer T30 of the third multiplexing transistor may be sequentially arranged along the second direction Y, and the two may be misaligned in the second direction Y. The active layer T50 of the fifth multiplexing transistor and the active layer T20 of the second multiplexing transistor may be sequentially arranged along the second direction Y, and the two may be misaligned in the second direction Y. The active layer T40 of the fourth multiplexing transistor and the active layer T60 of the sixth multiplexing transistor may be sequentially arranged along the second direction Y, and the two may be misaligned in the second direction Y.

Figure 20A:
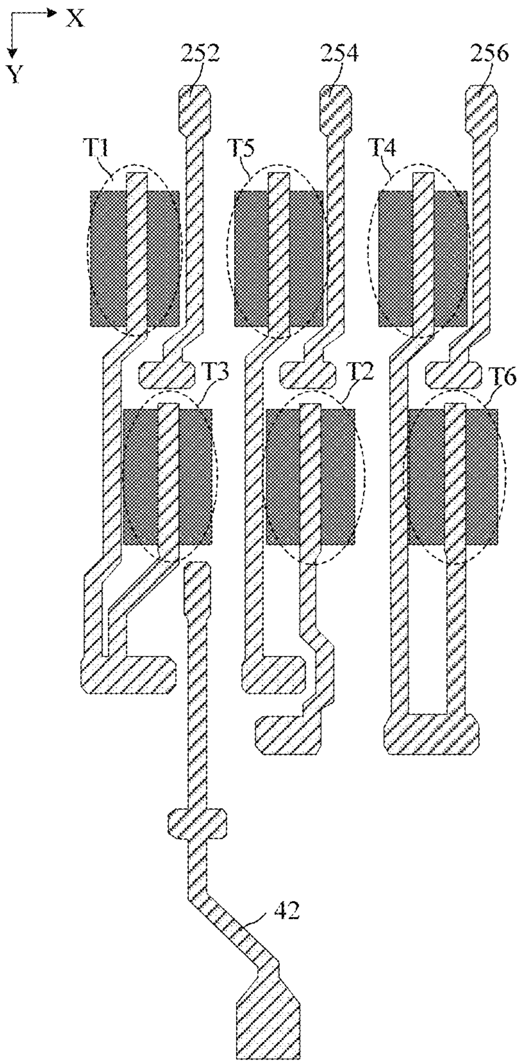
FIG. 20A is a schematic diagram of the display panel after a first conductive layer is formed in FIG. 18.
Figure 20B:
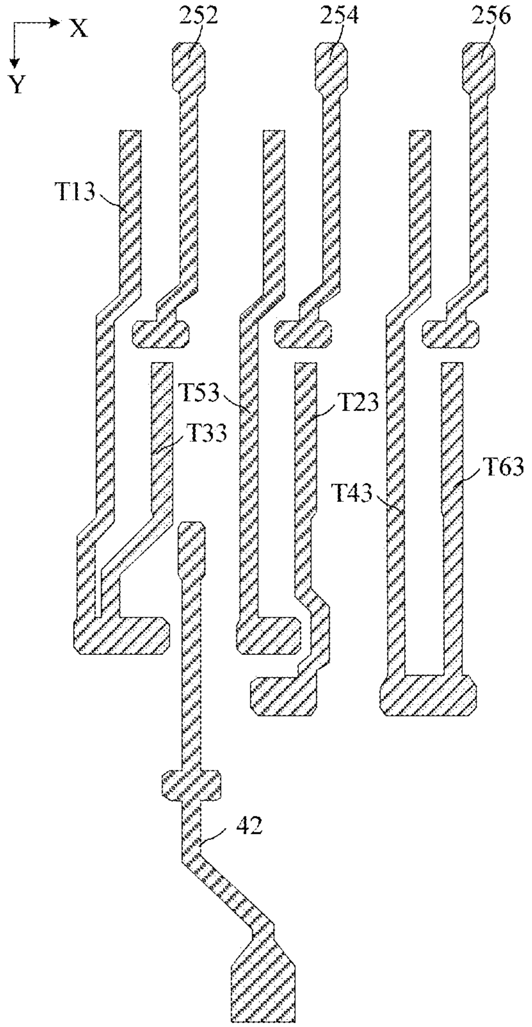
FIG. 20B is a schematic plan view of the first conductive layer in FIG. 20A.

FIG. 20A is a schematic diagram of the display panel after a first conductive layer is formed in FIG. 18. FIG. 20B is a schematic plan view of the first conductive layer in FIG. 20A. In some examples, as shown in FIGS. 20A and 20B, the first conductive layer of the first bezel region may include at least: gates of a plurality of multiplexing transistors (including, for example, a gate T13 of the first multiplexing transistor T1, a gate T23 of the second multiplexing transistor T2, a gate T33 of the third multiplexing transistor T3, a gate T43 of the fourth multiplexing transistor T4, a gate T53 of the fifth multiplexing transistor T5, and a gate T63 of the sixth multiplexing transistor T6) of a plurality of multiplexing units of the multiplexing circuit, a plurality of data leading-out lines (including, for example, a second data leading-out line 252, a fourth data leading-out line 254, and a sixth data leading-out line 256), and a second multiplexing data line 42.

In some examples, as shown in FIGS. 20A and 20B, the gate T13 of the first multiplexing transistor T1 and the gate T33 of the third multiplexing transistor T3 may be of an interconnected integral structure. The integral structure of the gate T13 of the first multiplexing transistor T1 and the gate T33 of the third multiplexing transistor T3 may substantially have a card slot shape. The gate T43 of the fourth multiplexing transistor T4 and the gate T63 of the sixth multiplexing transistor T6 may be of an interconnected integral structure. The integral structure of the gate T43 of the fourth multiplexing transistor T4 and the gate T63 of the sixth multiplexing transistor T6 may substantially have a card slot shape.

In some examples, the second data leading-out line 252, the fourth data leading-out line 254, and the sixth data leading-out line 256 may be substantially in a shape of a polyline extending along the second direction Y. The second data leading-out line 252 may be located between the active layer T10 of the first multiplexing transistor T1 and the active layer T50 of the fifth multiplexing transistor T5, and one connection end of the second data leading-out line 252 may be located between the active layer T10 of the first multiplexing transistor and the active layer T30 of the third multiplexing transistor. The fourth data leading-out line 254 may be located between the active layer T40 of the fourth multiplexing transistor T4 and the active layer T50 of the fifth multiplexing transistor T5, and one connection end of the fourth data leading-out line 254 may be located between the active layer of the fifth multiplexing transistor T5 and the active layer T20 of the second multiplexing transistor T2. The sixth data leading-out line 256 may be located on a side of the active layer T40 of the fourth multiplexing transistor T4 away from the fourth data leading-out line 254, and one connection end of the sixth data leading-out line 256 may be located between the active layer T40 of the fourth multiplexing transistor T4 and the active layer T60 of the sixth multiplexing transistor T6.

In some examples, the second multiplexing data line 42 may be substantially in a shape of a polyline extending along the second direction Y. A first connection end of the second multiplexing data line 42 may be located on a side of the active layer T30 of the third multiplexing transistor in the second direction Y, and a second connection end of the second multiplexing data line 42 may extend to a side of the bending region.

Figure 21A:
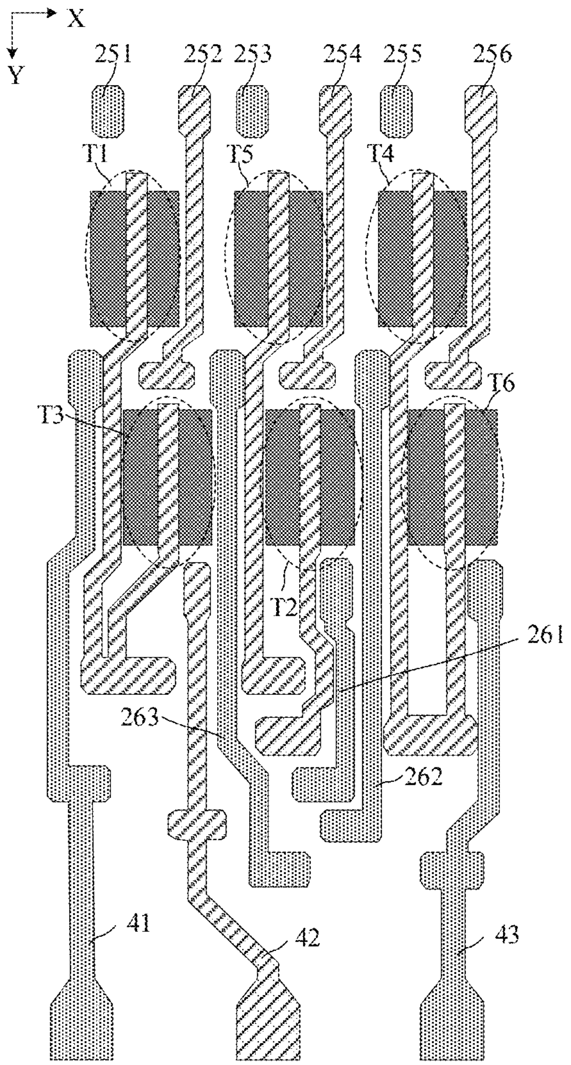
FIG. 21A is a schematic diagram of the display panel after a second conductive layer is formed in FIG. 18.
Figure 21B:
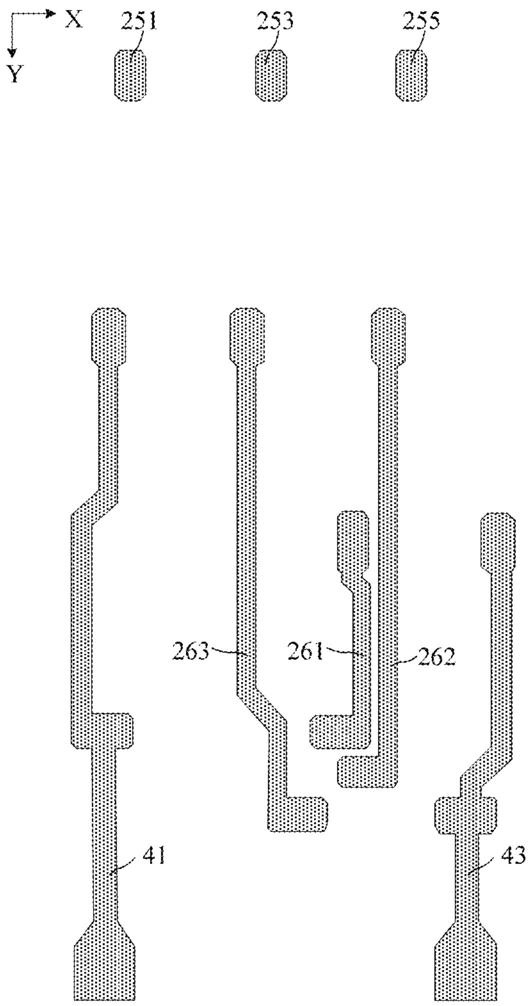
FIG. 21B is a schematic plan view of the second conductive layer in FIG. 21A.

FIG. 21A is a schematic diagram of the display panel after a second conductive layer is formed in FIG. 18. FIG. 21B is a schematic plan view of the second conductive layer in FIG. 21A. In some examples, as shown in FIGS. 21A and 21B, the second conductive layer of the first bezel region may include at least a plurality of data leading-out lines (including, for example, a first data leading-out line 251, a third data leading-out line 253, and a fifth data leading-out line 255), a first multiplexing data line 41, a third multiplexing data line 43, a first multiplexing connection line 261, a second multiplexing connection line 262, and a third multiplexing connection line 263.

In some examples, as shown in FIGS. 21A and 21B, the first data leading-out line 251, the second data leading-out line 252, the third data leading-out line 253, the fourth data leading-out line 254, the fifth data leading-out line 255, and the sixth data leading-out line 256 may be sequentially arranged along the first direction X. Orthographic projections of the first data leading-out line 251, the second data leading-out line 252, the third data leading-out line 253, the fourth data leading-out line 254, the fifth data leading-out line 255, and the sixth data leading-out line 256 on the base substrate may not be overlapped. The first data leading-out line 251, the third data leading-out line 253, and the fifth data leading-out line 255 may be located on a side of multiplexing transistors of a first row in an opposite direction of the second direction Y. In this example, a plurality of data leading-out lines may be alternately arranged in the first conductive layer and the second conductive layer, and a pitch between adjacent data leading-out lines may be reduced, thereby reducing space occupied by a trace, which is beneficial to narrowing a bezel.

In some examples, the first multiplexing data line 41 may be substantially in a shape of a polyline extending along the second direction Y. The first multiplexing data line 41 may be located on a side of the active layer T30 of the third multiplexing transistor T3 away from the third multiplexing connection line 263. A first connection end of the first multiplexing data line 41 may be located on a side of the active layer T10 of the first multiplexing transistor T1 in the second direction Y, and may be adjacent to the gate T13 of the first multiplexing transistor T1. A second connection end of the first multiplexing data line 41 may be aligned with a second connection end of the second multiplexing data line 42 in the first direction X.

In some examples, the third multiplexing data line 43 may be substantially in a shape of a polyline extending along the second direction Y. A first connection end of the third multiplexing data line 43 may be located on a side of the active layer T60 of the sixth multiplexing transistor in the second direction Y, and may be adjacent to the gate T63 of the sixth multiplexing transistor. A second connection end of the third multiplexing data line 43 may be aligned with the second connection end of the first multiplexing data line 41 and the second connection end of the second multiplexing data line 42 in the first direction X.

In some examples, the first multiplexing connection line 261 may be substantially in a shape of a polyline extending along the second direction Y. A first connection end of the first multiplexing connection line 261 may be located on one side of the active layer T20 of the second multiplexing transistor in the second direction Y, and a second connection end of the first multiplexing connection line 261 is adjacent to the gate T23 of the second multiplexing transistor.

In some examples, the second multiplexing connection line 262 may be substantially in a shape of a straight line extending along the second direction Y. The second multiplexing connection line 262 may be located between the active layer T20 of the second multiplexing transistor and the gate T43 of the fourth multiplexing transistor. A first connection end of the second multiplexing connection line 262 may be located between the fourth data leading-out line 254 and the gate T43 of the fourth multiplexing transistor, and a second connection end of the second multiplexing connection line 262 may be located on a side of the second connection end of the first multiplexing connection line 261 along the second direction Y.

In some examples, the third multiplexing connection line 263 may be substantially in a shape of a polyline extending along the second direction Y. The third multiplexing connection line 263 may be located between the active layer T30 of the third multiplexing transistor and the gate T53 of the fifth multiplexing transistor. A first connection end of the third multiplexing connection line 263 may be located between the second data leading-out line 252 and the gate T53 of the fifth multiplexing transistor, and a second connection end of the third multiplexing connection line 263 may be located on a side of the second connection end of the second multiplexing connection line 262 in the second direction Y.

Figure 22:
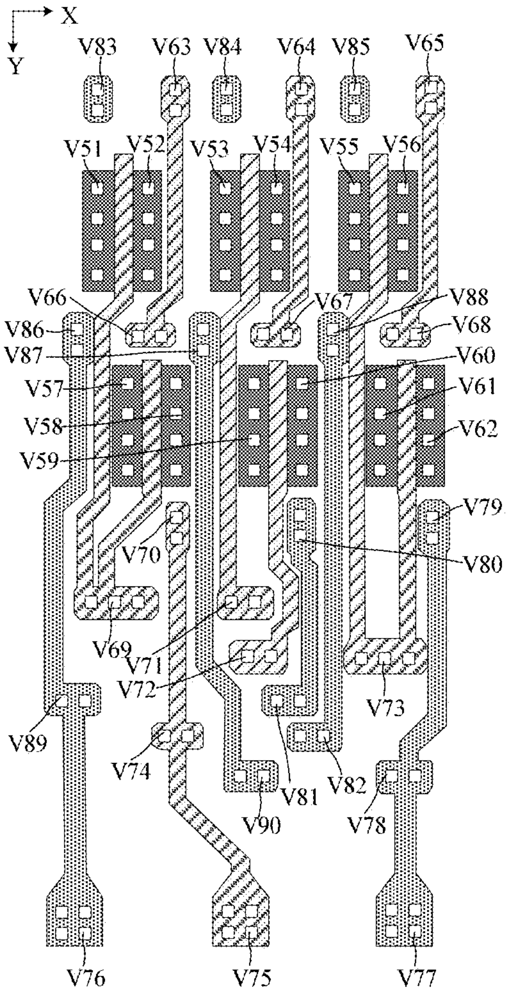
FIG. 22 is a schematic diagram of the display panel after a third insulation layer is formed in FIG. 18.

FIG. 22 is a schematic diagram of the display panel after a third insulation layer is formed in FIG. 18. In some examples, as shown in FIG. 22, the third insulation layer of the first bezel region may be provided with a plurality of vias, and may include, for example, a fifty-first via V51 to a sixty-second via V62, a sixty-third via V63 to a seventy-fifth via V75, and a seventy-sixth via V76 to a ninety via V90.

In some examples, the third insulation layer, the second insulation layer, and the first insulation layer within the fifty-first via V51 to the sixty-second via V62 may be removed, exposing a portion of a surface of the semiconductor layer. The third insulation layer and the second insulation layer within the sixty-third via V63 to the seventy-fifth via V75 may be removed, exposing a portion of a surface of the first conductive layer. The third insulation layer within the seventy-sixth via V76 to the ninety via V90 may be removed to expose a portion of a surface of the second conductive layer.

Figure 23A:
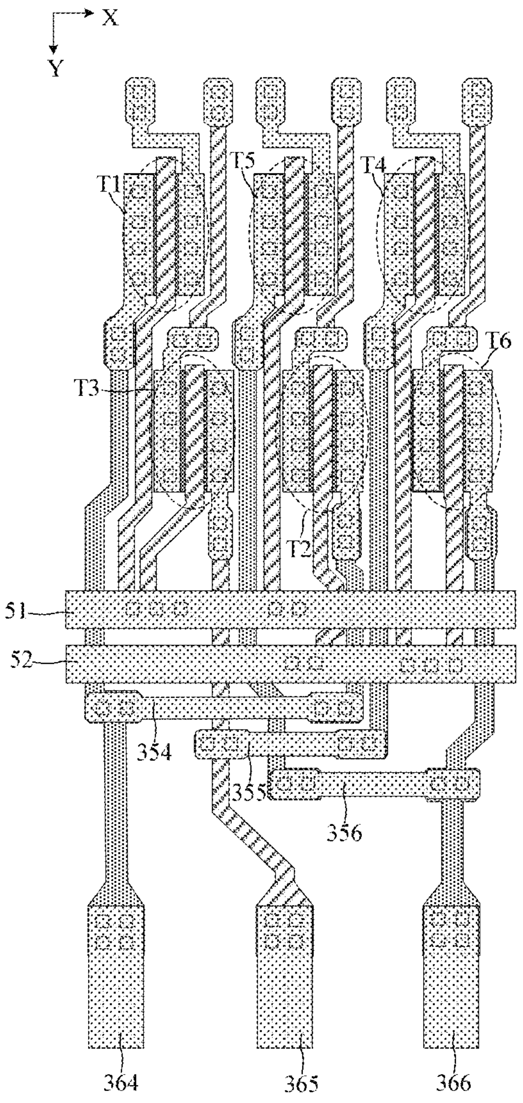
FIG. 23A is a schematic diagram of the display panel after a third conductive layer is formed in FIG. 18.
Figure 23B:
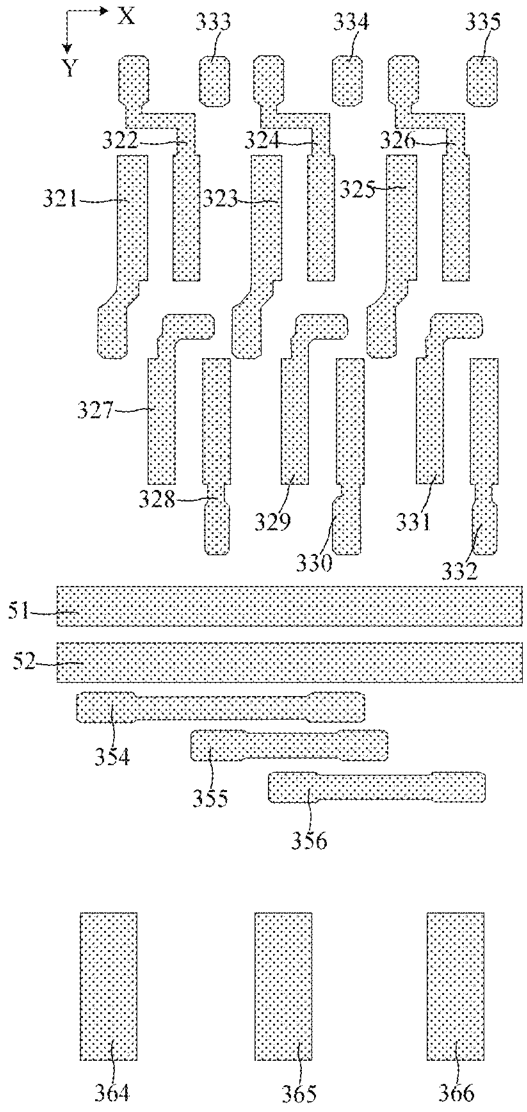
FIG. 23B is a schematic plan view of the third conductive layer in FIG. 23A.

FIG. 23A is a schematic diagram of the display panel after a third conductive layer is formed in FIG. 18. FIG. 23B is a schematic plan view of the third conductive layer in FIG. 23A. In some examples, as shown in FIGS. 23A and 23B, the third conductive layer of the first bezel region may include at least: a plurality of connection electrodes (including, for example, a twenty-first connection electrode 321 to a thirty-fifth connection electrode 335), a plurality of multiplexing connection electrodes (including, for example, a fourth multiplexing connection electrode 354, a fifth multiplexing connection electrode 355, and a sixth multiplexing connection electrode 356), and a plurality of patch lines (including, for example, a fourth patch line 364, a fifth patch line 365, and a sixth patch line 366).

In some examples, the twenty-first connection electrode 321 may substantially have a strip-shaped structure extending along the second direction Y. The twenty-first connection electrode 321 may be electrically connected with a first region of the active layer T10 of the first multiplexing transistor through four fifty-first vias V51 arranged in the vertical direction, and may also be electrically connected with the first multiplexing data line 43 through two eighty-sixth vias V86 arranged in the vertical direction.

In some examples, the twenty-second connection electrode 322 may be substantially in a shape of a polyline extending along the second direction Y. The twenty-second connection electrode 322 may be electrically connected with a second region of the active layer T10 of the first multiplexing transistor through four fifty-second vias V52 arranged in the vertical direction, and may also be electrically connected with the first data leading-out line 251 through two eighty-third vias V83 arranged in the vertical direction.

In some examples, the twenty-third connection electrode 323 may substantially have a strip-shaped structure extending along the second direction Y. The twenty-third connection electrode 323 may be electrically connected with a first region of the active layer T50 of the fifth multiplexing transistor through four fifty-third vias V53 arranged in the vertical direction, and may also be electrically connected with the third multiplexing connection line 263 through two eighty-seventh vias V87 arranged in the vertical direction.

In some examples, the twenty-fourth connection electrode 324 may be substantially in a shape of a polyline extending along the second direction Y. The twenty-fourth connection electrode 324 may be electrically connected with a second region of the active layer T50 of the fifth multiplexing transistor through four fifty-fourth vias V54 arranged in the vertical direction, and may also be electrically connected with the third data leading-out line 253 through two eighty-fourth vias V84 arranged in the vertical direction.

In some examples, the twenty-fifth connection electrode 325 may substantially have a strip-shaped structure extending along the second direction Y. The twenty-fifth connection electrode 325 may be electrically connected with a first region of the active layer T40 of the fourth multiplexing transistor through four fifty-fifth vias V55 arranged in the vertical direction, and may also be electrically connected with the second multiplexing connection line 262 through two eighty-eighth vias V88 arranged in the vertical direction.

In some examples, the twenty-sixth connection electrode 326 may be substantially in a shape of a polyline extending along the second direction Y. The twenty-sixth connection electrode 326 may be electrically connected with a second region of the active layer T40 of the fourth multiplexing transistor through four fifty-sixth vias V56 arranged in the vertical direction, and may also be electrically connected with the fifth data leading-out line 255 through two eighty-fifth vias V85 arranged in the vertical direction.

In some examples, the twenty-seventh connection electrode 327 may be substantially in a shape of a polyline extending along the second direction Y. The twenty-seventh connection electrode 327 may be electrically connected with a first region of the active layer T30 of the third multiplexing transistor through four fifty-seventh vias V57 arranged in the vertical direction, and may also be electrically connected with the second data leading-out line 252 through two sixty-sixth vias V66 arranged in the vertical direction.

In some examples, the twenty-eighth connection electrode 328 may substantially have a strip-shaped structure extending along the second direction Y. The twenty-eighth connection electrode 328 may be electrically connected with a second region of the active layer T30 of the third multiplexing transistor through four fifty-eighth vias V58 arranged in the vertical direction, and may also be electrically connected with the second multiplexing data line 42 through two seventieth vias V70 arranged in the vertical direction.

In some examples, the twenty-ninth connection electrode 329 may be substantially in a shape of a polyline extending along the second direction Y. The twenty-ninth connection electrode 329 may be electrically connected with a first region of the active layer T20 of the second multiplexing transistor through four fifty-ninth vias V59 arranged in the vertical direction, and may also be electrically connected with the fourth data leading-out line 254 through two sixty-seventh vias V67 arranged in the vertical direction.

In some examples, the thirtieth connection electrode 330 may substantially have a strip-shaped structure extending along the second direction Y. The thirtieth connection electrode 330 may be electrically connected with a second region of the active layer T20 of the second multiplexing transistor through four sixtieth vias V60 arranged in the vertical direction, and may also be electrically connected with the first multiplexing connection line 261 through two eightieth vias V80 arranged in the vertical direction.

In some examples, the thirty-first connection electrode 331 may be substantially in a shape of a polyline extending along the second direction Y. The thirty-first connection electrode 331 may be electrically connected with a first region of the active layer T60 of the sixth multiplexing transistor through four sixty-first vias V61 arranged in the vertical direction, and may also be electrically connected with the sixth data leading-out line 256 through two sixty-eighth vias V68 arranged in the vertical direction.

In some examples, the thirty-second connection electrode 332 may substantially have a strip-shaped structure extending along the second direction Y. The thirty-second connection electrode 332 may be electrically connected with a second region of the active layer T60 of the sixth multiplexing transistor through four sixty-second vias V62 arranged in the vertical direction, and may also be electrically connected with the third multiplexing data line 43 through two seventy-ninth vias V79 arranged in the vertical direction.

In some examples, the thirty-third connection electrode 333 may be electrically connected with the second data leading-out line 252 through two sixty-third vias V63 arranged in the vertical direction. The thirty-fourth connection electrode 334 may be electrically connected with the fourth data leading-out line 254 through two sixty-fourth vias V64 arranged in the vertical direction. The thirty-fifth connection electrode 335 may be electrically connected with the sixth data leading-out line 256 through two sixty-fifth vias V65 arranged in the vertical direction. In this example, uniformity of openings may be ensured by opening the sixty-third via, the sixty-fourth via, and the sixty-fifth via, and uniformity of resistance of a plurality of data leading-out lines may be ensured by setting the thirty-third connection electrode, the thirty-fourth connection electrode, and the thirty-fifth connection electrode to ensure consistency of signal transmission.

In some examples, the first multiplexing control line 51 and the second multiplexing control line 52 may be at least in a shape of a straight line extending along the first direction X. The second multiplexing control line 52 may be located on a side of the first multiplexing control line 51 in the second direction Y. The first multiplexing control line 51 may be located on a same side of the twenty-eighth connection electrode 328, the thirtieth connection electrode 330, and the thirty-second connection electrode 332 in the second direction Y.

In some examples, the fourth multiplexing connection electrode 354, the fifth multiplexing connection electrode 355, and the sixth multiplexing connection electrode 356 may be located on one side of the second multiplexing control line 52 in the second direction Y. The fourth multiplexing connection electrode 354, the fifth multiplexing connection electrode 355, and the sixth multiplexing connection electrode 356 may substantially have a strip-shaped structure extending along the first direction X. The fifth multiplexing connection electrode 355 may be located on a side of the fourth multiplexing connection electrode 354 in the second direction Y, and the sixth multiplexing connection electrode 356 may be located on a side of the fifth multiplexing connection electrode 355 in the second direction Y.

In some examples, the fourth patch line 364, the fifth patch line 365, and the sixth patch line 366 may have a strip-shaped structure extending along the second direction Y. The fourth patch line 364, the fifth patch line 365, and the sixth patch line 366 may be sequentially arranged along the first direction X. The fourth patch line 364, the fifth patch line 365, and the sixth patch line 366 may be located on a side of the sixth multiplexing connection electrode 356 in the second direction Y.

In some examples, the first multiplexing control line 51 may be electrically connected with an integral structure of the gate T13 of the first multiplexing transistor and the gate T33 of the third multiplexing transistor through three sixty-ninth vias V69 arranged in the transverse direction, and may also be electrically connected with the gate T53 of the fifth multiplexing transistor through two seventy-first vias V71 arranged in the transverse direction. The second multiplexing control line 52 may be electrically connected with the gate T23 of the second multiplexing transistor through two seventy-second vias V72 arranged in the transverse direction, or may also be electrically connected with an integral structure of the gate T43 of the fourth multiplexing transistor and the gate T63 of the sixth multiplexing transistor through three seventy-third vias V73 arranged in the transverse direction.

In some examples, the fourth multiplexing connection electrode 354 may be electrically connected with the first multiplexing data line 41 through two eighty-ninth vias V89 arranged in the transverse direction, and may also be electrically connected with the first multiplexing connection line 261 through two eighty-first vias V81 arranged in the transverse direction. The fifth multiplexing connection electrode 355 may be electrically connected with the second multiplexing data line 42 through two seventy-fourth vias V74 arranged in the transverse direction, and may also be electrically connected with the second multiplexing connection line 262 through two eighty-second vias V82 arranged in the transverse direction. The sixth multiplexing connection electrode 356 may be electrically connected with the third multiplexing connection line 263 through two ninetieth vias V90 arranged in the transverse direction, and may also be electrically connected with the third multiplexing data line 43 through two seventy-eighth vias V78 arranged in the transverse direction.

In some examples, the fourth patch line 364 may be electrically connected with the first multiplexing data line 41 through a plurality of seventy-sixth vias V76 arranged in an array. The fifth patch line 365 may be electrically connected with the second multiplexing data line 42 through a plurality of seventy-fifth vias V75 arranged in an array. The sixth patch line 366 may be electrically connected with the third multiplexing data line 43 through a plurality of seventy-seventh vias V77 arranged in an array.

Figure 24:
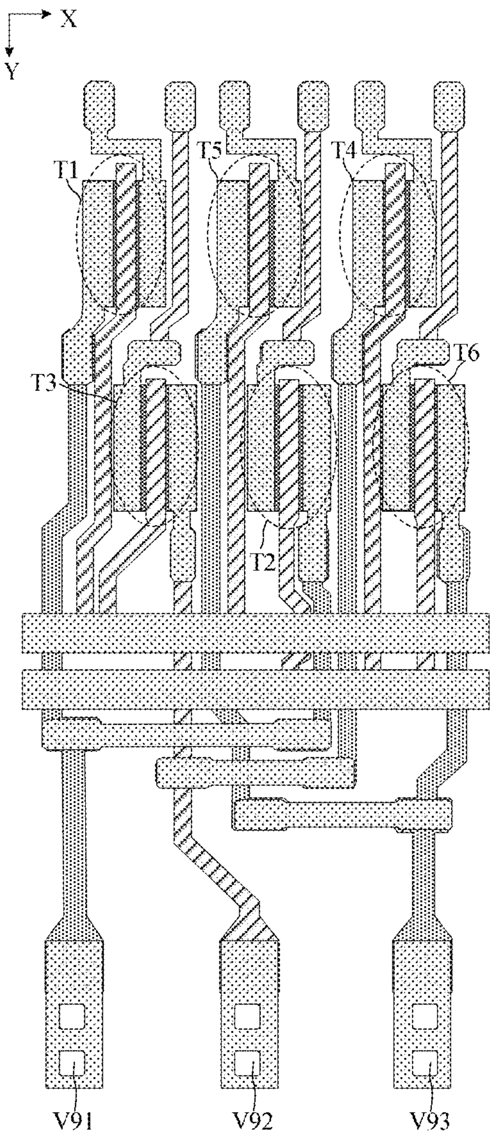
FIG. 24 is a schematic diagram of the display panel after a fifth insulation layer is formed in FIG. 18.

FIG. 24 is a schematic diagram of the display panel after a fifth insulation layer is formed in FIG. 18. In some examples, as shown in FIG. 24, the fourth insulation layer and the fifth insulation layer of the first bezel region may be provided with a plurality of vias, which may include, for example, a ninety-first via V91 to a ninety-third via V93. The fifth insulation layer and the fourth insulation layer within the ninety-first via V91 to the ninety-third via V93 may be removed, exposing a portion of a surface of the third conductive layer.

In some examples, as shown in FIG. 18, the fourth conductive layer of the first bezel region may include at least a plurality of data bending connection lines (e.g., including a first data bending connection line 401, a second data bending connection line 402, and a third data bending connection line 403). The plurality of data bending connection lines may extend along the second direction Y and be sequentially arranged along the first direction X. The first data bending connection line 401 may be electrically connected with the fourth patch line 364 through two ninety-first vias V91 arranged in the vertical direction, the second data bending connection line 402 may be electrically connected with the fifth patch line 365 through two ninety-second vias V92 arranged in the vertical direction, and the third data bending connection line 403 may be electrically connected with the sixth patch line 366 through two ninety-third vias V93 arranged in the vertical direction.

In this example, by arranging a plurality of multiplexing transistors of the multiplexing circuit in two rows, occupied space of the multiplexing circuit in the second direction may be reduced, and it is beneficial to compress space required by the multiplexing circuit. Regarding a preparation method of the display panel of this example, reference may be made to description of the aforementioned embodiments, and it will not be repeated here.

In some other examples, in a case that space of the first bezel region is sufficient, a plurality of multiplexing transistors of the multiplexing unit may be arranged in one row and sequentially arranged along the first direction.

In some other examples, in a case that a size of the first bezel region of the display panel along the first direction is relatively narrow and a size along the second direction is relatively large, multiplexing transistors of the multiplexing unit may be arranged in four or more rows. For example, the multiplexing transistors of the multiplexing circuit may be arranged in six rows; the first multiplexing transistor to the sixth multiplexing transistor may be sequentially arranged along the second direction, and a plurality of first multiplexing transistors are arranged in one row, a plurality of second multiplexing transistors are arranged in one row, a plurality of third multiplexing transistors are arranged in one row, a plurality of fourth multiplexing transistors are arranged in one row, a plurality of fifth multiplexing transistors are arranged in one row, and a plurality of sixth multiplexing transistors are arranged in one row. The embodiment is not limited thereto.

Figure 25:
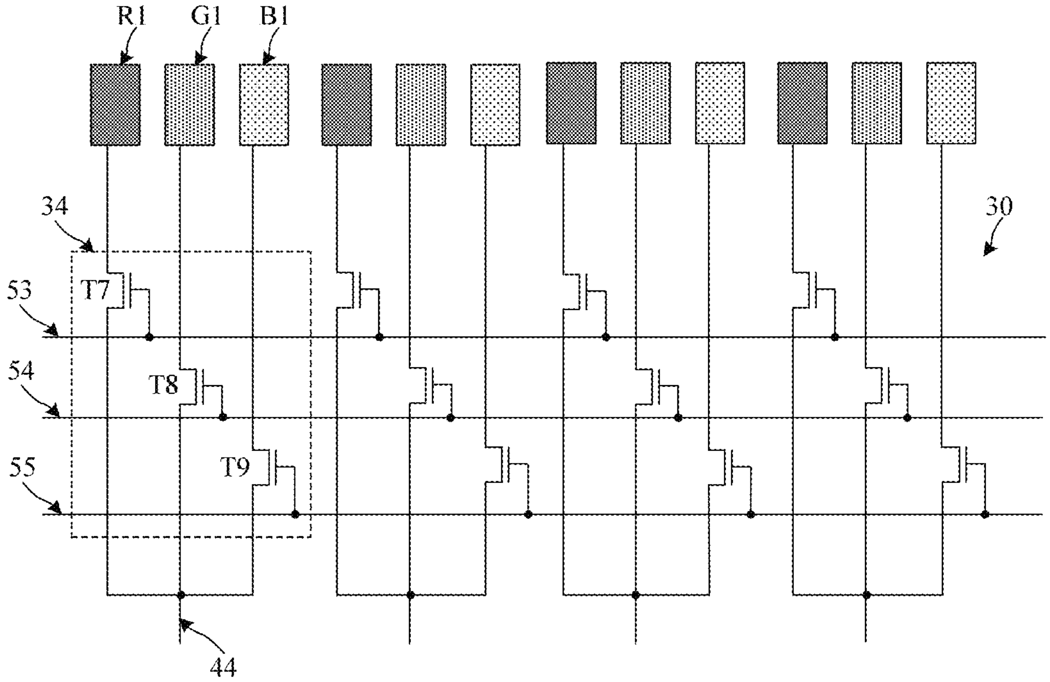
FIG. 25 is another equivalent circuit diagram of a multiplexing circuit according to at least one embodiment of the present disclosure.

FIG. 25 is another equivalent circuit diagram of a multiplexing circuit according to at least one embodiment of the present disclosure. In some examples, as shown in FIG. 25, a multiplexing circuit 30 may include a plurality of multiplexing units. One multiplexing unit 34 may be configured to supply a data signal provided by one multiplexing data line to a plurality of data lines (e.g., three data lines).

In some examples, as shown in FIG. 25, one multiplexing unit 34 may be electrically connected with three multiplexing control lines (including, for example, a third multiplexing control line 53, a fourth multiplexing control line 54, and a fifth multiplexing control line 55), one multiplexing data line, and a plurality of data lines (for example, three data lines). Each multiplexing unit 34 may include three multiplexing transistors. Three data lines with which one multiplexing unit 34 is connected may be electrically connected with sub-pixels that emit light of different colors. A connection mode of a multiplexing unit of the example may effectively save a required data signal.

FIG. 25 is illustrated by taking four multiplexing units of a multiplexing circuit as an example. A connection mode of each multiplexing unit is similar, and following description is made by taking one multiplexing unit as an example. In some examples, as shown in FIG. 25, the multiplexing unit 34 may include a seventh multiplexing transistor T7, an eighth multiplexing transistor T8, and a ninth multiplexing transistor T9. A gate of the seventh multiplexing transistor T7 is electrically connected with a third multiplexing control line 53, a first electrode of the seventh multiplexing transistor T7 is electrically connected with a multiplexing data line (such as a fourth multiplexing data line 44), and a second electrode of the seventh multiplexing transistor T7 is electrically connected with a first data line. The first data line may be electrically connected with a column of first sub-pixels R1. A gate of the eighth multiplexing transistor T8 is electrically connected with a fourth multiplexing control line 54, a first electrode of the eighth multiplexing transistor T8 is electrically connected with the fourth multiplexing data line 44, and a second electrode of the eighth multiplexing transistor T8 is electrically connected with a second data line. The second data line may be electrically connected with a column of second sub-pixels G1. A gate of the ninth multiplexing transistor T9 is electrically connected with a fifth multiplexing control line 55, a first electrode of the ninth multiplexing transistor T9 is electrically connected with the fourth multiplexing data line 44, and a second electrode of the ninth multiplexing transistor T9 is electrically connected with a third data line. The third data line may be electrically connected with a column of third sub-pixels B1. A column of first sub-pixels R1, a column of second sub-pixels G1, and a column of third sub-pixels B1 may be configured to emit light of different colors. For example, one column of first sub-pixels R1 may emit red light, one column of second sub-pixels G1 may emit green light, and one column of third sub-pixels B1 may emit blue light.

In this example, data signals received by three adjacent sub-pixels that emit light of different colors may be controlled by a same multiplexing unit, and a 1:3 design (that is, a design in which one multiplexing data line provides data signals to three data lines) may be beneficial to achieve a requirement of a high refresh rate.

Figure 26:
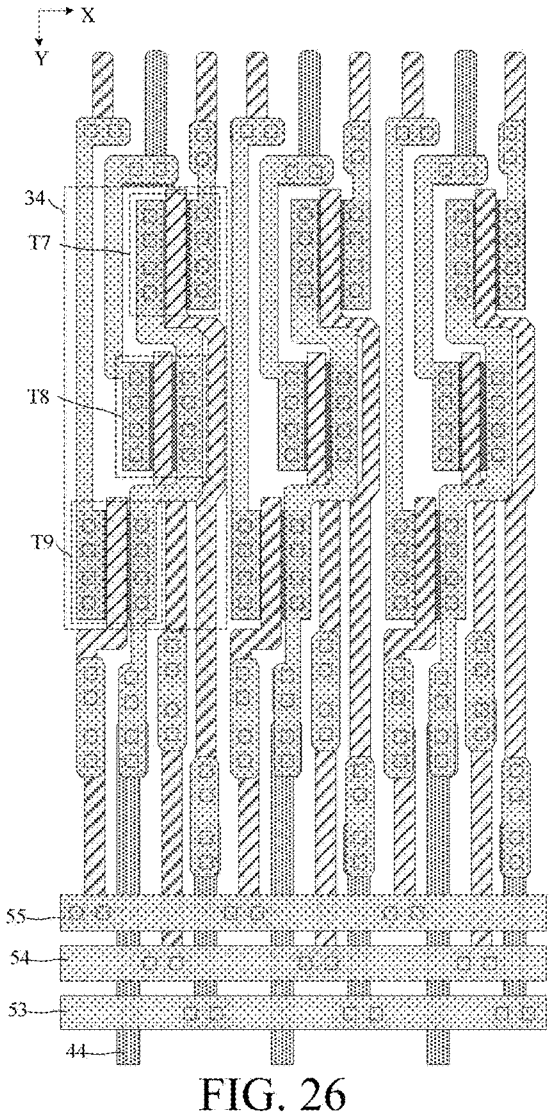
FIG. 26 is a partial plan view of a multiplexing circuit according to at least one embodiment of the present disclosure.

FIG. 26 is a partial plan view of a multiplexing circuit according to at least one embodiment of the present disclosure. FIG. 26 is illustrated by taking a planar structure of three multiplexing units as an example. Hereinafter, description is made by taking a planar structure of one multiplexing unit 34 as an example. In this example, a first connection end of a trace is a connection end close to the display region, and a second connection end is a connection end far from the display region.

In some examples, as shown in FIG. 26, a plurality of multiplexing units 34 may be sequentially arranged along the first direction X. Three multiplexing transistors included in each multiplexing unit 34 may be arranged along the second direction Y. Multiplexing transistors of the multiplexing circuit of this example may be arranged in three rows. A plurality of seventh multiplexing transistors T7 may be arranged in one row, a plurality of eighth multiplexing transistors T8 may be arranged in one row, and a plurality of ninth multiplexing transistors T9 may be arranged in one row. A column of multiplexing transistors may include a seventh multiplexing transistor T7, an eighth multiplexing transistor T8, and a ninth multiplexing transistor T9 arranged sequentially along the second direction Y.

In some examples, as shown in FIG. 26, in a direction perpendicular to the display panel, the first bezel region may include at least a base substrate, and a semiconductor layer, a first conductive layer, a second conductive layer, and a third conductive layer disposed on the base substrate.

Figure 27:
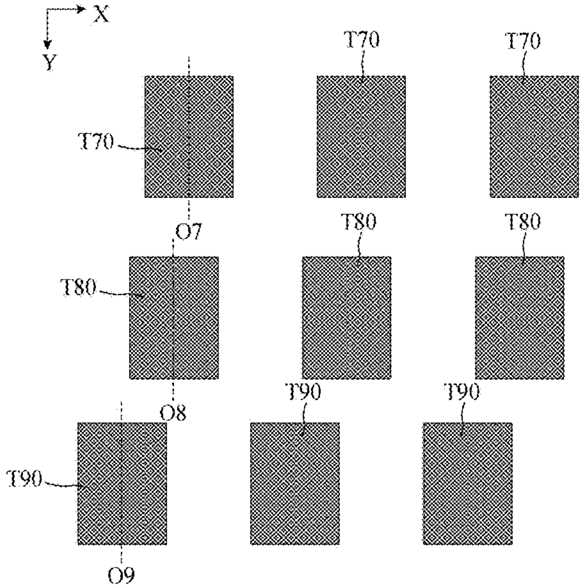
FIG. 27 is a schematic diagram of a display panel after a semiconductor layer is formed in FIG. 26.

FIG. 27 is a schematic diagram of the display panel after a semiconductor layer is formed in FIG. 26. In some examples, as shown in FIG. 27, the semiconductor layer of the first bezel region may include at least active layers of multiple multiplexing transistors of multiple multiplexing units of the multiplexing circuit, for example, include an active layer T70 of the seventh multiplexing transistor, an active layer T80 of the eighth multiplexing transistor, and an active layer T90 of the ninth multiplexing transistor.

In some examples, shapes and sizes of the orthographic projections of the active layer T70 of the seventh multiplexing transistor, the active layer T80 of the eighth multiplexing transistor, and the active layer T90 of the ninth multiplexing transistor on the base substrate may be substantially the same, for example, the orthographic projections may be substantially rectangular in shape with a same size.

In some examples, the active layer T70 of the seventh multiplexing transistor has a seventh centerline O7, the active layer T80 of the eighth multiplexing transistor has an eighth centerline O8, and the active layer T90 of the ninth multiplexing transistor has a ninth centerline O9, the seventh centerline O7, the eighth centerline O8, and the ninth centerline O9 are all parallel to the second direction Y. The eighth centerline O8 of the active layer T80 of the eighth multiplexing transistor may be located on a side of the ninth centerline O9 of the active layer T90 of the ninth multiplexing transistor in the first direction X, and the seventh centerline O7 of the active layer T70 of the seventh multiplexing transistor may be located on a side of the eighth centerline O8 of the active layer T80 of the eighth multiplexing transistor in the first direction X. In the first direction X, a distance between the eighth centerline O8 and the ninth centerline O9 may be greater than a distance between the eighth centerline O8 and the seventh centerline O7. However, the embodiment is not limited thereto.

Figure 28A:
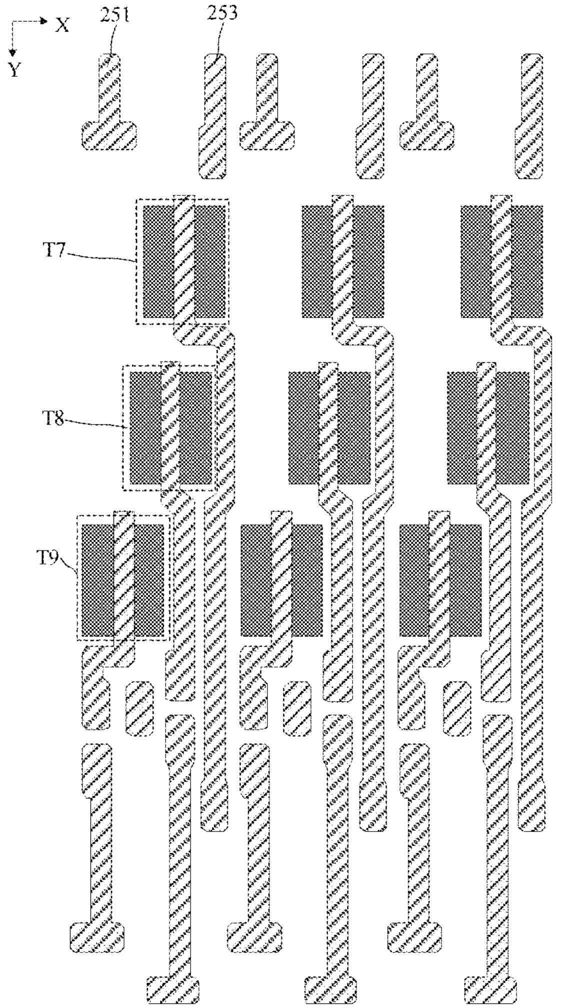
FIG. 28A is a schematic diagram of the display panel after a first conductive layer is formed in FIG. 26.
Figure 28B:
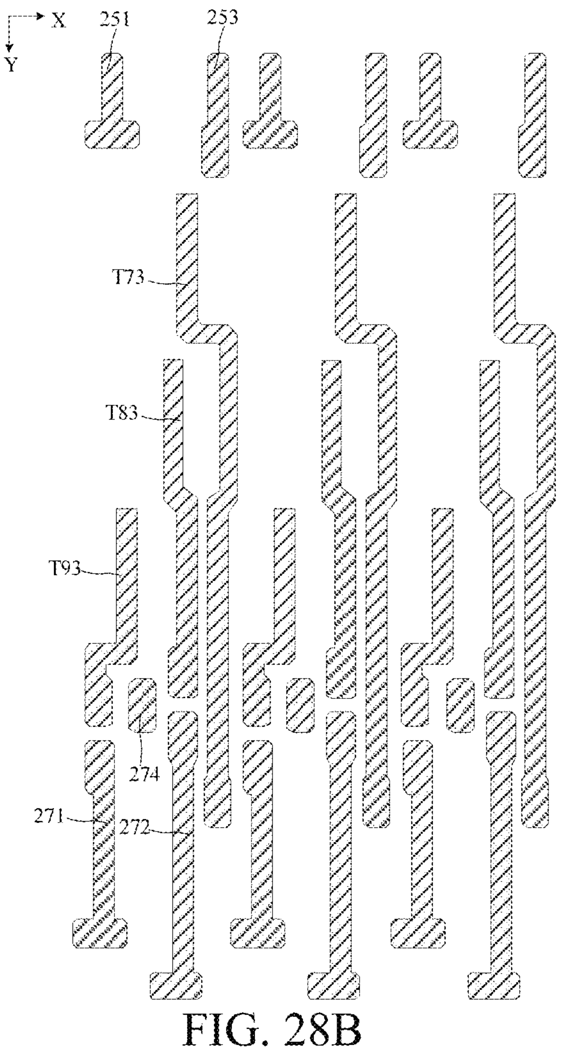
FIG. 28B is a schematic plan view of the first conductive layer in FIG. 28A.

FIG. 28A is a schematic diagram of the display panel after a first conductive layer is formed in FIG. 26. FIG. 28B is a schematic plan view of the first conductive layer in FIG. 28A. In some examples, as shown in FIGS. 28A and 28B, the first conductive layer of the first bezel region may include at least: gates of a plurality of multiplexing transistors of the multiplexing circuit (including, for example, a gate T73 of the seventh multiplexing transistor T7, a gate T83 of the eighth multiplexing transistor T8, and a gate T93 of the ninth multiplexing transistor T9), a plurality of data leading-out lines (including, for example, a first data leading-out line 251 and a third data leading-out line 253), and a plurality of conductive connection blocks (including, for example, a first conductive connection block 271, a second conductive connection block 272, and a fourth conductive connection block 274).

In some examples, the gate T93 of the ninth multiplexing transistor T9, the gate T83 of the eighth multiplexing transistor T8, and the gate T73 of the seventh multiplexing transistor T7 may be sequentially arranged along the first direction X, and may gradually decrease in length along the second direction Y.

In some examples, the first data leading-out line 251 and the third data leading-out line 253 may be located on a side of the active layer T70 of the seventh multiplexing transistor in an opposite direction of the second direction Y. The first conductive connection block 271, the second conductive connection block 272, and the fourth conductive connection block 274 may be located on a side of the active layer T90 of the ninth multiplexing transistor in the second direction Y. The first conductive connection block 271 is aligned with one end of the gate T93 of the ninth multiplexing transistor in the second direction Y, and the second conductive connection block 272 is aligned with one end of the gate T83 of the eighth multiplexing transistor in the second direction Y. The fourth conductive connection block 274 may be located between the gate T93 of the ninth multiplexing transistor and the second conductive connection block 272.

Figure 29A:
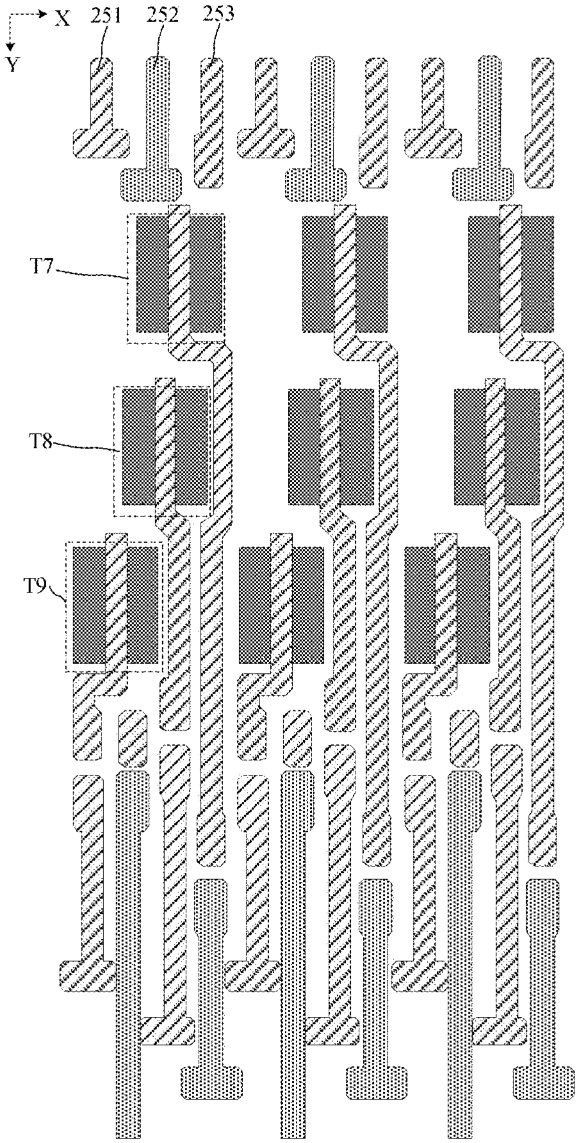
FIG. 29A is a schematic diagram of the display panel after a second conductive layer is formed in FIG. 26.
Figure 29B:
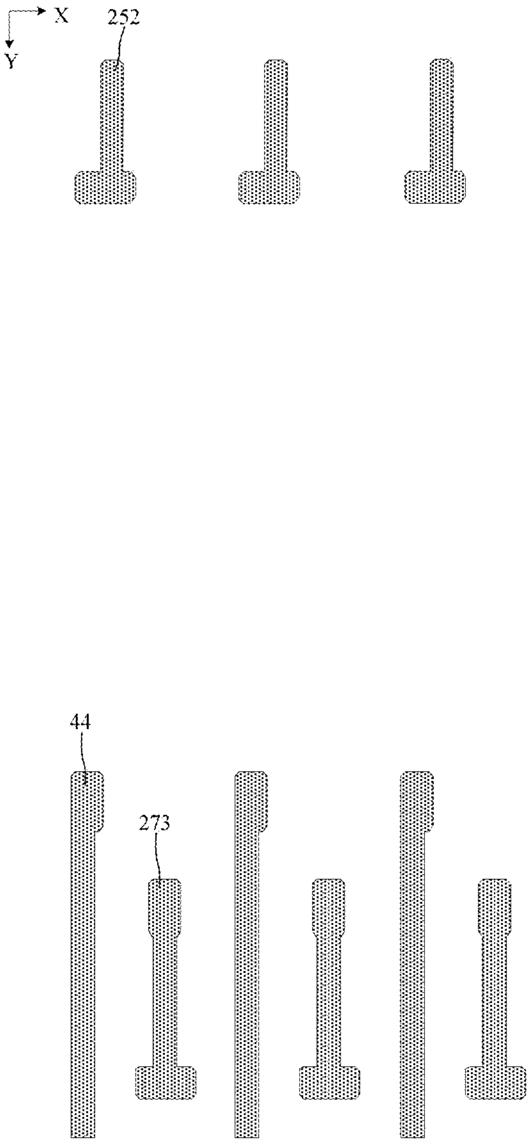
FIG. 29B is a schematic plan view of the second conductive layer in FIG. 29A.

FIG. 29A is a schematic diagram of the display panel after a second conductive layer is formed in FIG. 26. FIG. 29B is a schematic plan view of the second conductive layer in FIG. 29A. In some examples, as shown in FIGS. 29A and 29B, the second conductive layer of the first bezel region may include at least a plurality of data leading-out lines (e.g., including the second data leading-out line 252), a plurality of conductive connection blocks (e.g., including the third conductive connection block 273), and a multiplexing data line (e.g., the fourth multiplexing data line 44).

In some examples, the second data leading-out line 252 may be located between the first data leading-out line 251 and the third data leading-out line 253. The third conductive connection block 273 may be located on one side of the gate T73 of the seventh multiplexing transistor in the second direction Y, and may be aligned with one end of the gate T73 of the seventh multiplexing transistor in the second direction Y. The fourth multiplexing data line 44 may be located on a side of the fourth conductive connection block 274 in the second direction Y and aligned with the fourth conductive connection block 274 in the second direction Y.

Figure 30:
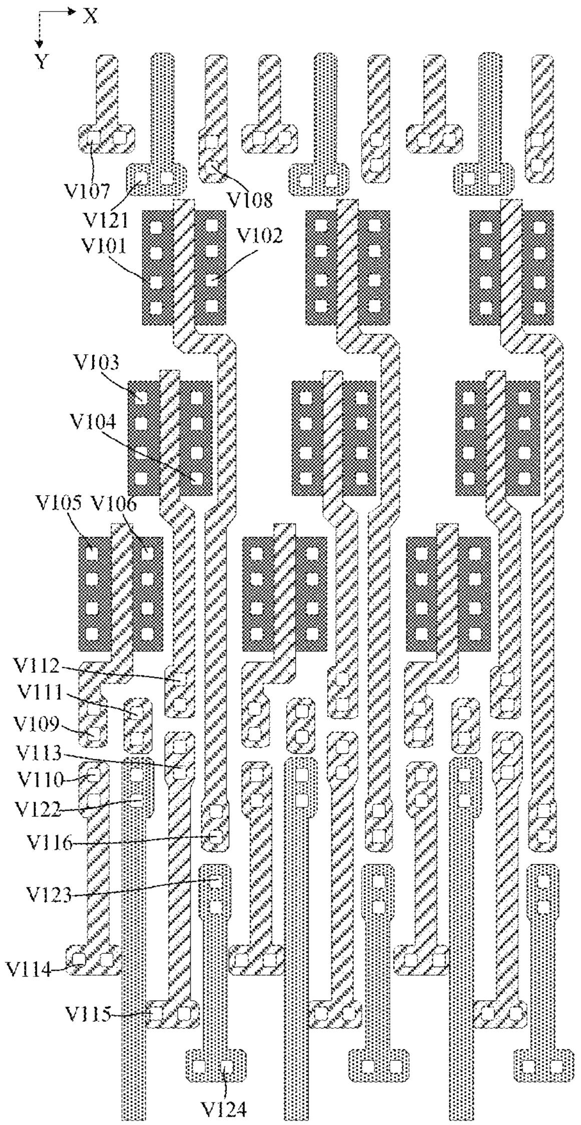
FIG. 30 is a schematic diagram of the display panel after a third insulation layer is formed in FIG. 26.

FIG. 30 is a schematic diagram of the display panel after a third insulation layer is formed in FIG. 26. In some examples, as shown in FIG. 30, the third insulation layer of the first bezel region may be provided with a plurality of vias, and may include, for example, a 101st via V101 to a 106th via V106, a 107th via V107 to a 116th via V116, and a 121st via V121 to a 124th via V124.

In some examples, the third insulation layer, the second insulation layer, and the first insulation layer within the 101st via V101 to the 106th via V106 may be removed, exposing a portion of a surface of the semiconductor layer; the third insulation layer and the second insulation layer within the 107th via V107 to the 116th via V116 may be removed to expose a portion of a surface of the first conductive layer; the third insulation layer within the 121st via V121 to the 124th via V124 may be removed to expose a portion of a surface of the second conductive layer.

Figure 31:
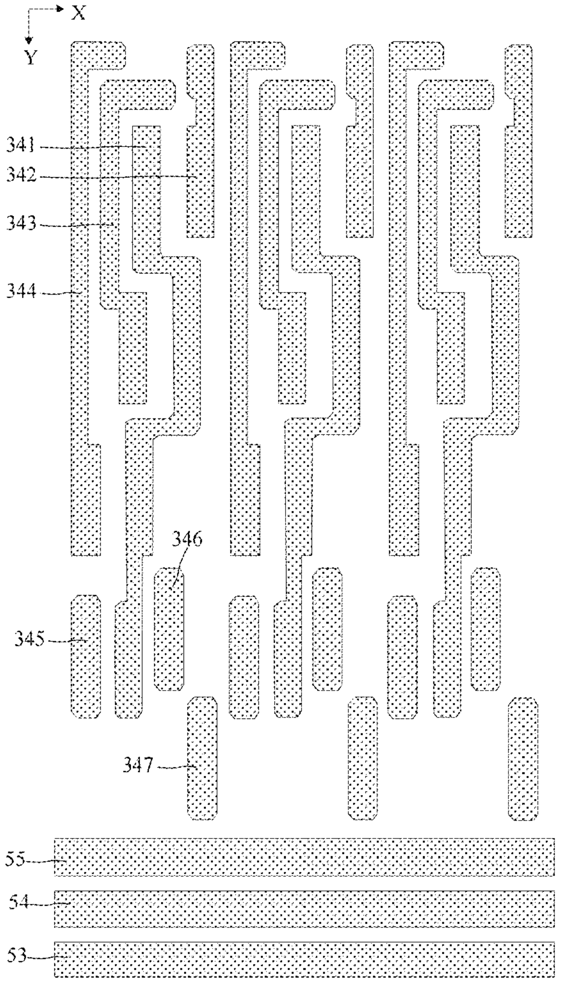
FIG. 31 is a schematic plan view of the third conductive layer in FIG. 26.

FIG. 31 is a schematic plan view of the third conductive layer in FIG. 26. In some examples, as shown in FIGS. 26 and 31, the third conductive layer of the first bezel region may include at least a plurality of connection electrodes (including, for example, a forty-first connection electrode 341 to a forty-seventh connection electrode 347), a third multiplexing control line 53, a fourth multiplexing control line 54, and a fifth multiplexing control line 55.

In some examples, the forty-first connection electrode 341 may be substantially in a shape of a polyline extending along the second direction Y. The forty-first connection electrode 341 may be connected with a first region of the active layer T70 of the seventh multiplexing transistor through four 101st vias V101 arranged in the vertical direction, may also be connected with a first region of the active layer T80 of the eighth multiplexing transistor through four 104th vias V104 arranged in the vertical direction, may also be connected with a first region of the active layer T90 of the ninth multiplexing transistor through four 106th vias V106 arranged in the vertical direction, may also be electrically connected with the fourth conductive connection block 274 through two 111th vias V111 arranged in the vertical direction, and may also be electrically connected with the fourth multiplexing data line 44 through two 122nd vias V122 arranged in the vertical direction.

In some examples, the forty-second connection electrode 342 may have substantially a strip-shaped structure extending along the second direction Y. The forty-second connection electrode 342 may be connected with a second region of the active layer T70 of the seventh multiplexing transistor through four 102nd vias V102 arranged in the vertical direction, and may also be electrically connected with the third data leading-out line 253 through two 108th vias V108 arranged in the vertical direction.

In some examples, the forty-third connection electrode 343 may be substantially in a shape of a polyline extending along the second direction Y. The forty-third connection electrode 343 may be connected with a second region of the active layer T80 of the eighth multiplexing transistor through four 103rd vias V103 arranged in the vertical direction, and may also be electrically connected with the second data leading-out line 252 through two 121st vias V121 arranged in the transverse direction.

In some examples, the forty-fourth connection electrode 344 may be substantially in a shape of a polyline extending along the second direction Y. The forty-fourth connection electrode 344 may be connected with a second region of the active layer T90 of the ninth multiplexing transistor through four 105th vias V105 arranged in the vertical direction, and may also be electrically connected with the first data leading-out line 251 through two 107th vias V107 arranged in the transverse direction.

In some examples, the forty-fifth connection electrode 345 may substantially have a strip-shaped structure extending along the second direction Y. The forty-fifth connection electrode 345 may be electrically connected with the gate T93 of the ninth multiplexing transistor through two 109th vias V109 arranged in the vertical direction, and may also be electrically connected with the first conductive connection block 271 through two 110th vias V110 arranged in the vertical direction.

In some examples, the forty-sixth connection electrode 346 may substantially have a strip-shaped structure extending along the second direction Y. The forty-sixth connection electrode 346 may be electrically connected with the gate T83 of the eighth multiplexing transistor through two 112th vias V112 arranged in the vertical direction, and may also be electrically connected with the second conductive connection block 272 through two 113th vias V113 arranged in the vertical direction.

In some examples, the forty-seventh connection electrode 347 may substantially have a strip-shaped structure extending along the second direction Y. The forty-seventh connection electrode 347 may be electrically connected with the gate T73 of the seventh multiplexing transistor through two 116th vias V116 arranged in the vertical direction, and may also be electrically connected with the third conductive connection block 273 through two 123rd vias V123 arranged in the vertical direction.

In some examples, the third multiplexing control line 53, the fourth multiplexing control line 54, and the fifth multiplexing control line 55 may be at least in a shape of a straight line extending along the first direction X. The fourth multiplexing control line 54 may be located on a side of the fifth multiplexing control line 55 in the second direction Y, and the third multiplexing control line 53 may be located on a side of the fourth multiplexing control line 54 in the second direction Y. The fifth multiplexing control line 55 may be located on a side of the forty-seventh connection electrode 347 in the second direction Y.

In some examples, the fifth multiplexing control line 55 may be electrically connected with the first conductive connection block 271 through two 114th vias V114 arranged in the transverse direction to achieve an electrical connection with the gate T93 of the ninth multiplexing transistor. The fourth multiplexing control line 54 may be electrically connected with the second conductive connection block 272 through two 115th vias V115 arranged in the transverse direction to achieve an electrical connection with the gate T83 of the eighth multiplexing transistor. The third multiplexing control line 53 may be electrically connected with the third conductive connection block 273 through two 124th vias V124 arranged in the transverse direction, thereby achieving an electrical connection with the gate T73 of the seventh multiplexing transistor.

In some examples, the fourth multiplexing data line 44 may extend to one side of the bending region and be electrically connected with a data bending connection line of the bending region.

In this example, three multiplexing transistors electrically connected with a same multiplexing data line are arranged in one column, and there is a misalignment in the second direction, and gates of the three multiplexing transistors are connected with different multiplexing control lines. An arrangement mode of the multiplexing transistors of this example may reduce arrangement space required in horizontal and vertical directions, may improve a space utilization rate, and is suitable for a display panel having a relatively narrow first bezel region. Moreover, combined with the 1:3 design of the multiplexing circuit, a high refresh rate requirement of the display panel may be met. The preparation method of the display panel of the example may be referred to description of the above-mentioned embodiments, thus will not be repeated here.

An embodiment provides a display panel including a base substrate, a plurality of sub-pixels, a plurality of data lines, and a multiplexing circuit. The base substrate includes a display region and a first bezel region located on a side of the display region. The plurality of sub-pixels and the plurality of data lines are located in the display region, and the plurality of data lines are connected with the plurality of sub-pixels and configured to provide data signals to the plurality of sub-pixels. The multiplexing circuit is located in the first bezel region, and includes a plurality of multiplexing units, at least one of the plurality of multiplexing units includes a plurality of multiplexing transistors, the at least one multiplexing unit is electrically connected with one multiplexing data line, a multiplexing control lines, and a plurality of data lines, and is configured to provide a data signal transmitted by the multiplexing data line to the plurality of data lines under control of the a multiplexing control lines, wherein a is an integer greater than 1 and less than or equal to 3. For example, a may be 2 or 3. The plurality of multiplexing transistors of the at least one multiplexing unit are located in a same row, or in a same column, or in different rows; wherein a row of multiplexing transistors includes a plurality of multiplexing transistors arranged along a first direction, and a column of multiplexing transistors includes a plurality of multiplexing transistors arranged along a second direction, the first direction intersects with the second direction.

In some examples, a plurality of multiplexing transistors of at least one multiplexing unit may be located in a same row, such as the embodiment shown in FIG. 5. In some other examples, a plurality of multiplexing transistors of at least one multiplexing unit may be located in a same column, such as the embodiment shown in FIG. 26. In some other examples, a plurality of multiplexing transistors of at least one multiplexing unit may be located in different rows, such as the embodiment shown in FIG. 18.

In some exemplary implementation modes, a column of multiplexing transistors includes: a plurality of multiplexing transistors connected with a same multiplexing control line; or, a plurality of multiplexing transistors connected with a same multiplexing data line.

Relevant description of the display panel of the embodiment may be referred to description of the aforementioned embodiments, and thus will not be repeated here.

Figure 32:
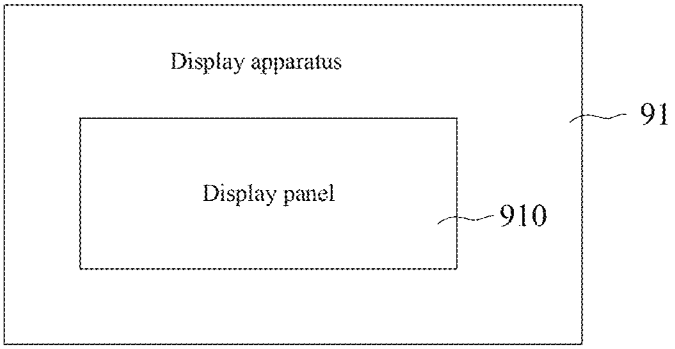
FIG. 32 is a schematic diagram of a display apparatus according to at least one embodiment of the present disclosure.

FIG. 32 is a schematic diagram of a display apparatus according to at least one embodiment of the present disclosure. As shown in FIG. 32, the embodiment provides a display apparatus 91 including a display panel 910 of the aforementioned embodiments. In some examples, the display panel 910 may be an OLED display panel, such as an OLED display panel with an integrated touch structure. The display apparatus 91 may be any product or component having a display function, such as a mobile phone, a tablet computer, a television, a display, a notebook computer, a digital photo frame, or a navigator, or may be a product or component having touch and display functions.

In some examples, the display apparatus 91 may be a wearable display apparatus, for example, which may be worn on a human body in some manners. For example, the display apparatus 91 may be a smart watch, a smart bracelet, and the like. However, the embodiment is not limited thereto.

The drawings of the present disclosure only involve structures involved in the present disclosure, and other structures may be referred to conventional designs. The embodiments of the present disclosure, i.e., features in the embodiments, may be combined with each other to obtain new embodiments if there is no conflict. Those of ordinary skills in the art should understand that modifications or equivalent replacements may be made to the technical solutions of the present disclosure without departing from the essence and scope of the technical solutions of the present disclosure, and shall all fall within the scope of the claims of the present disclosure.

The invention claimed is:

1. A display panel, comprising:

a base substrate, comprising a display region and a first bezel region located on a side of the display region;

a plurality of sub-pixels and a plurality of data lines, located in the display region, wherein the plurality of data lines are connected with the plurality of sub-pixels and configured to provide data signals to the plurality of sub-pixels; and a multiplexing circuit located in the first bezel region and comprising a plurality of multiplexing units; wherein at least one multiplexing unit of the plurality of multiplexing units comprises a plurality of multiplexing transistors, the at least one multiplexing unit is electrically connected with a multiplexing data line, a plurality of multiplexing control lines, and a plurality of data lines, and is configured to provide a data signal transmitted by the multiplexing data line to the plurality of data lines under control of the plurality of multiplexing control lines;

multiplexing transistors of the plurality of multiplexing units are arranged in a plurality of rows and columns, a row of multiplexing transistors comprises a plurality of multiplexing transistors arranged along a first direction, a column of multiplexing transistors comprises a plurality of multiplexing transistors arranged along a second direction, and the plurality of multiplexing transistors in the same column are completely aligned or partially misaligned in the second direction; wherein the first direction intersects with the second direction, wherein the first bezel region comprises at least: a first fanout region and a bending region disposed sequentially along a direction away from the display region; the multiplexing circuit is located in the first fanout region; the first fanout region comprises a plurality of data leading-out lines and a plurality of multiplexing data lines; the bending region at least comprises: a plurality of data bending connection lines;

the multiplexing circuit is electrically connected with a plurality of data lines of the display region through the plurality of data leading-out lines, and is electrically connected with the plurality of multiplexing data lines, and the plurality of multiplexing data lines are electrically connected with the plurality of data bending connection lines, wherein the first bezel region comprises at least: a base substrate, and a semiconductor layer, a first conductive layer, a second conductive layer, and a third conductive layer disposed on the base substrate;

the plurality of multiplexing data lines are alternately arranged on the first conductive layer and the second conductive layer;

the plurality of data leading-out lines are alternately arranged on the first conductive layer and the second conductive layer.

2. The display panel according to claim 1, wherein a column of multiplexing transistors comprises a plurality of multiplexing transistors connected with a same multiplexing control line;

or, a column of multiplexing transistors comprises a plurality of multiplexing transistors connected with a same multiplexing data line.

3. The display panel according to claim 1, wherein the multiplexing transistors of the plurality of multiplexing units are arranged in three rows.

4. The display panel according to claim 3, wherein the at least one multiplexing unit comprises two multiplexing transistors, the two multiplexing transistors are electrically connected with different multiplexing control lines and electrically connected with a same multiplexing data line; the two multiplexing transistors of the at least one multiplexing unit are arranged in a same row.

5. The display panel according to claim 4, wherein the plurality of multiplexing units comprise at least: a plurality of first multiplexing units, a plurality of second multiplexing units, and a plurality of third multiplexing units; multiplexing transistors of the plurality of first multiplexing units are arranged in a first row, multiplexing transistors of the plurality of second multiplexing units are arranged in a second row, and multiplexing transistors of the plurality of third multiplexing units are arranged in a third row;

among a first multiplexing unit, a second multiplexing unit, and a third multiplexing unit, multiplexing transistors electrically connected with a same multiplexing control line are arranged in a same column.

6. The display panel according to claim 5, wherein the plurality of sub-pixels comprise: a first sub-pixel that emits light of a first color, a second sub-pixel that emits light of a second color, and a third sub-pixel that emits light of a third color;

the first multiplexing unit is configured to provide a data signal to a plurality of first sub-pixels, the second multiplexing unit is configured to provide a data signal to a plurality of second sub-pixels, and the third multiplexing unit is configured to provide a data signal to a plurality of third sub-pixels.

7. The display panel according to claim 3, wherein the at least one multiplexing unit comprises three multiplexing transistors, the three multiplexing transistors are electrically connected with different multiplexing control lines and electrically connected with a same multiplexing data line; the three multiplexing transistors of the at least one multiplexing unit are arranged in a same column.

8. The display panel according to claim 7, wherein the plurality of sub-pixels comprise: a first sub-pixel that emits light of a first color, a second sub-pixel that emits light of a second color, and a third sub-pixel that emits light of a third color;

the three multiplexing transistors of the at least one multiplexing unit are configured to provide data signals to the first sub-pixel, the second sub-pixel, and the third sub-pixel, respectively.

9. The display panel according to claim 8, wherein the three multiplexing transistors of the at least one multiplexing unit are a seventh multiplexing transistor, an eighth multiplexing transistor, and a ninth multiplexing transistor;

the seventh multiplexing transistor, the eighth multiplexing transistor, and the ninth multiplexing transistor located in the same column are disposed and staggered in the second direction.

10. The display panel according to claim 9, wherein a plurality of seventh multiplexing transistors are arranged in a first row, a plurality of eighth multiplexing transistors are arranged in a second row, and a plurality of ninth multiplexing transistors are arranged in a third row, and the first row, the second row, and the third row are sequentially disposed along a direction away from the display region.

11. The display panel according to claim 1, wherein the multiplexing transistors of the plurality of multiplexing units are arranged in two rows.

12. The display panel according to claim 11, wherein the at least one multiplexing unit comprises two multiplexing transistors, the two multiplexing transistors are electrically connected with a first multiplexing control line and a second multiplexing control line, respectively, and are electrically connected with a same multiplexing data line; the two multiplexing transistors of the at least one multiplexing unit are arranged in different rows and different columns.

13. The display panel according to claim 12, wherein multiplexing transistors located in an i-th column are all electrically connected with the first multiplexing control line, multiplexing transistors located in an (i+1)-th column are electrically connected with different multiplexing control lines, and multiplexing transistors located in an (i+2)-th column are all electrically connected with the second multiplexing control line, wherein i is an integer greater than 0.

14. The display panel according to claim 12, wherein the plurality of multiplexing units comprise at least: a plurality of first multiplexing units, a plurality of second multiplexing units, and a plurality of third multiplexing units; the plurality of sub-pixels comprise: a first sub-pixel that emits light of a first color, a second sub-pixel that emits light of a second color, and a third sub-pixel that emits light of a third color;

a first multiplexing unit is configured to provide data signals to a plurality of first sub-pixels, a second multiplexing unit is configured to provide data signals to a plurality of second sub-pixels, and a third multiplexing unit is configured to provide data signals to a plurality of third sub-pixels;

two multiplexing transistors of the first multiplexing unit are respectively located in an i-th column and an (i+1)-th column;

two multiplexing transistors of the second multiplexing unit are respectively located in the i-th column and an (i+2)-th column;

two multiplexing transistors of the third multiplexing unit are respectively located in the (i+1)-th column and the (i+2)-th column.

15. The display panel according to claim 1, wherein the first bezel region further comprises: a fourth conductive layer located on a side of the third conductive layer away from the base substrate; the plurality of data bending connection lines are located on the fourth conductive layer.

16. A display apparatus, comprising a display panel according to claim 1.

17. A display panel, comprising:

a base substrate, comprising a display region and a first bezel region located on a side of the display region;

a plurality of sub-pixels and a plurality of data lines, located in the display region, wherein the plurality of data lines are connected with the plurality of sub-pixels and configured to provide data signals to the plurality of sub-pixels; and a multiplexing circuit located in the first bezel region and comprising a plurality of multiplexing units, wherein at least one multiplexing unit of the plurality of multiplexing units comprises a plurality of multiplexing transistors, the at least one multiplexing unit is electrically connected with one multiplexing data line, a multiplexing control lines, and a plurality of data lines, and is configured to provide a data signal transmitted by the multiplexing data line to the plurality of data lines under control of the a multiplexing control lines, wherein a is an integer greater than 1 and less than or equal to 3;

wherein the plurality of multiplexing transistors of the at least one multiplexing unit are located in a same row, or in a same column, or in different rows; wherein a row of multiplexing transistors comprises a plurality of multiplexing transistors arranged along a first direction, and a column of multiplexing transistors comprises a plurality of multiplexing transistors arranged along a second direction, the plurality of multiplexing transistors in the same column are completely aligned or partially misaligned in the second direction, and the first direction intersects with the second direction, wherein, the first bezel region comprises at least: a first fanout region and a bending region disposed sequentially along a direction away from the display region; the multiplexing circuit is located in the first fanout region; the first fanout region comprises a plurality of data leading-out lines and a plurality of multiplexing data lines; the bending region at least comprises: a plurality of data bending connection lines;

the multiplexing circuit is electrically connected with a plurality of data lines of the display region through the plurality of data leading-out lines, and is electrically connected with the plurality of multiplexing data lines, and the plurality of multiplexing data lines are electrically connected with the plurality of data bending connection lines, wherein the first bezel region comprises at least: a base substrate, and a semiconductor layer, a first conductive layer, a second conductive layer, and a third conductive layer disposed on the base substrate;

the plurality of multiplexing data lines are alternately arranged on the first conductive layer and the second conductive layer;

the plurality of data leading-out lines are alternately arranged on the first conductive layer and the second conductive layer.

18. The display panel according to claim 17, wherein a column of multiplexing transistors comprises: a plurality of multiplexing transistors connected with a same multiplexing control line; or, a plurality of multiplexing transistors connected with a same multiplexing data line.

* * * * *